(12) United States Patent
Tulgara et al.

(10) Patent No.: US 11,674,806 B2
(45) Date of Patent: Jun. 13, 2023

(54) ANCHORING SYSTEMS AND METHODS FOR MARINE VESSELS

(71) Applicant: NAVICO HOLDING AS, Egersund (NO)

(72) Inventors: Sergiu Tulgara, Gothenburg (SE); Gustav Sohtell, Torslanda (SE); Mark Harnett, Auckland (NZ); Aidan Hall, Sutton (GB); Derry Lozano-hoyland, London (GB); Donnie Suazo, Worcester Park (GB); Sjoerd Aben, Edinburgh (GB); Damien Slater, Leamington Spa (GB)

(73) Assignee: Navico Holding AS, Egersund (NO)

( * ) Notice: Subject to any disclaimer, the term of this patent is extended or adjusted under 35 U.S.C. 154(b) by 68 days.

(21) Appl. No.: 17/184,905

(22) Filed: Feb. 25, 2021

(65) Prior Publication Data
US 2022/0268585 A1 Aug. 25, 2022

(51) Int. Cl.
*B63B 49/00* (2006.01)
*G01C 21/20* (2006.01)
(Continued)

(52) U.S. Cl.
CPC .......... *G01C 21/203* (2013.01); *B63B 79/15* (2020.01); *B63B 49/00* (2013.01); *B63B 2211/00* (2013.01); *B63G 8/38* (2013.01); *G08G 3/00* (2013.01)

(58) Field of Classification Search
CPC ............. G05D 1/0206; G05D 1/0208; B01D 11/00355; B01D 2239/1283;
(Continued)

(56) References Cited

U.S. PATENT DOCUMENTS

| | | | | |
|---|---|---|---|---|
| 5,491,636 A | * | 2/1996 | Robertson | B63H 25/42 701/485 |
| 5,884,213 A | * | 3/1999 | Carlson | B63H 25/42 701/470 |

(Continued)

FOREIGN PATENT DOCUMENTS

| | | | | |
|---|---|---|---|---|
| CN | 104361411 A | | 2/2015 | |
| CN | 110743249 A | * | 2/2020 | B01D 39/14 |

(Continued)

OTHER PUBLICATIONS

A Radar-based Inventory of Marbled Murrelets (*Brachyramphus marmoratus*), Northern Mainland Coast of British Columbia; J.D. Steventon, M.Sc., R.P.Bio. B.C. Ministry of Forests, Research Program;N.P. Holmes; Sunstar Yachts Ltd.; (Year: 2002).*

(Continued)

*Primary Examiner* — Cuong H Nguyen
(74) *Attorney, Agent, or Firm* — Nelson Mulllns Riley & Scarborough LLP

(57) ABSTRACT

Systems and methods for conveniently providing anchoring assistance onboard a watercraft are provided herein. An example system includes a display and a processor in communication with a marine system. The processor is configured to receive marine data from the marine system and/or one or more user inputs and cause the display to show one or more anchoring locations with visual indications of the anchorage quality index based on at least the marine data and/or user inputs. The one or more anchoring locations may be shown as a heat map overlaid on a map. The system may use real-time marine data, environmental data, weather data, tide data, etc. to dynamically adjust the anchoring locations and anchorage quality index. The system may enable convenient and helpful suggestions and notifications to the user when anchoring a watercraft. Some examples provide auto- (Continued)

matic deployment of an anchoring system and monitoring of a current anchoring.

19 Claims, 30 Drawing Sheets

(51) Int. Cl.
*B63B 79/15* (2020.01)
*G08G 3/00* (2006.01)
*B63G 8/38* (2006.01)

(58) Field of Classification Search
CPC ............ B01D 2311/04; B65H 2515/84; B65H 2301/542; G01C 21/20; G01C 21/203; B63B 79/00; B63B 79/10; B63B 79/15
USPC .................................................. 701/21, 431
See application file for complete search history.

(56) References Cited

U.S. PATENT DOCUMENTS

| | | | | |
|---|---|---|---|---|
| 8,091,017 B2* | 1/2012 | Paxson | ................. | G06F 40/131 715/208 |
| 10,464,653 B2* | 11/2019 | Anderson | ............ | B63H 20/007 |
| 2016/0016651 A1* | 1/2016 | Anderson | ............ | G05D 1/0206 701/2 |
| 2020/0062365 A1 | 2/2020 | Anderson et al. | | |
| 2020/0094924 A1 | 3/2020 | Gaziotis | | |
| 2021/0001897 A1* | 1/2021 | Chai | ........................ | G06N 3/08 |
| 2021/0031885 A1* | 2/2021 | Suarez Montalvo | ... | B63B 49/00 |

FOREIGN PATENT DOCUMENTS

| | | | | |
|---|---|---|---|---|
| CN | 210954010 U | * | 7/2020 | ............. G01N 33/18 |
| CN | 111781921 A | * | 10/2020 | ........... G05D 1/0206 |

OTHER PUBLICATIONS

Methods for Evaluating the Impacts of Fisheries on North Atlantic Ecosystems];Pauly, D. (Daniel); Pitcher, Tony J.; Fisheries Centre, University of British Columbia (year: 2000) (Year: 2000).*
A draft Technical Report of "A Radar-based Inventory of Marbled Murrelets" Northern Mainland Coast of British Columbia, by J. D. Steventon, N.P. Holmes, Sunstar Yachts Ltd. Nov. 2002 (Year: 2002).*
"Real-time detection of underwater river crab based on multi-scale pyramid fusion image enhancement and MobileCenterNet model" by WeiJi et al; from https://doi.org/10.1016/j.compag.2022.107522.*
S. Li, S. Xu, W. Ma and Q. Zong, "Image Manipulation Localization Using Attentional Cross-Domain CNN Features," in IEEE Transactions on Neural Networks and Learning Systems, doi: 10.1109/TNNLS.2021.3130168 (Year:2021).*
S. Thalhammer, M. Leitner, T. Patten and M. Vincze, "PyraPose: Feature Pyramids for Fast and Accurate Object Pose Estimation under Domain Shift," 2021 IEEE International Conference on Robotics and Automation (ICRA), Xi'an, China, 2021, pp. 13909-13915, doi: 10.1109/ICRA48506.2021.9562108.(Year:2021).*
"It's time to discover the confidence that comes with owning Power-Pole®, the first and only name in shallow water anchoring; Power-Pole®', retrieved Jun. 11, 2021 from https://power-pole.com/shallow-water-anchors/learnmore#lm-innovative.
"Wind Map & Weather Forecast;" Windy.com', retrieved Jun. 11, 2021 from https://www.windy.com/?37.788,-79.321,4.
Garmin; May 18, 2021; *Anchor* (1.9.2) [Mobile app]; App Store; retrieved Jun. 11, 2021 from https://apps.garmin.com/en_GB/apps/cf285e5a-07ab-4ff7-9e58-0788650e23d6.
Pomacanthus; Jan. 28, 2021; *Anchor! drag alarm* (6.20) [Mobile App]; App Store; retrieved Jun. 11, 2021 from https://apps.apple.com/gb/app/anchor/id661180281.
Takmaz; Jul. 18, 2020; *SafeAnchor.Net Anchor Alarm* (2.0) [Mobile App]; App Store; retrieved Jun. 11, 2021 from https://apps.apple.com/tr/app/safeanchor-pet-for-sailing-yachts-and-powerboats/id1225033114.
Sea Time Tech, LLC; Mar. 18, 2019; *Anchor Time* (1.2) [Mobile App]; App Store; retrieved Jun. 11, 2021 from https://apps.apple.com/us/app/anchor-time/id1454388591.
B2N Ltd; Mar. 6, 2020; *Anchor Alarm with Late Set* (4.7) [Mobile App]; App Store; retrieved Jun. 11, 2021 from https://apps.apple.com/gb/app/anchor-alarm-with-late-set/id1292028990.
Kriesche; Jan. 5, 2020; *Anchor Alarm—Anchor Watch* (1.14) [Mobile App]; App Store; retrieved Jun. 11, 2021 from https://apps.apple.com/gb/app/anchor-alarm-anchor-watch/id1047308803.
Wagener; Aug. 27, 2018; *Anchor Mate* (1.1) [Mobile App]; App Store; retrieved Jun. 11, 2021 from https://apps.apple.com/us/app/anchor-mate/id1409376791.
Nauticed Sailing School; Jun. 4, 2019; *Anchor Zone Alarm* (1.0.1) [Mobile App]; App Store; retrieved Jun. 11, 2021 from https://apps.apple.com/us/app/anchor-zone-alarm/id1275402569.
Codeveloping; Jun. 21, 2019; *Anchor Watcher* (1.1.5) [Mobile App]; App Store; retrieved Jun. 11, 2021 from https://apps.apple.com/gb/app/anchor-watcher/id933630262.
NET.FS; Jun. 14, 2019; *Anchor Watch (free)* (2.1.10) [Mobile App]; Google Play; retrieved Jun. 11, 2021 from https://play.google.com/store/apps/details?id=net.fs.android.anchorwatchfree&hl=en_GB.
Peckish Sloth Oü; Mar. 4, 2021; *Anchor Watch / Alarm* (6.3-lite) [Mobile App]; Google Play; retrieved Jun. 11, 2021 from https://play.google.com/store/apps/details?id=com.webmajstr.anchor&hl=en.
Parrott; "Does Your Anchorage Rate? Look for these elements before dropping the hook;" *Soundings*; Feb. 27, 2019; retrieved Sep. 22, 2022 from https://www.soundingsonline.com/voices/does-your-anchorage-rate.
Sass, Jr.; "Hold Your Ground: The Basics of Anchoring Successfully;" *Passagemaker*; Apr. 21, 2017; retrieved Sep. 22, 2022 from https://www.passagemaker.com/channels/hold-your-ground-the-basics-of-anchoring-successlully.
"Know Your Seabed Symbols for Safer Sailing Navigation;" *Captain John's Skipper Tips*; retrieved Sep. 22, 2022 from https://www.skippertips.com/public/Know_Your_Seabed_Symbols_for_Safer_Sailing_Navigation.cfm.
Doane; "Five Tips Guaranteed to Reduce your Anchoring Anxiety;" *Sail*; Original Aug. 29, 2016, Updated Aug. 2, 2017; retrieved Sep. 22, 2022 from https://www.sailmagazine.com/cruising/five-tips-guaranteed-reduce-anchoring-anxiety.
"Anchor Selection Guide: How to Choose the Best Boat Anchor Type;" Anchoring.com; May 8, 2018; retrieved Sep. 22, 2022 from https://www.anchoring.com/blogs/anchoring/anchor-selection-guide-how-to-choose-the-best-boat-anchor-type.

* cited by examiner

ANCHORING SYSTEMS AND METHODS FOR MARINE VESSELS

FIELD OF THE DISCLOSURE

Embodiments of the present disclosure relate generally to the anchoring of marine vessels and, more particularly, to dynamic systems and methods for anchoring assistance on a marine vessel.

BACKGROUND OF THE DISCLOSURE

Anchoring a marine vessel is one of the most difficult tasks for those new to boating and can present several challenges to boaters. Knowing where, when, and how to anchor a marine vessel is a safety critical task and an important skill that takes time to develop. When selecting a location to anchor, there are several factors to consider (e.g., wind, land and seabed topography, depth, tides, currents, vessel type, anchor type), some of which may be dynamically changing with time.

Applicant has developed systems and methods detailed herein to improve and enhance the ability of users to safely perform anchoring activities onboard marine vessels (e.g., watercraft).

BRIEF SUMMARY OF THE DISCLOSURE

Example embodiments of the present disclosure provide systems and methods for providing anchoring assistance onboard a watercraft. In some embodiments, the disclosed systems and methods may advantageously minimize need for expertise or complicated charts for manually anchoring a marine vessel. In some embodiments, rather than require the user to select an appropriate anchoring location, an anchoring system may provide suggested anchoring locations based on marine data and/or user inputs. Further, in some embodiments, the system may automatically deploy the anchor for the user and alert the user if any need for changes is detected.

The example anchoring systems disclosed herein may display various anchoring and/or marine data to the user via a screen (e.g., multi-functional display (MFD), mobile media device). In this way, the example anchoring systems may indicate processed or converted data relevant to the anchoring task that may make it easy for the user to understand what needs to be considered and what options are available for anchoring. For example, in some embodiments, virtual marine imagery and/or data related to anchoring may be displayed to the user along with current environmental data and/or marine vessel status information (e.g., boat position relative to the anchoring location, deployed rode length of anchor relative to depth of seabed) to improve or enhance the anchoring experience.

In an example embodiment, a marine electronic device configured to provide possible anchoring locations to a user for a marine vessel is provided. The marine electronic device comprises a display and a processor configured to: receive marine data from a marine system connected to the marine vessel, determine one or more anchoring locations, generate an anchorage quality index for each of the one or more anchoring locations based on at least the received marine data, and cause the display to show the one or more anchoring locations with a visual indication of the corresponding anchorage quality index for the one or more anchoring locations. The visual indication is variable and reflects the corresponding anchorage quality index for an anchoring location. The one or more anchoring locations includes at least a first anchoring location and a second anchoring location. A first visual indication associated with the first anchoring location is different than a second visual indication associated with the second anchoring location in an instance in which a first anchorage quality index associated with the first anchoring location is different than a second anchorage quality index associated with the second anchoring location.

In some embodiments, the marine data includes sonar data. In some embodiments, the sonar data includes seabed composition data.

In some embodiments, the processor is configured to cause the display to show the one or more anchoring locations as one or more areas on a map.

In some embodiments, the visual indication is a color along a color scale. In some embodiments, the processor is configured to cause the display to show the one or more anchoring locations in the form of a heat map overlaid on a map.

In some embodiments, the one or more areas are circular. In some embodiments, a radius of each of the one or more circular areas is based on at least a corresponding water depth. In some embodiments, the visual indication is depicted as a radius size of each of the one or more circular areas.

In some embodiments, the processor is further configured to generate the anchorage quality index for each of the one or more anchoring locations based on at least an anchoring time input by the user.

In some embodiments, the processor is further configured to receive real-time environmental data and update the one or more anchoring locations based on at least the received real-time environmental data. In some embodiments, the real-time environmental data includes at least one of wind data, tide data, and weather data.

In another example embodiment, a marine electronic device configured to provide possible anchoring locations to a user for a marine vessel is provided. The marine electronic device comprises a display and a processor configured to receive one or more user inputs, determine one or more anchoring areas for the marine vessel in response to the one or more user inputs, generate an anchorage quality index for each of the one or more anchoring areas, and cause the display to show a heat map indicating the anchorage quality index of the one or more anchoring areas.

In some embodiments, the processor is configured to generate the anchorage quality index for each of the one or more anchoring areas based on at least real-time data. In some embodiments, the real-time data includes at least one of sonar data, weather data, and tide data.

In some embodiments, the processor is configured to generate the anchorage quality index for each of the one or more anchoring areas based on at least crowd-sourced data.

In some embodiments, the processor is configured to determine the one or more anchoring areas based on at least one of a boat profile, chart data, and depth data. In some embodiments, the boat profile includes at least one of an anchor type, a number of anchors, a line length, a bow height, and a scope ratio.

In some embodiments, the one or more user inputs includes an anchoring time.

In some embodiments, the processor is further configured to generate a swing buffer distance required for the marine vessel for anchoring in each of the one or more anchoring areas and cause the display to show a swing buffer overlay on the heat map indicating the generated swing buffer distance for each of the one or more anchoring areas.

In yet another example embodiment, a method for planning where to anchor a marine vessel is provided. The method comprises receiving one or more user inputs; determining one or more anchoring areas for the marine vessel in response to the one or more user inputs; generating an anchorage quality index for each of the one or more anchoring areas; and causing a display to show a heat map indicating the anchorage quality index of the one or more anchoring areas.

In some embodiments, the display is part of a multi-function display on the marine vessel.

In some embodiments, the display is part of a mobile media device.

In yet another example embodiment, a marine electronic device configured to provide possible anchoring locations to a user for a marine vessel is provided. The marine electronic device comprises a display and a processor configured to receive one or more user inputs, determine one or more anchoring areas for the marine vessel in response to the one or more user inputs, generate an anchorage quality index for each of the one or more anchoring areas, generate a swing buffer distance required for the marine vessel for anchoring in each of the one or more anchoring areas, and cause the display to show a map of the one or more anchoring areas indicating the swing buffer distance and anchorage quality index generated for each of the one or more anchoring areas.

In some embodiments, the one or more user inputs includes at least one of an anchor type, a number of anchors, a line length, a bow height, and a scope ratio.

In yet another example embodiment, a system for aiding a user in anchoring a marine vessel is provided. The system comprises an anchoring system for controlling an anchor of the marine vessel, a location sensor configured to detect a current location of the marine vessel, and a marine electronic device comprising a display and a processor. The processor is configured to receive real-time environmental data based on the current location of the marine vessel, determine one or more anchoring locations for the marine vessel based on the received real-time environmental data, cause the display to show the one or more anchoring locations, and receive one or more user inputs indicating selection of one of the one or more anchoring locations.

In some embodiments, the processor is further configured to cause the display to show the selected anchoring location in relation to the marine vessel based on the current location detected by the location sensor.

In some embodiments, the processor is further configured to generate an alert for the user when the current location of the marine vessel is at the selected anchoring location.

In some embodiments, the processor is further configured to cause the anchoring system to deploy the anchor when the current location of the marine vessel is at the selected anchoring location.

In some embodiments, the real-time environmental data includes at least one of weather data, wind data, tide data, and sonar data.

In some embodiments, the data from the anchoring system includes a length of rode deployed. In some embodiments, the processor is configured to cause the anchoring system to deploy the anchor using a calculated length of rode based on at least depth data at the current location of the marine vessel.

In yet another example embodiment, a system for monitoring an anchored marine vessel is provided. The system comprises a location sensor configured to detect a current location of the marine vessel and a marine electronic device comprising a display and a processor. The processor is configured to receive real-time environmental data based on the current location of the marine vessel, determine an anchorage quality index based on the real-time environmental data, and generate an alert for the user if the determined anchorage quality index is below a predetermined threshold.

In some embodiments, the system further includes an anchor sensor for sensing an anchor within an anchoring system of the marine vessel.

In some embodiments, the processor is further configured to determine a swing buffer distance for the marine vessel based on data from the anchor sensor and cause the display to show a map indicating the current location, the anchorage quality index, and the swing buffer distance.

In some embodiments, the marine electronic device is a multi-function display.

In some embodiments, the real-time environmental data includes at least one of weather data, wind data, tide data, and sonar data.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

BRIEF DESCRIPTION OF THE DRAWINGS

Figure 1:
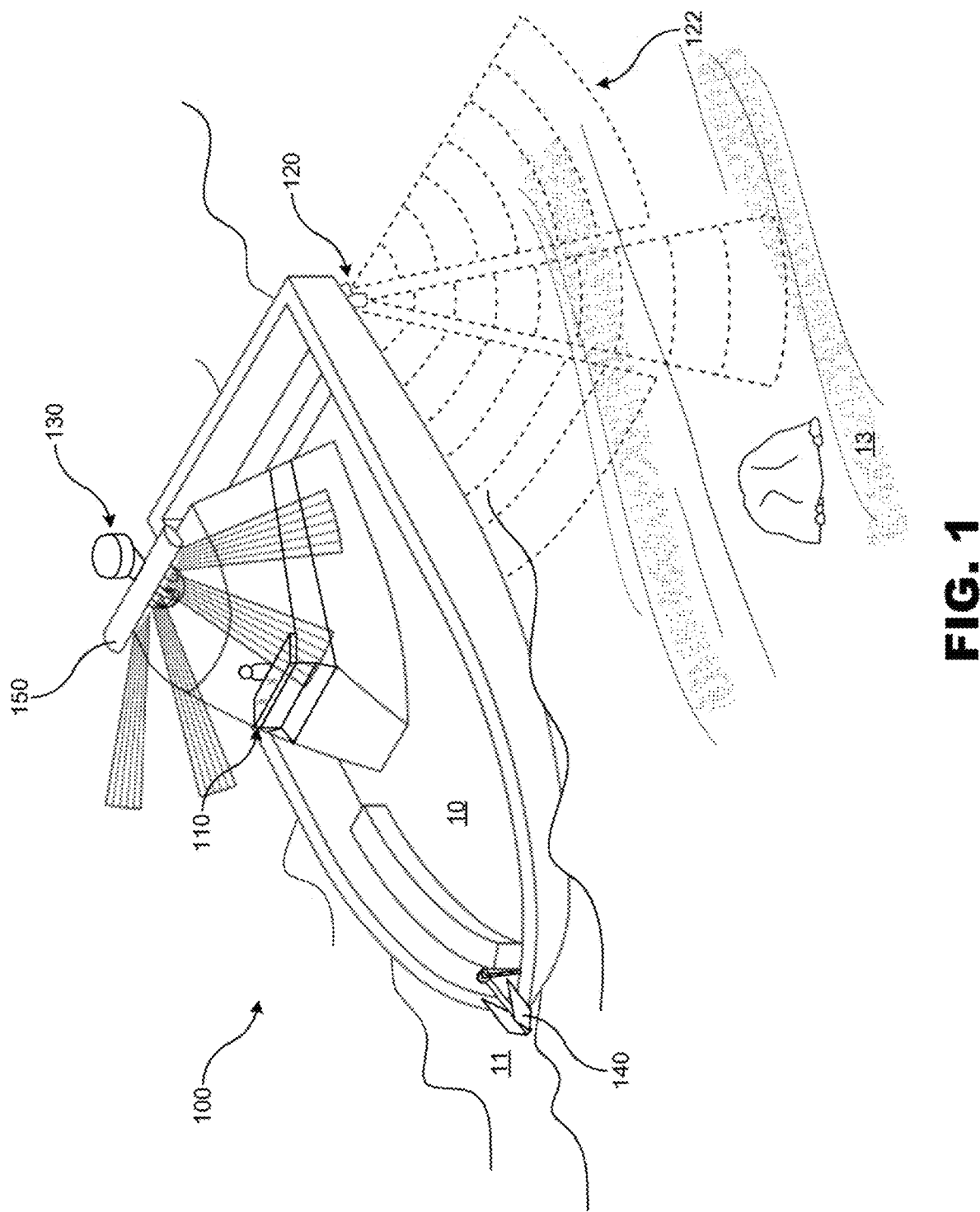
Figure 2:
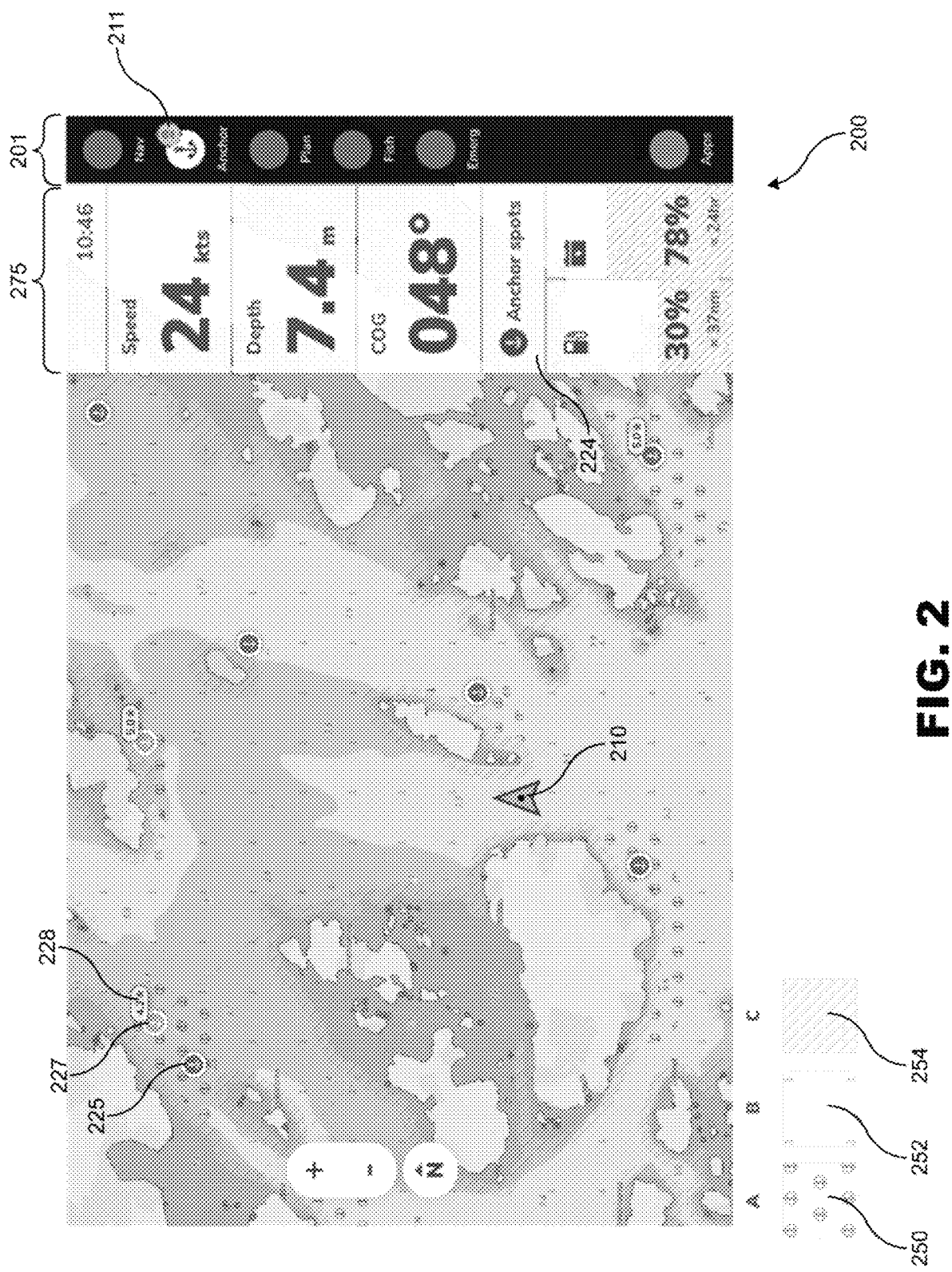
Figure 3:
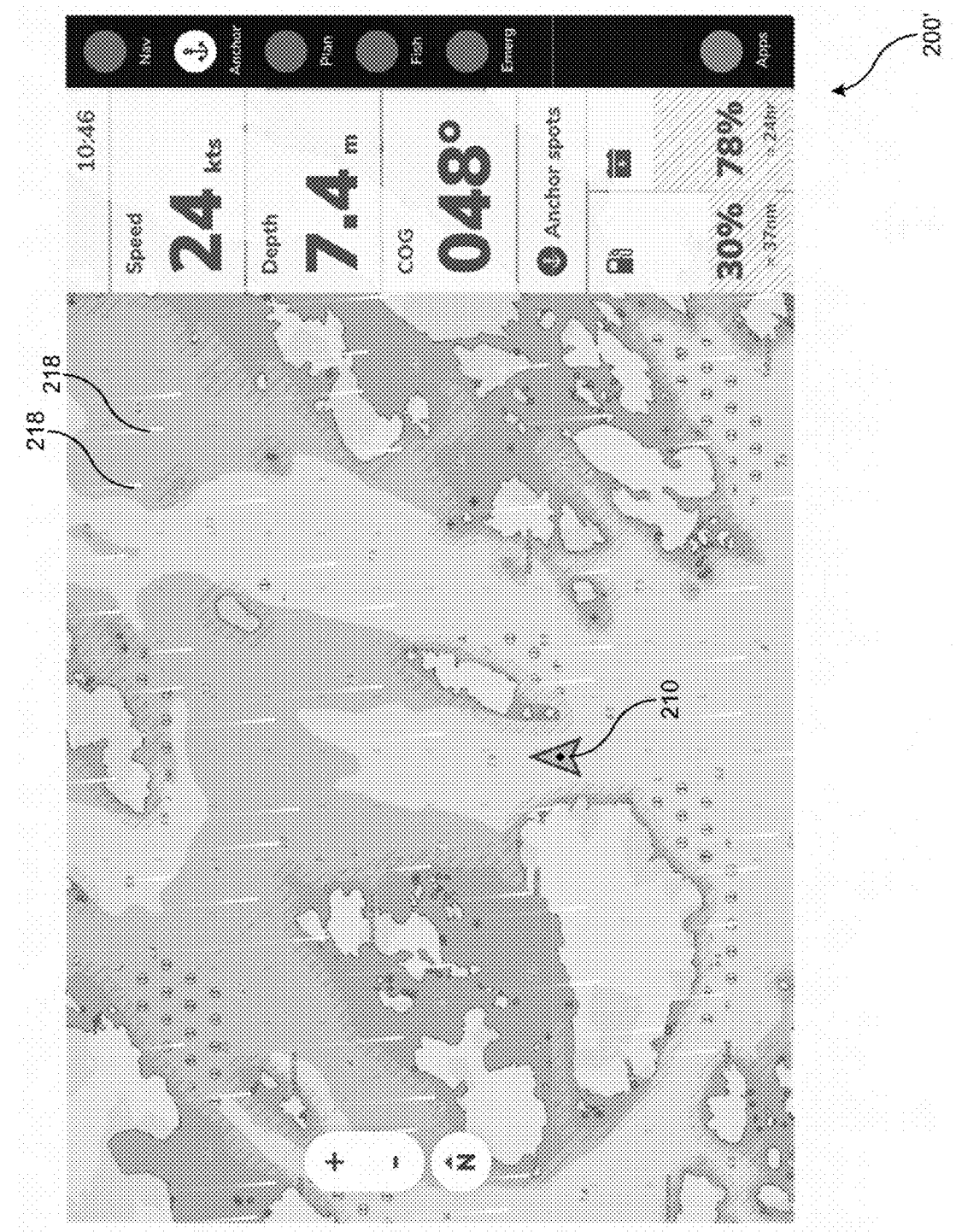
Figure 4:
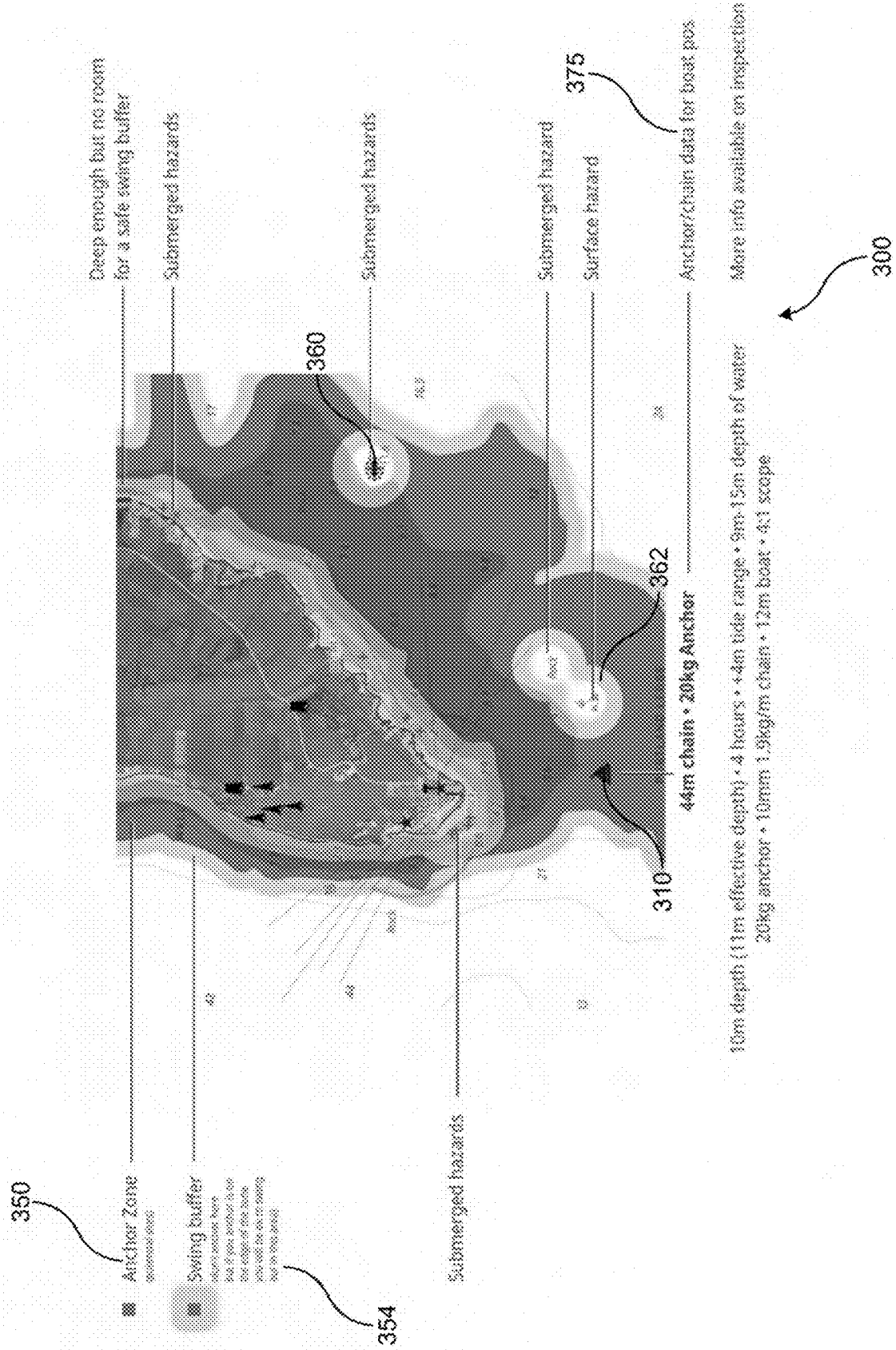
Figure 5:
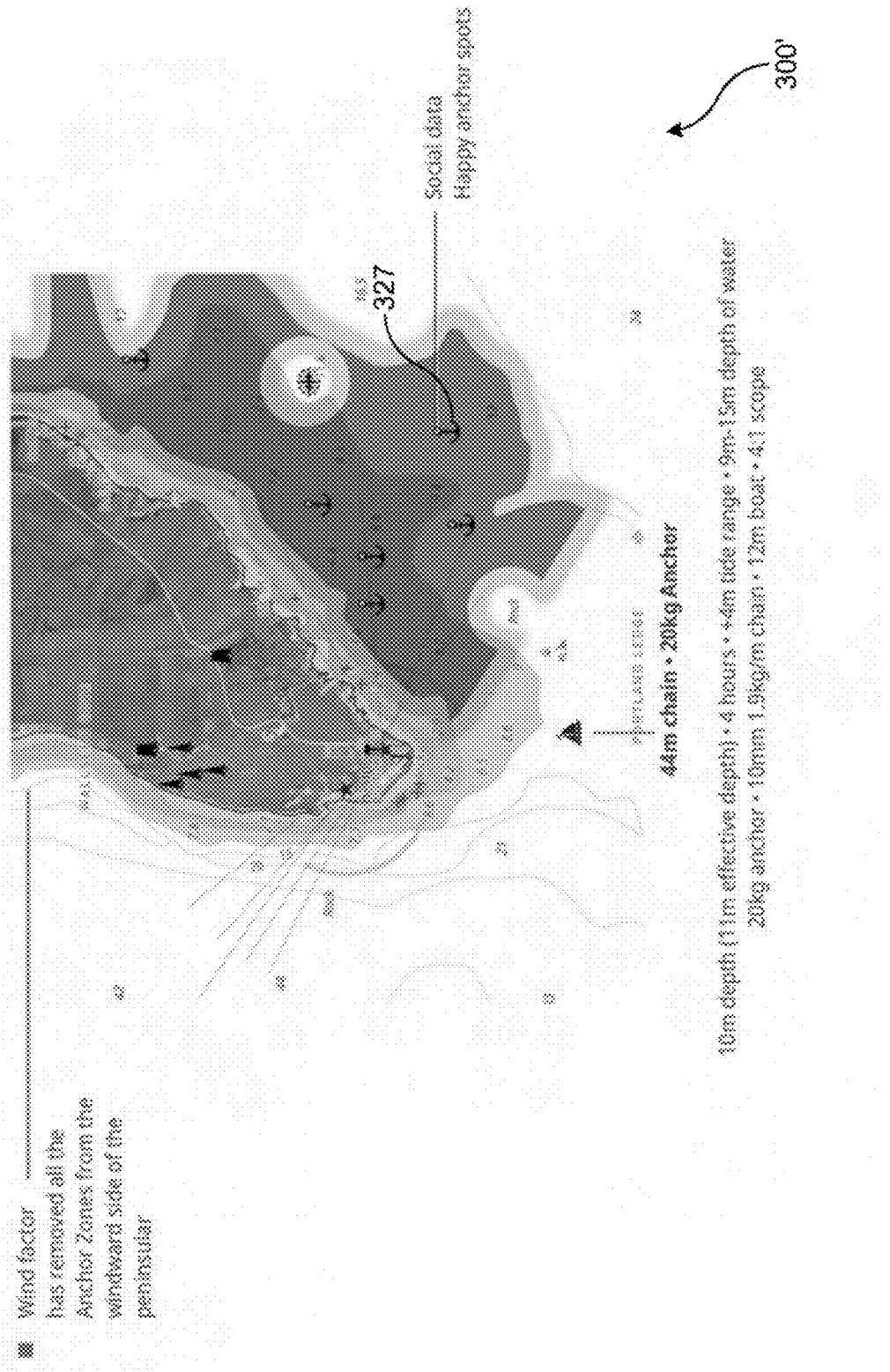
Figure 6:
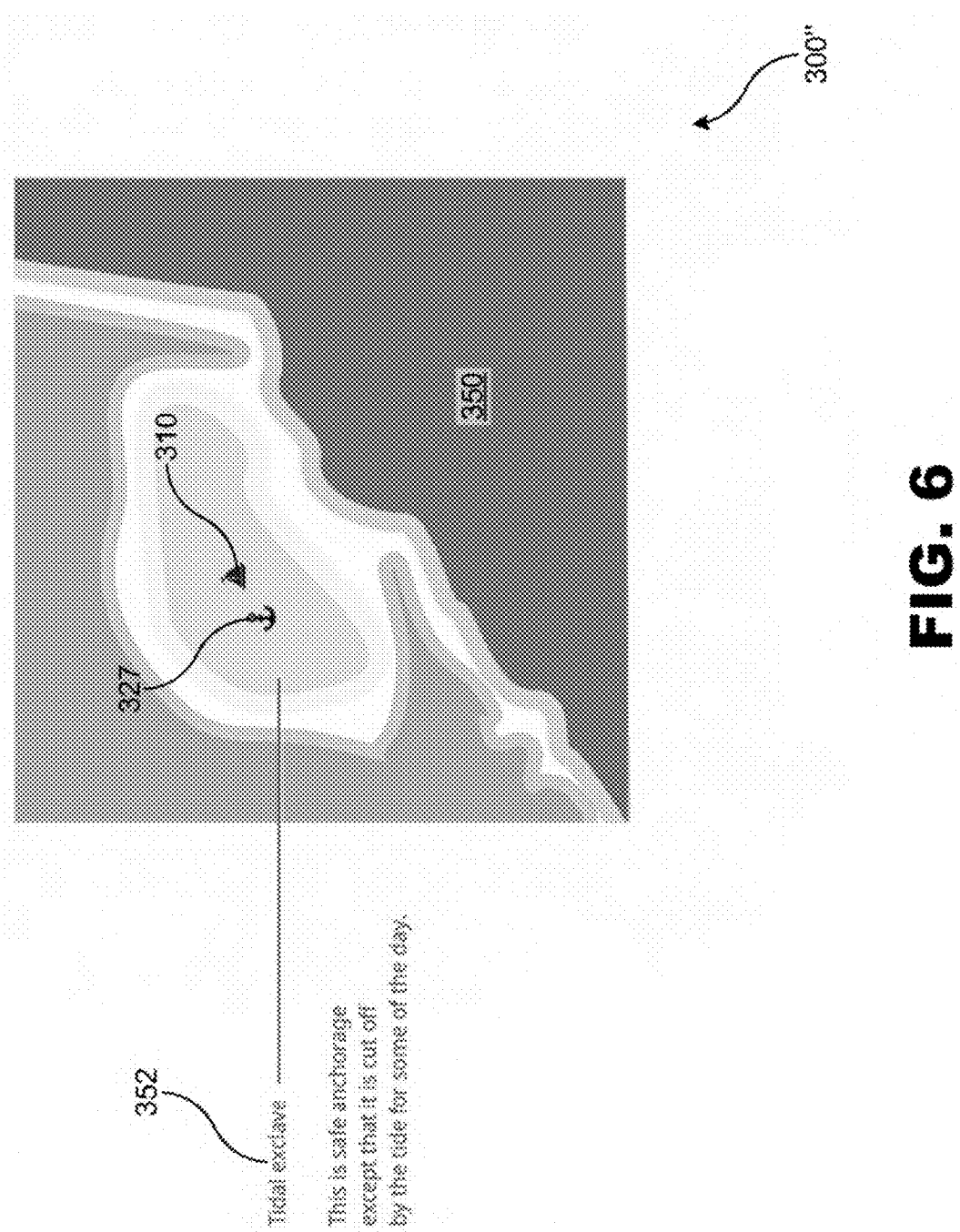
Figure 7:
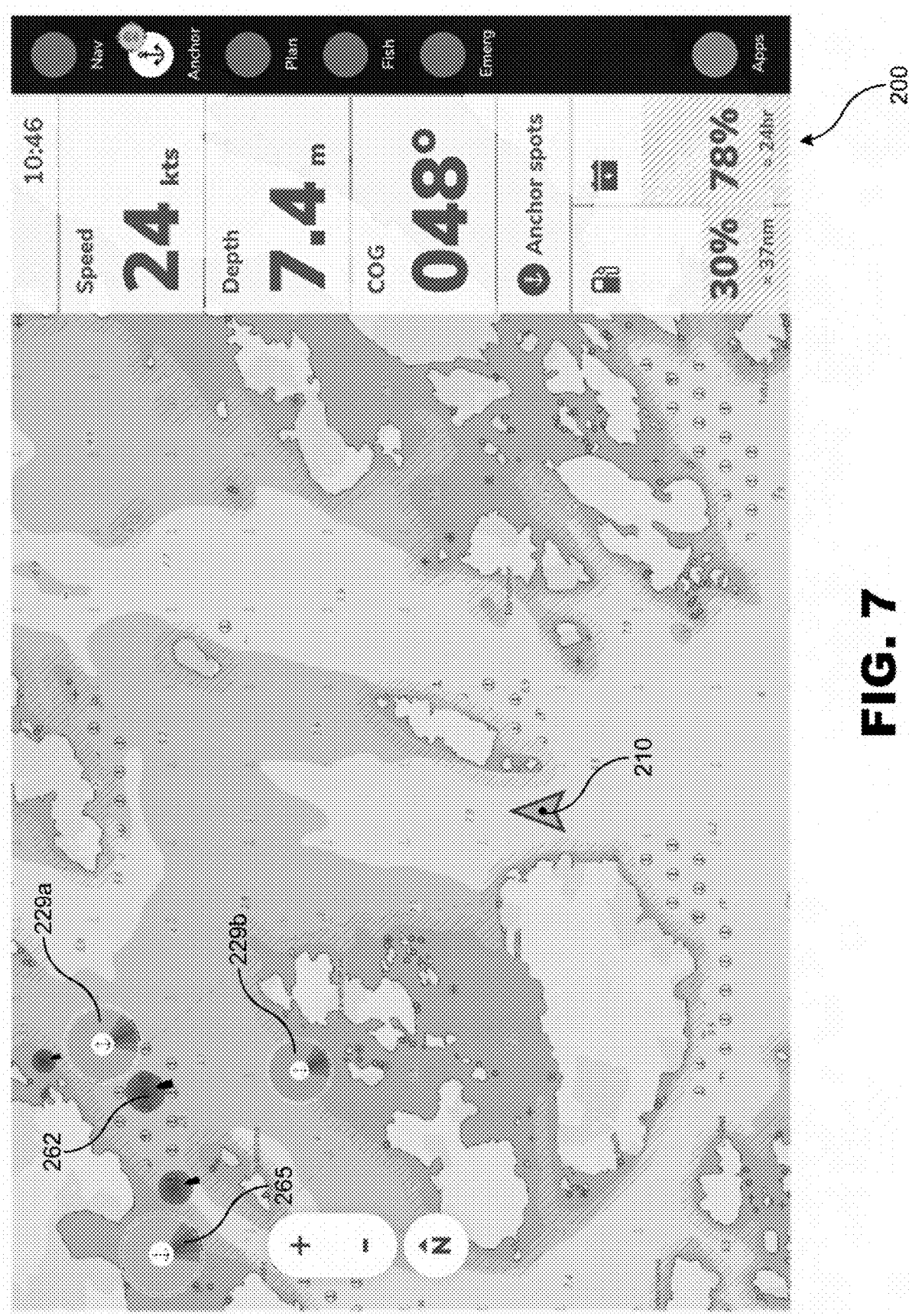
Figure 8:
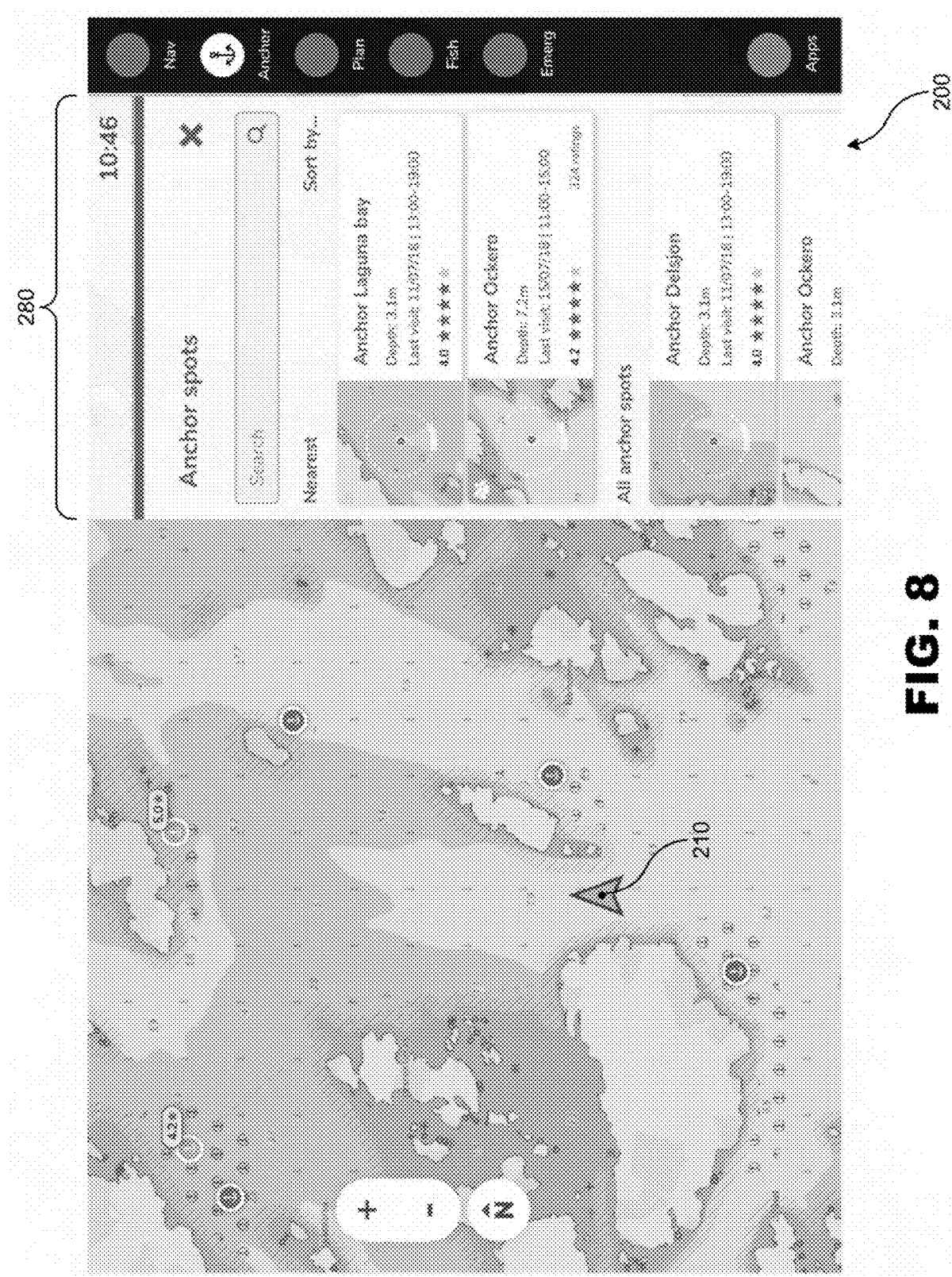
Figure 9:
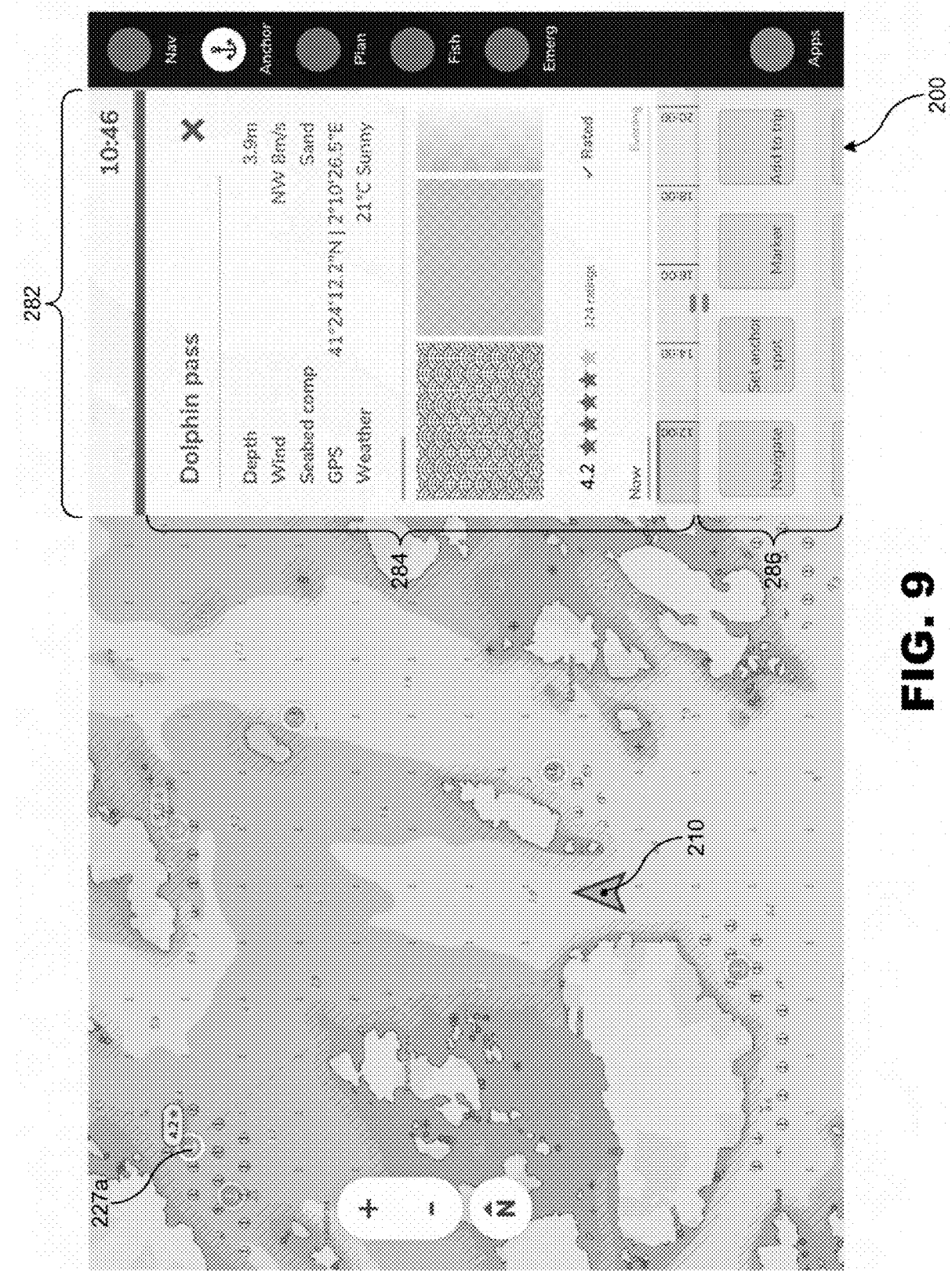
Figure 10:
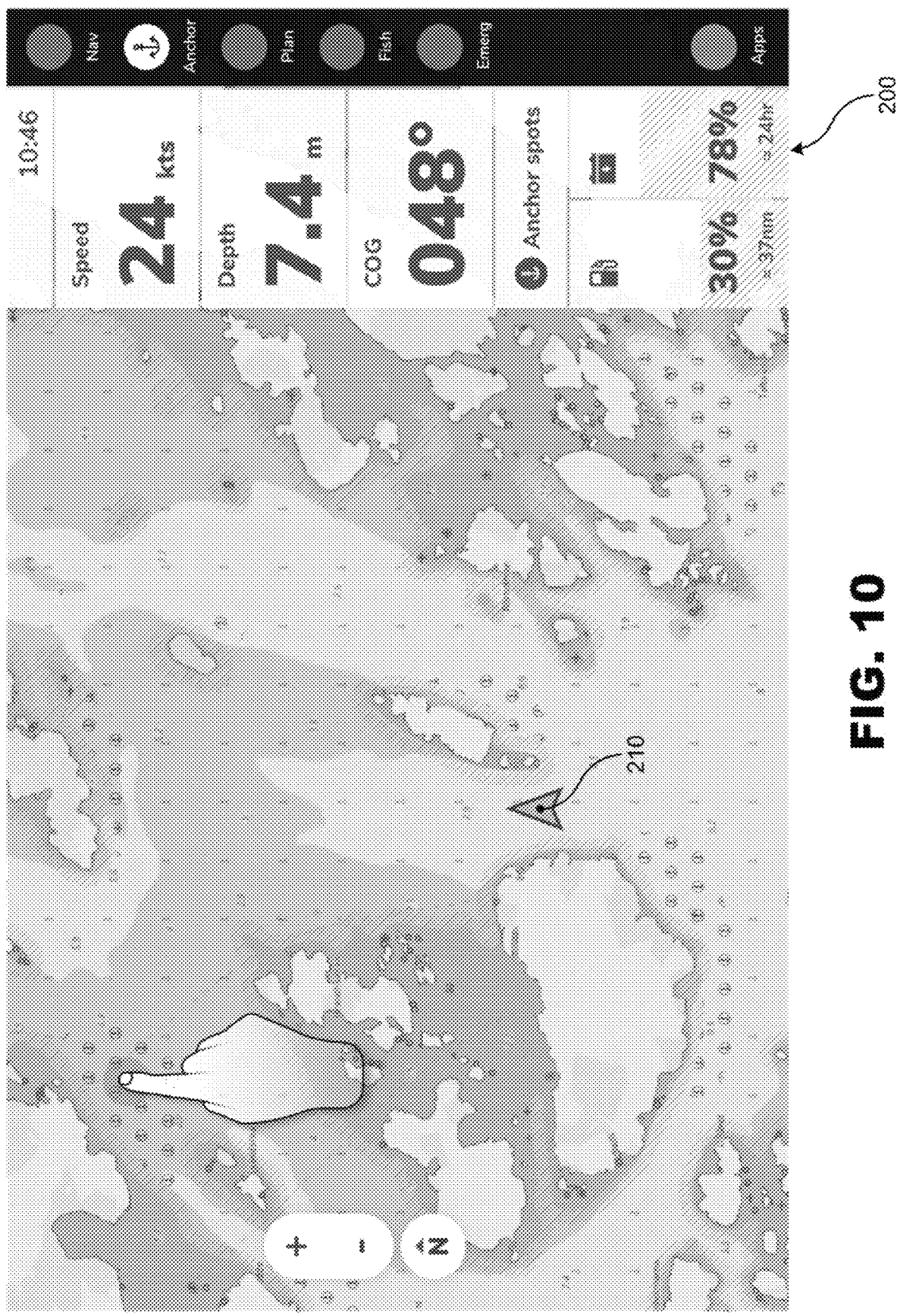
Figure 11:
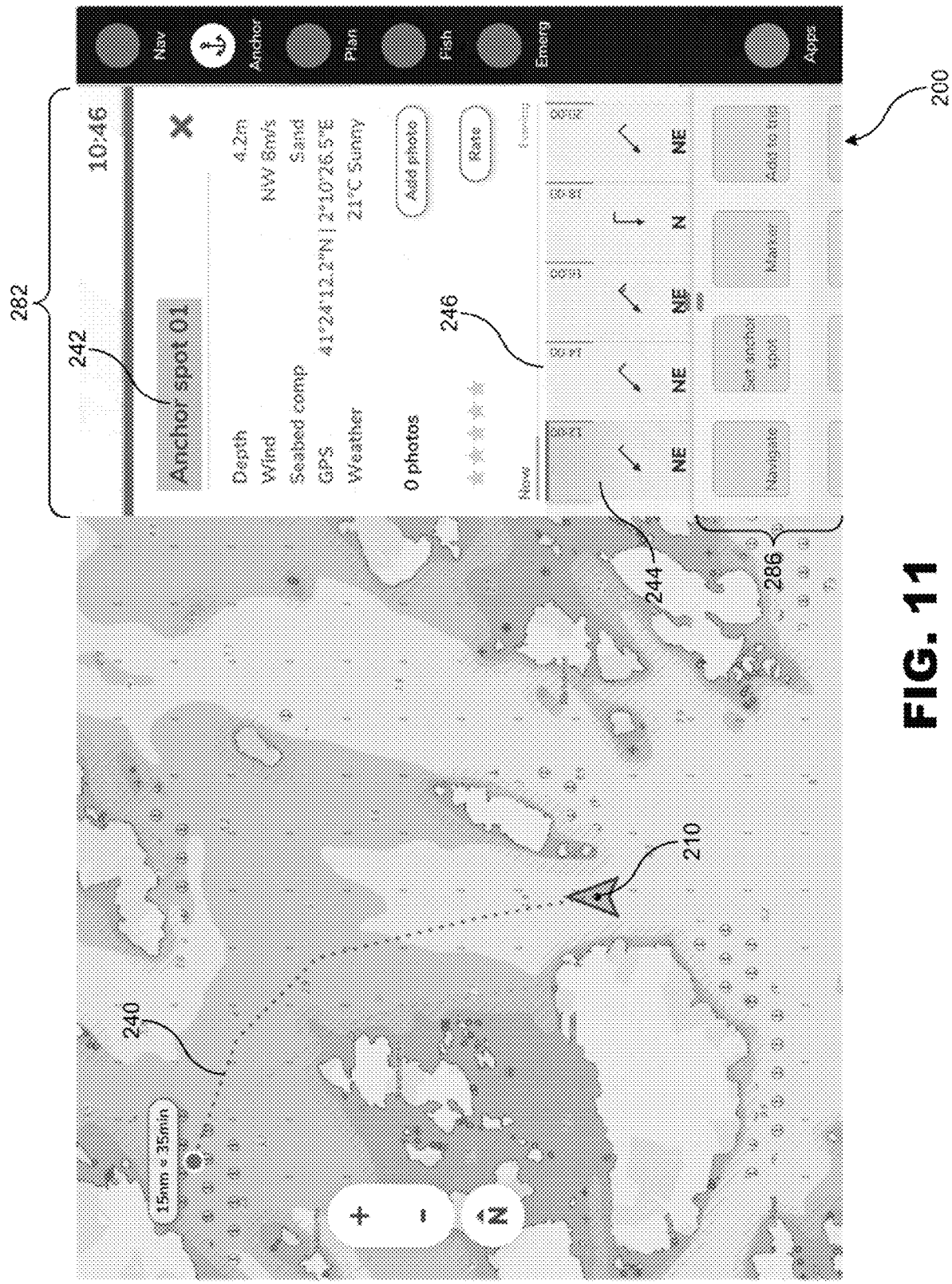
Figure 12:
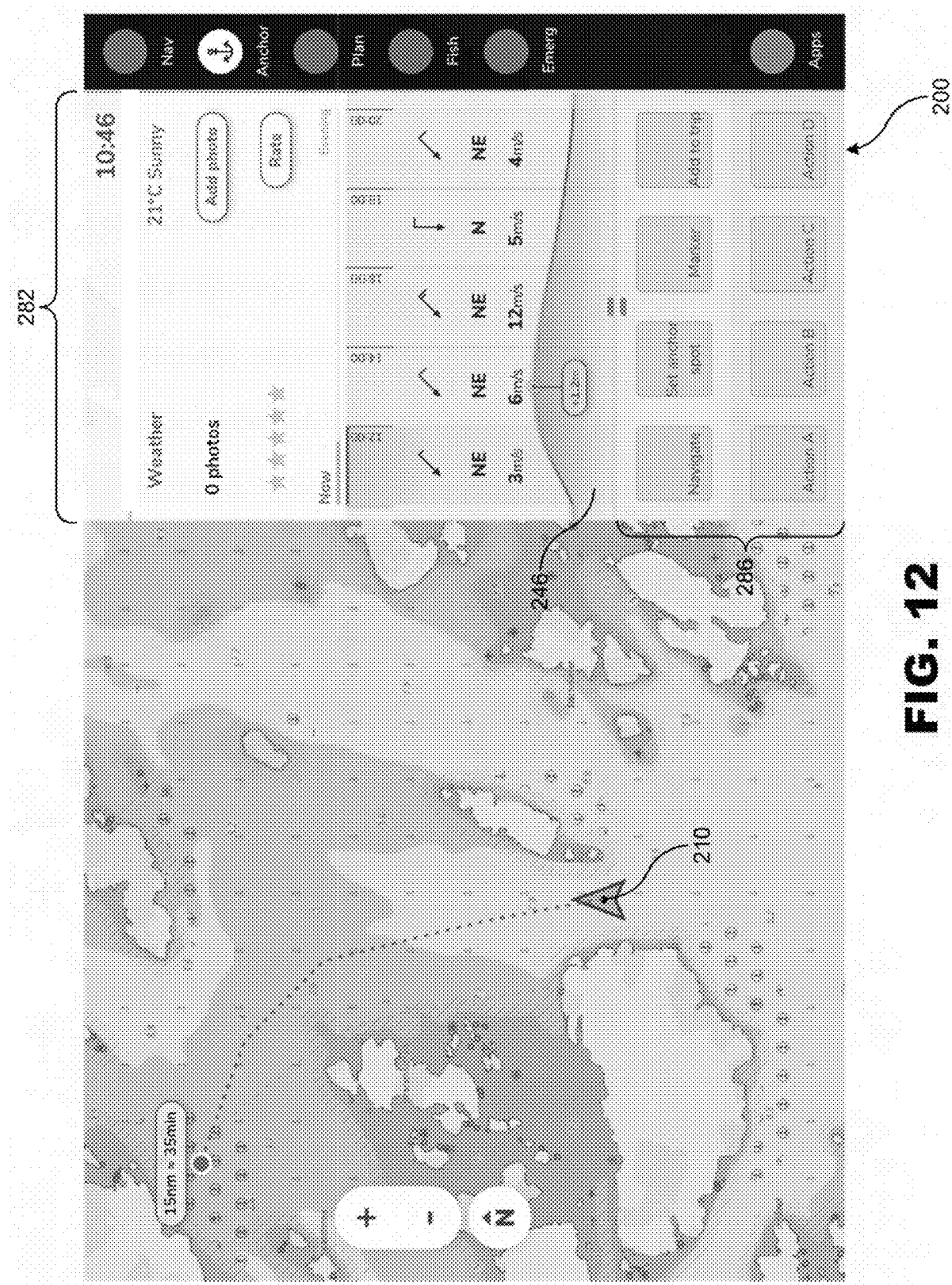
Figure 13:
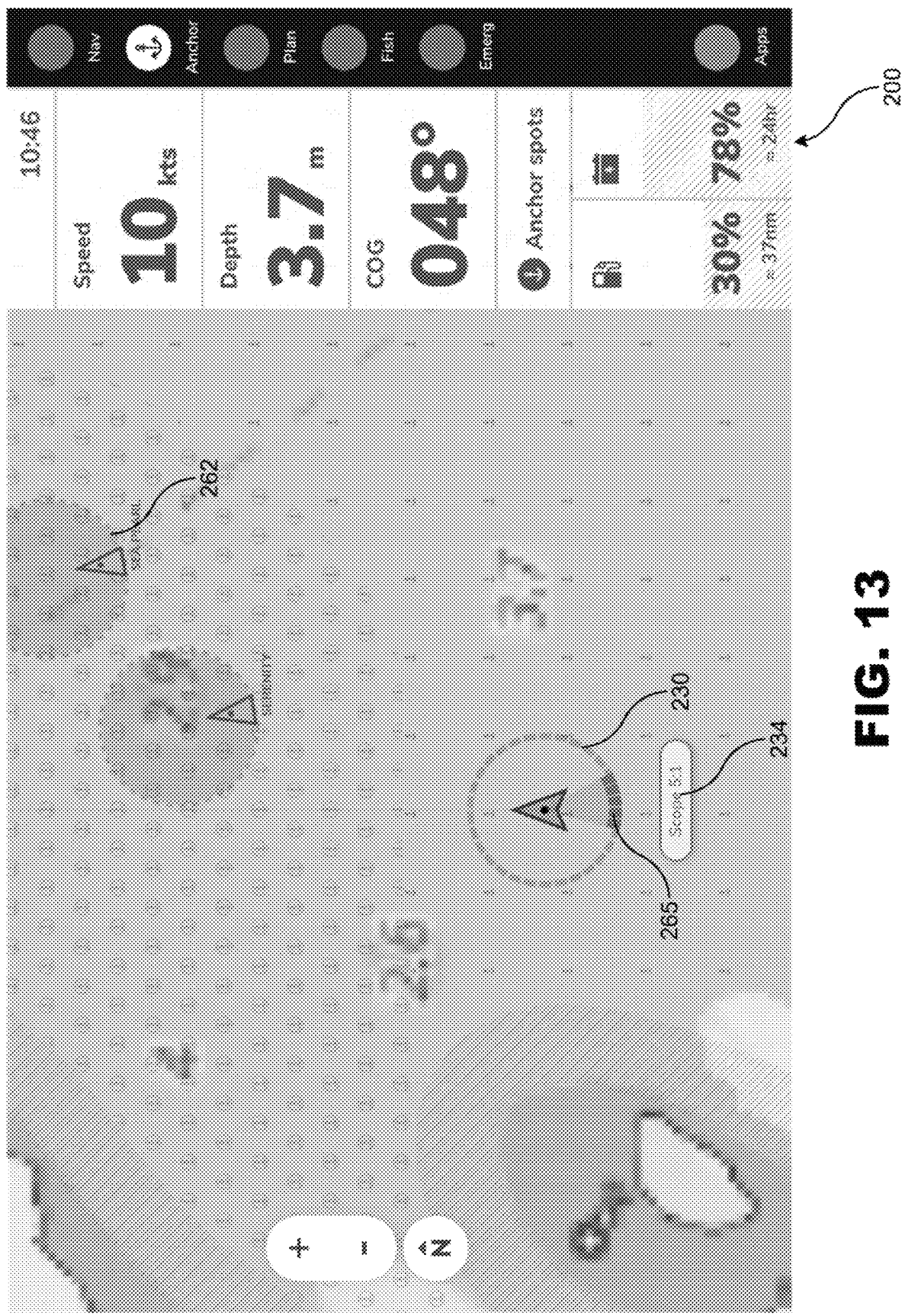
Figure 14:
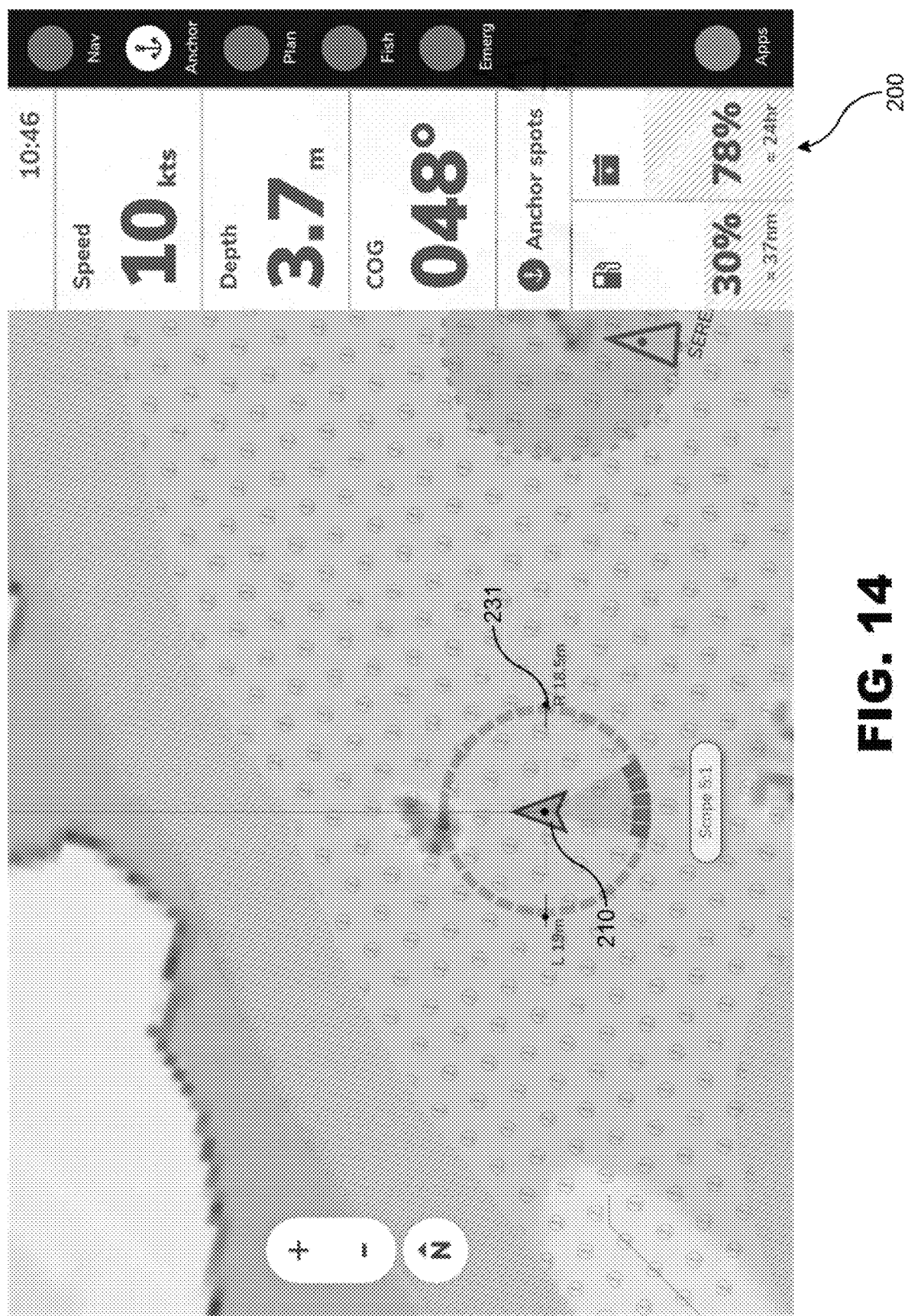
Figure 15:
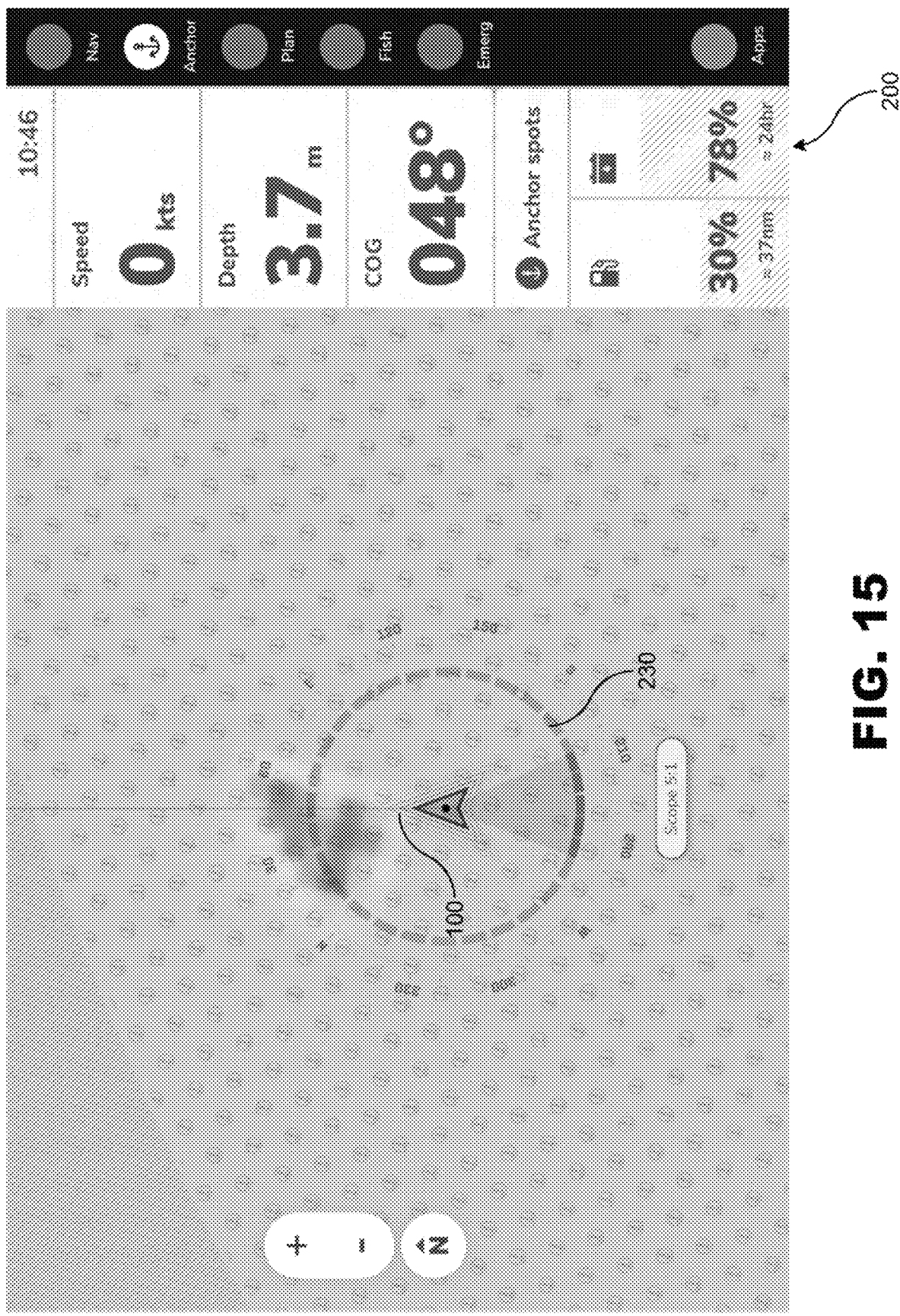
Figure 16:
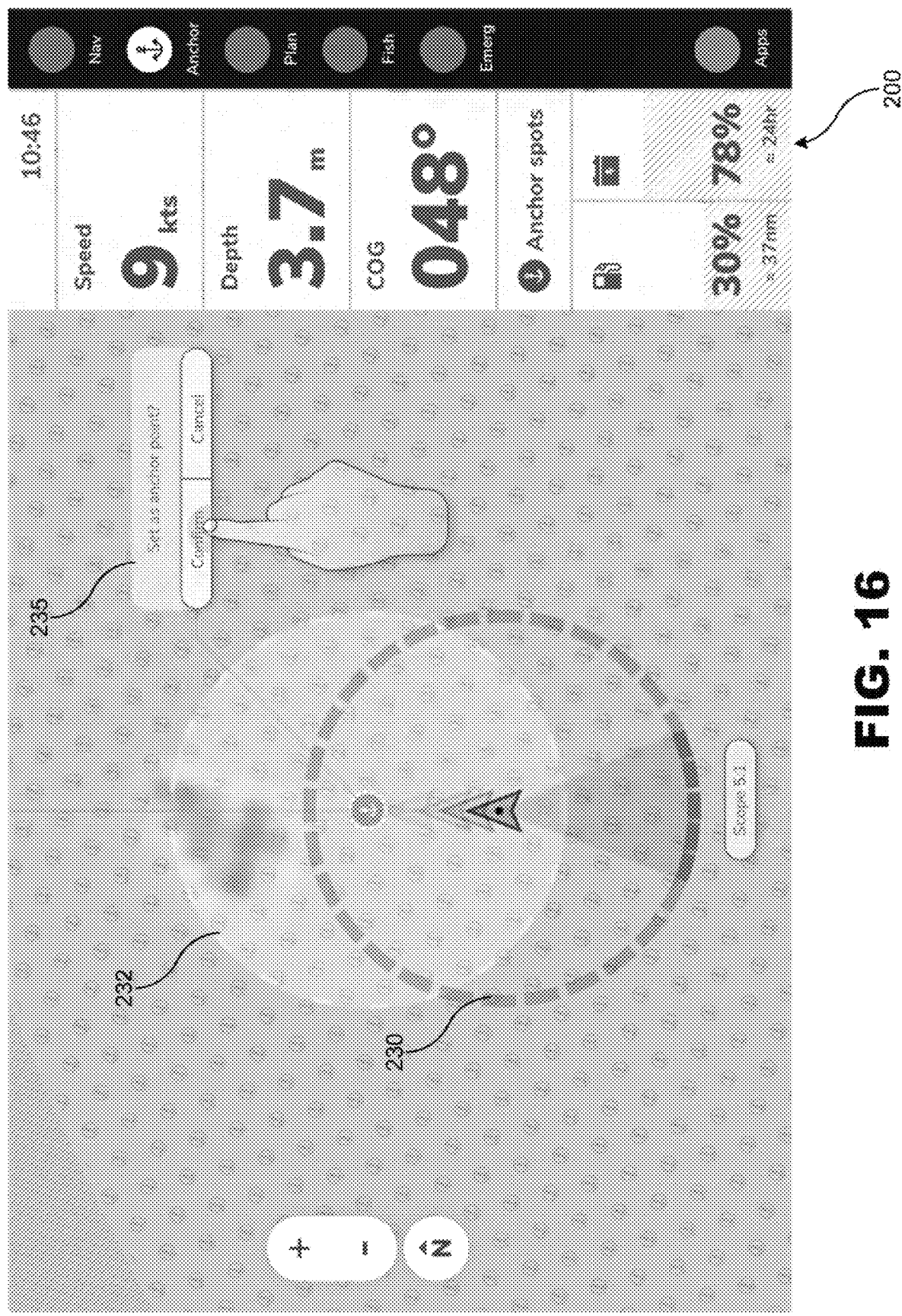
Figure 17:
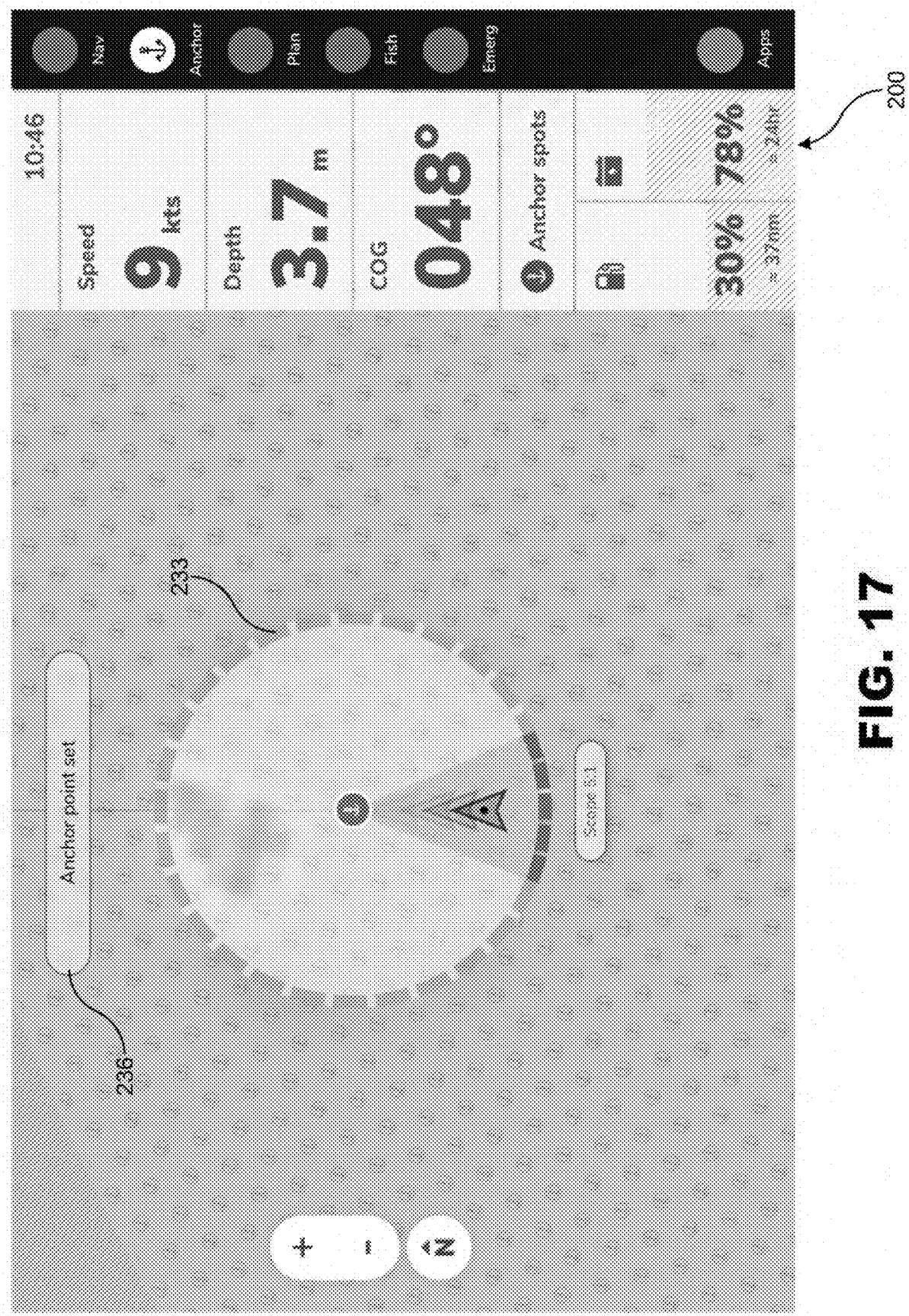
Figure 18:
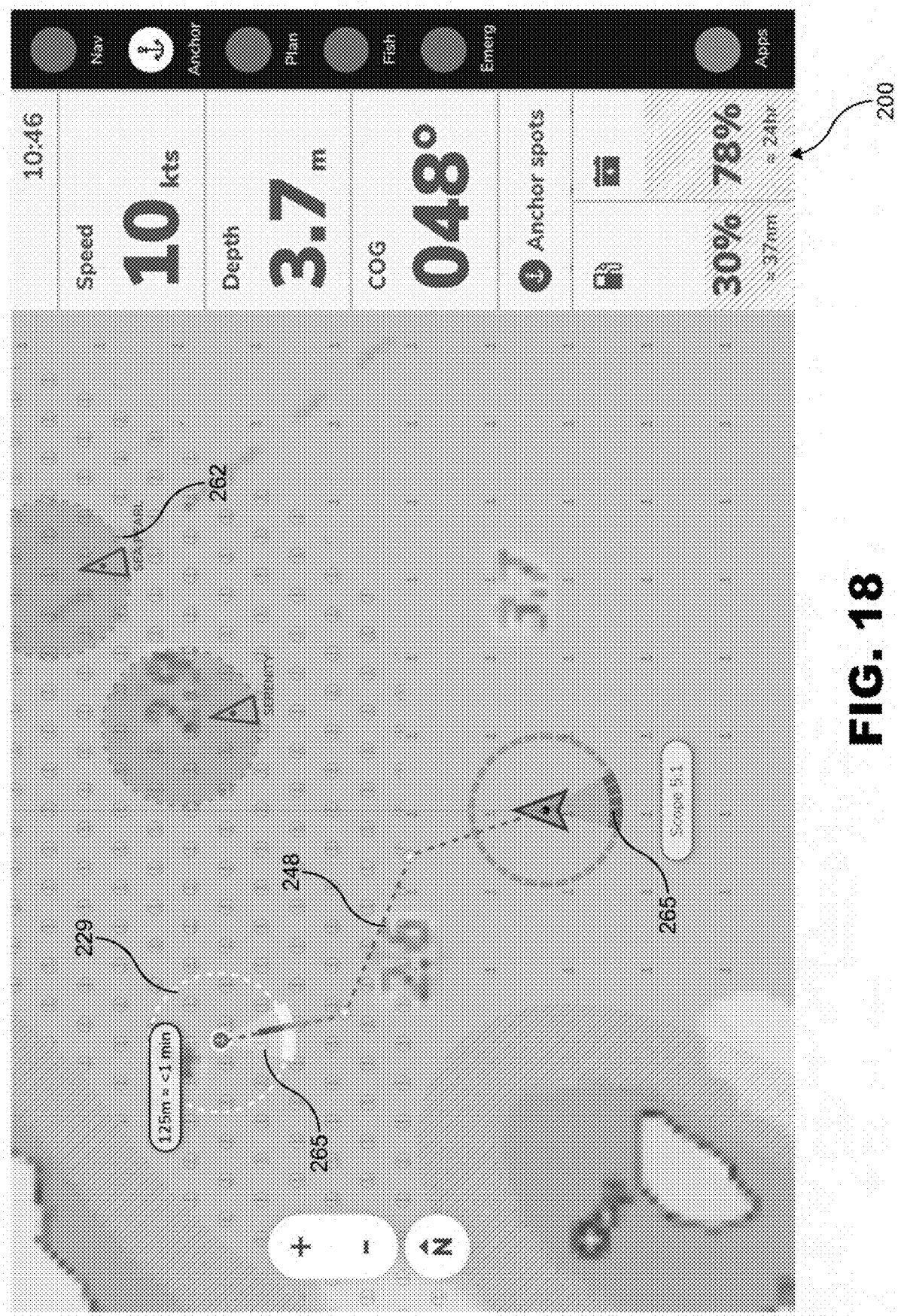
Figure 19:
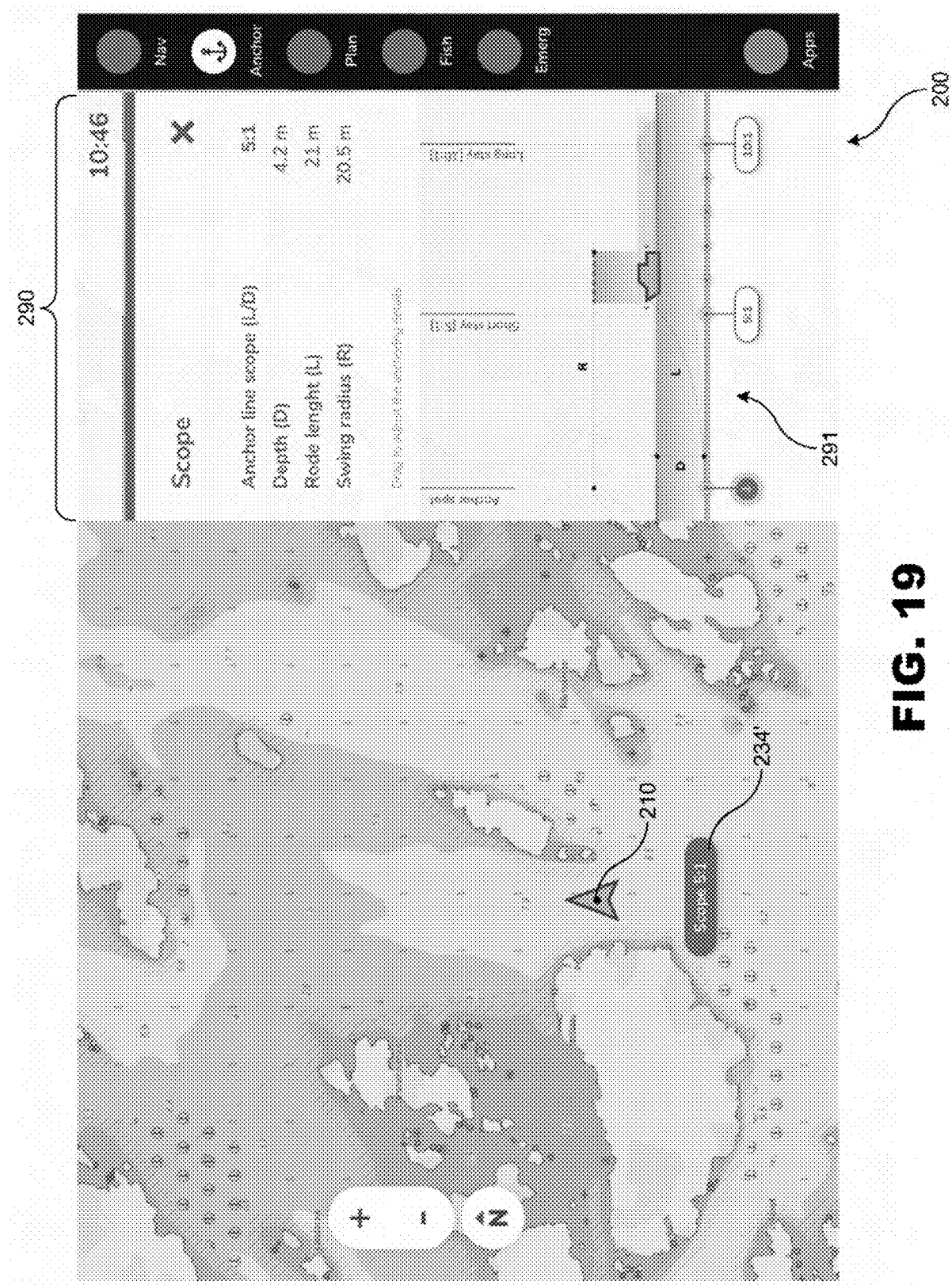
Figure 20:
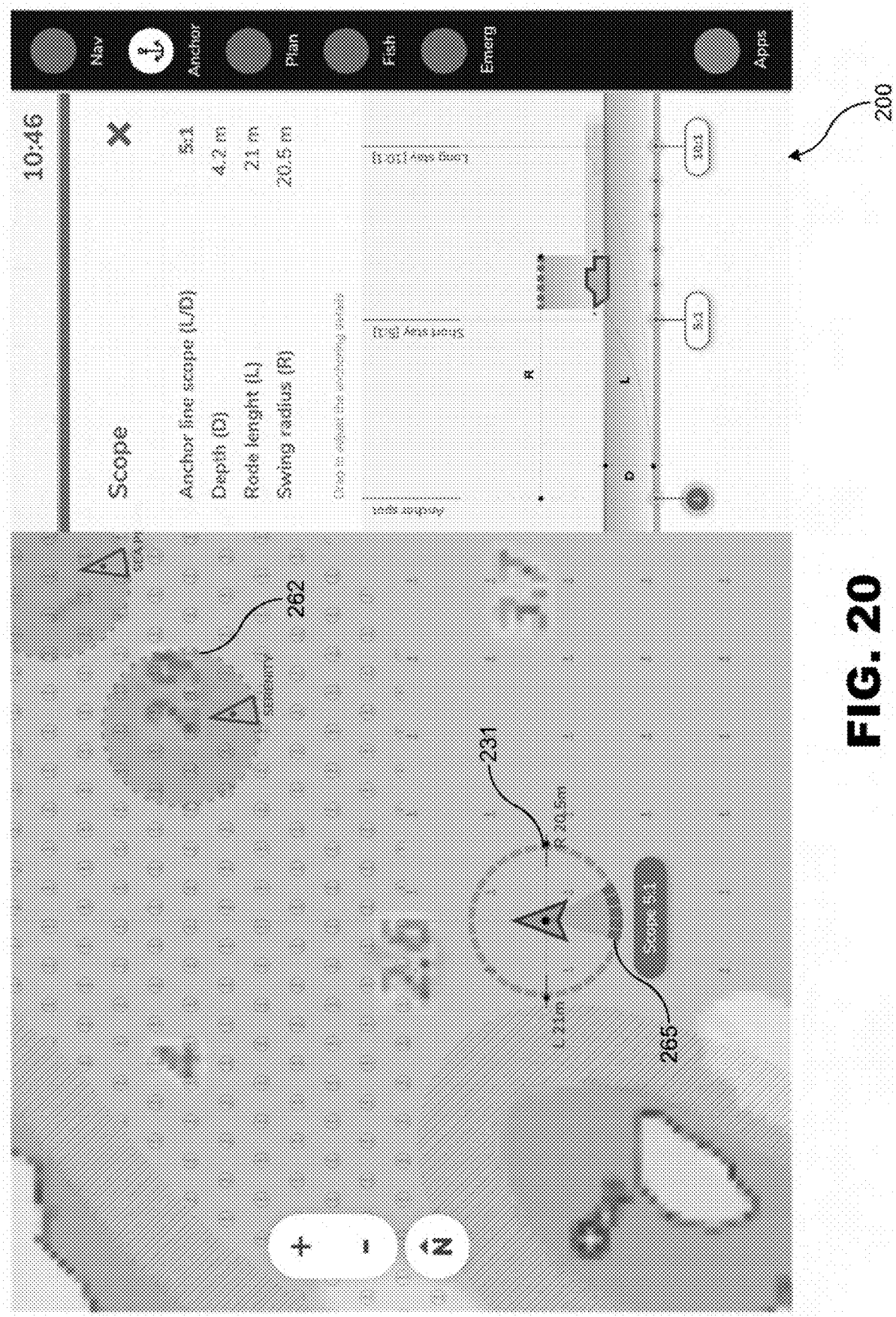
Figure 21:
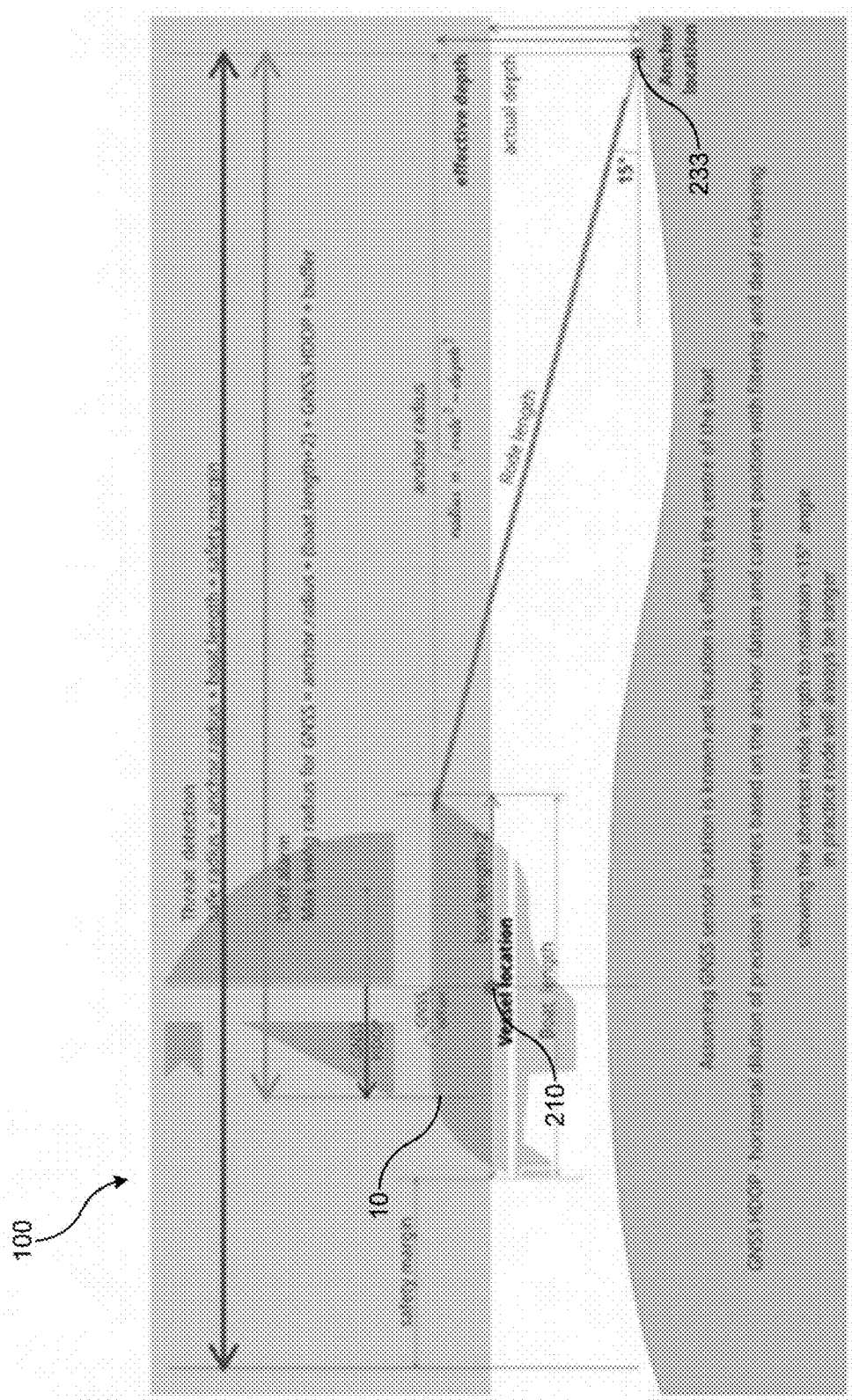
Figure 22:
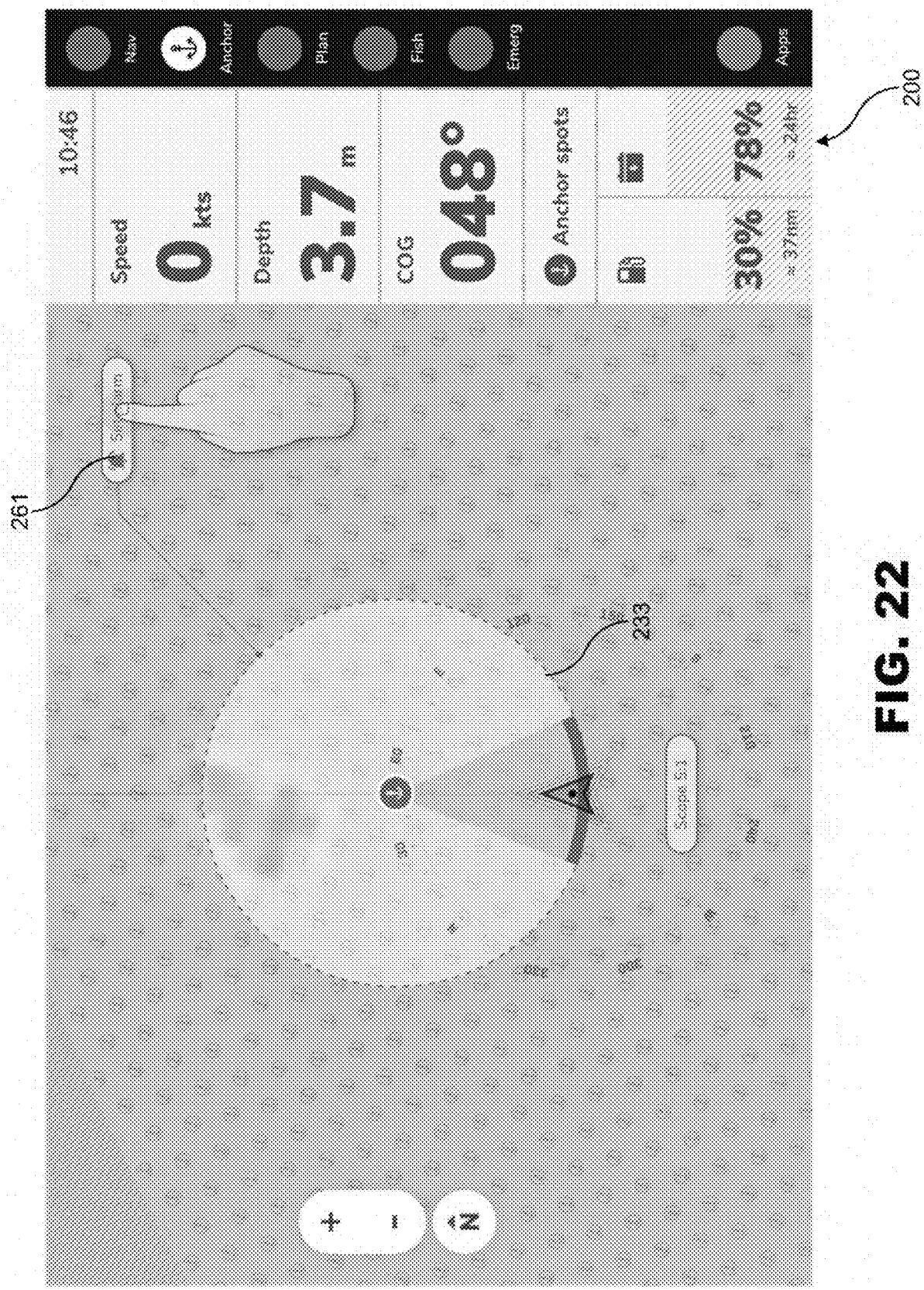
Figure 23:
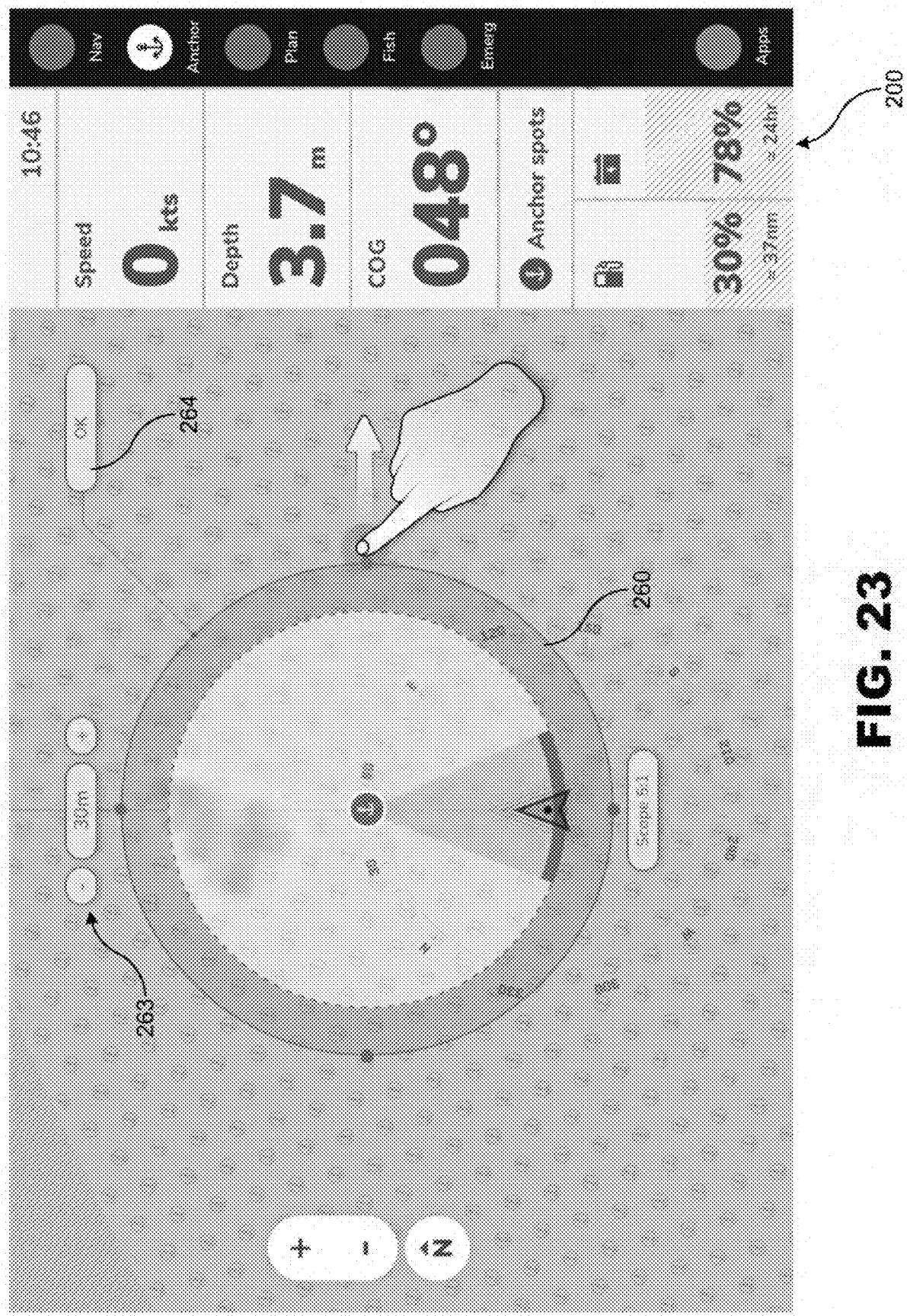
Figure 24:
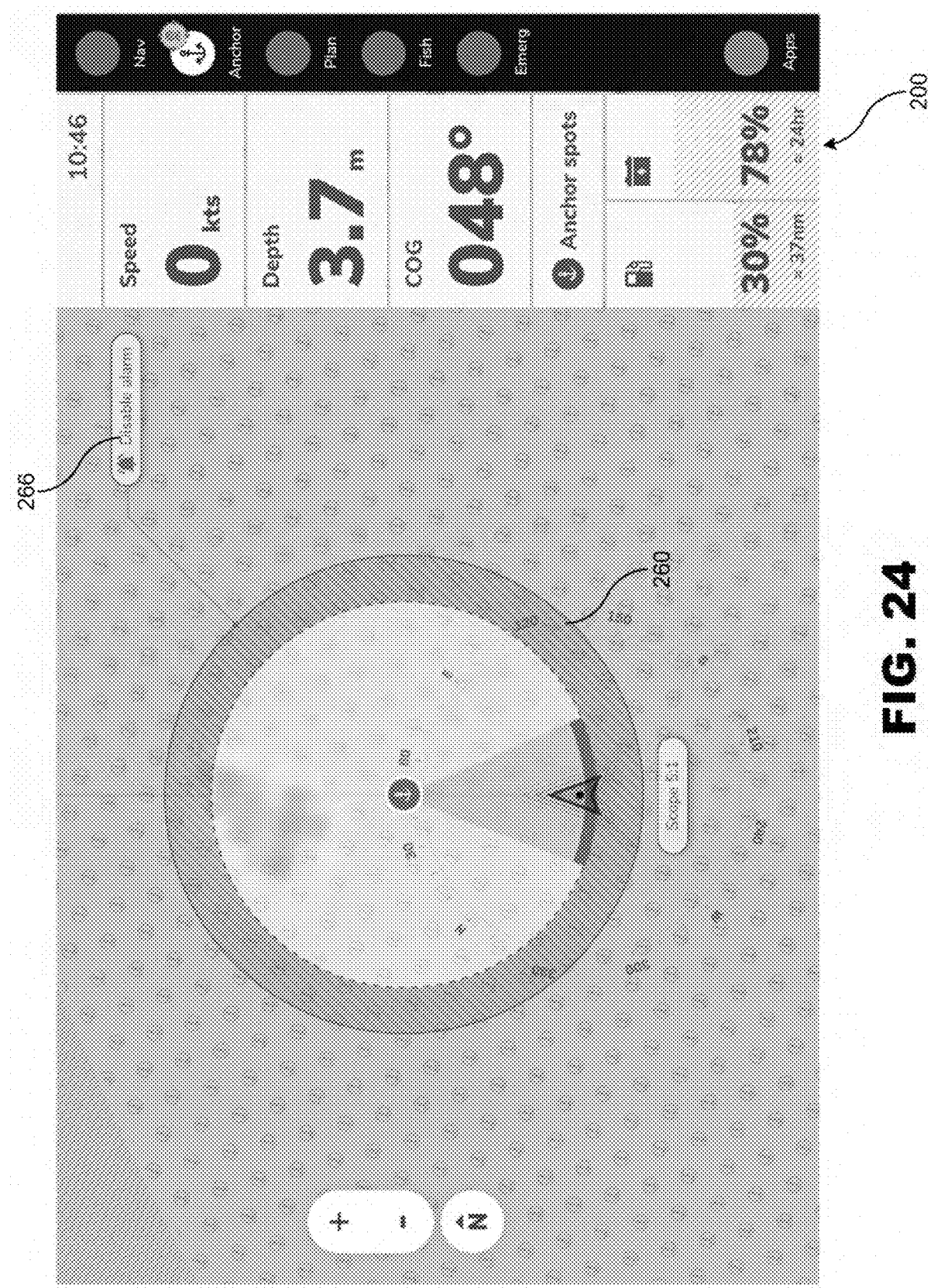
Figure 25:
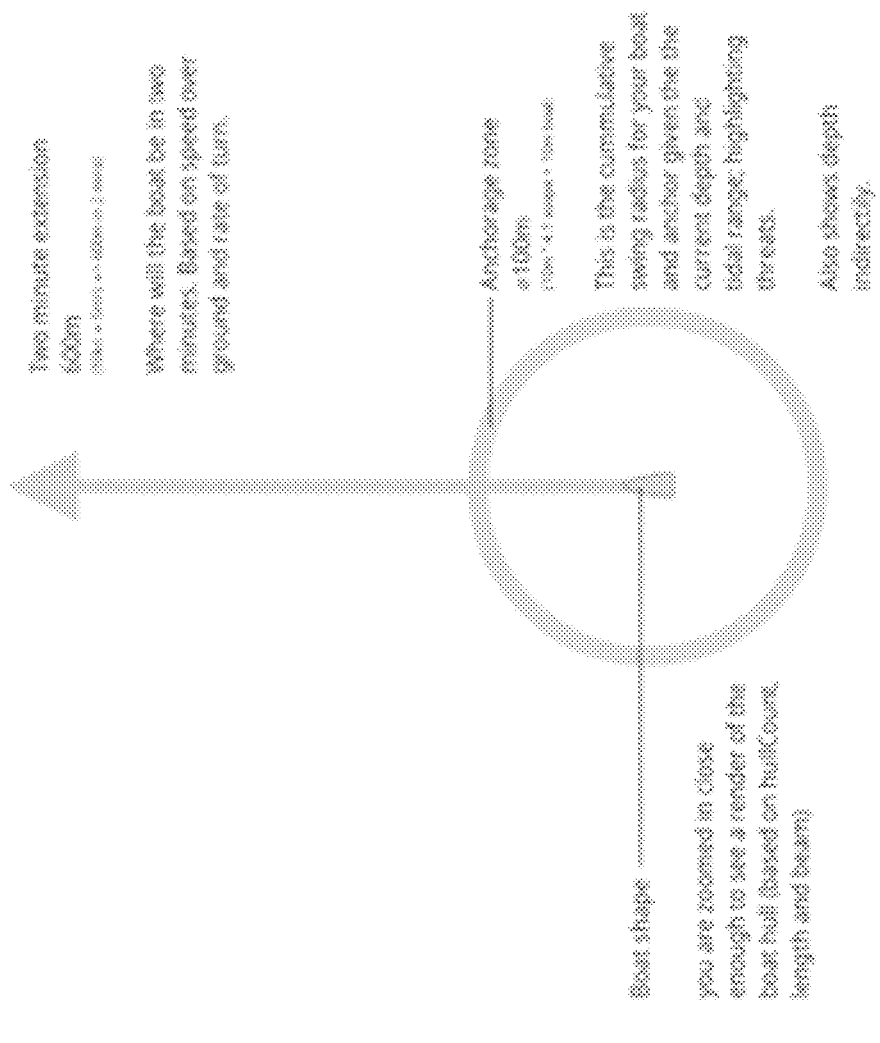
Figure 25:
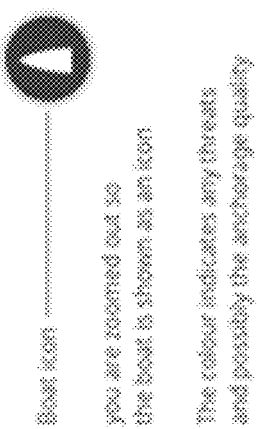
Figure 26:
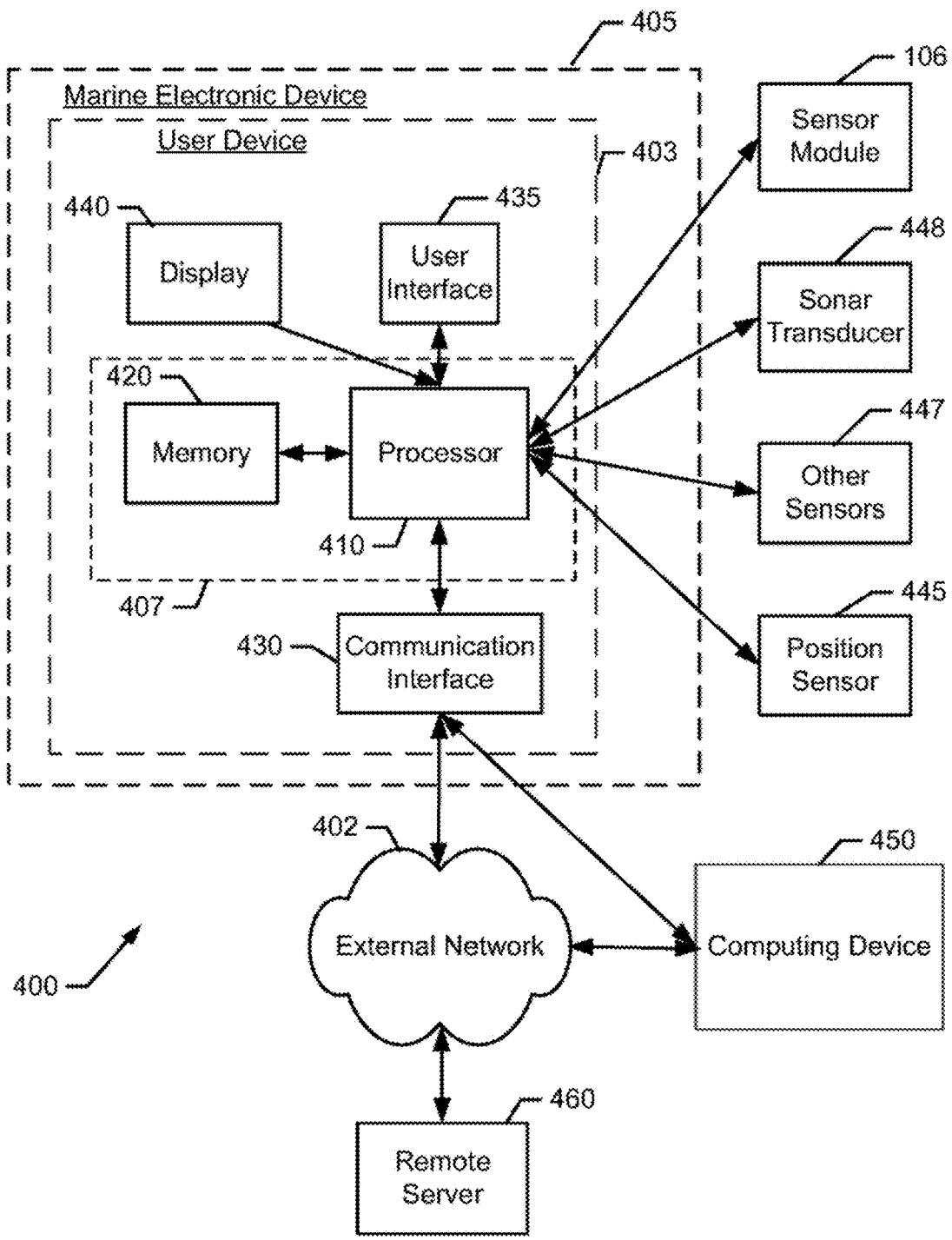
Figure 27:
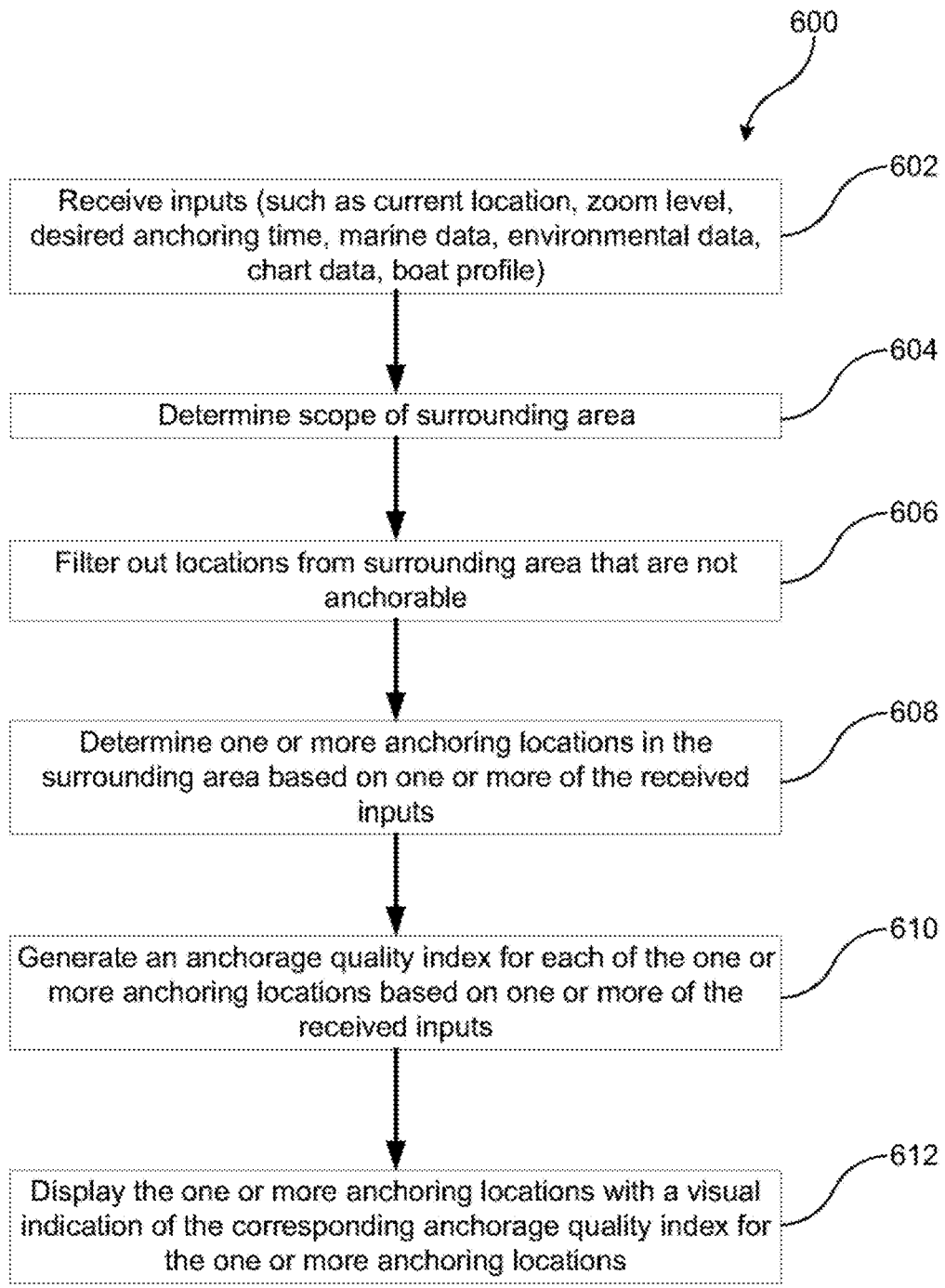
Figure 28:
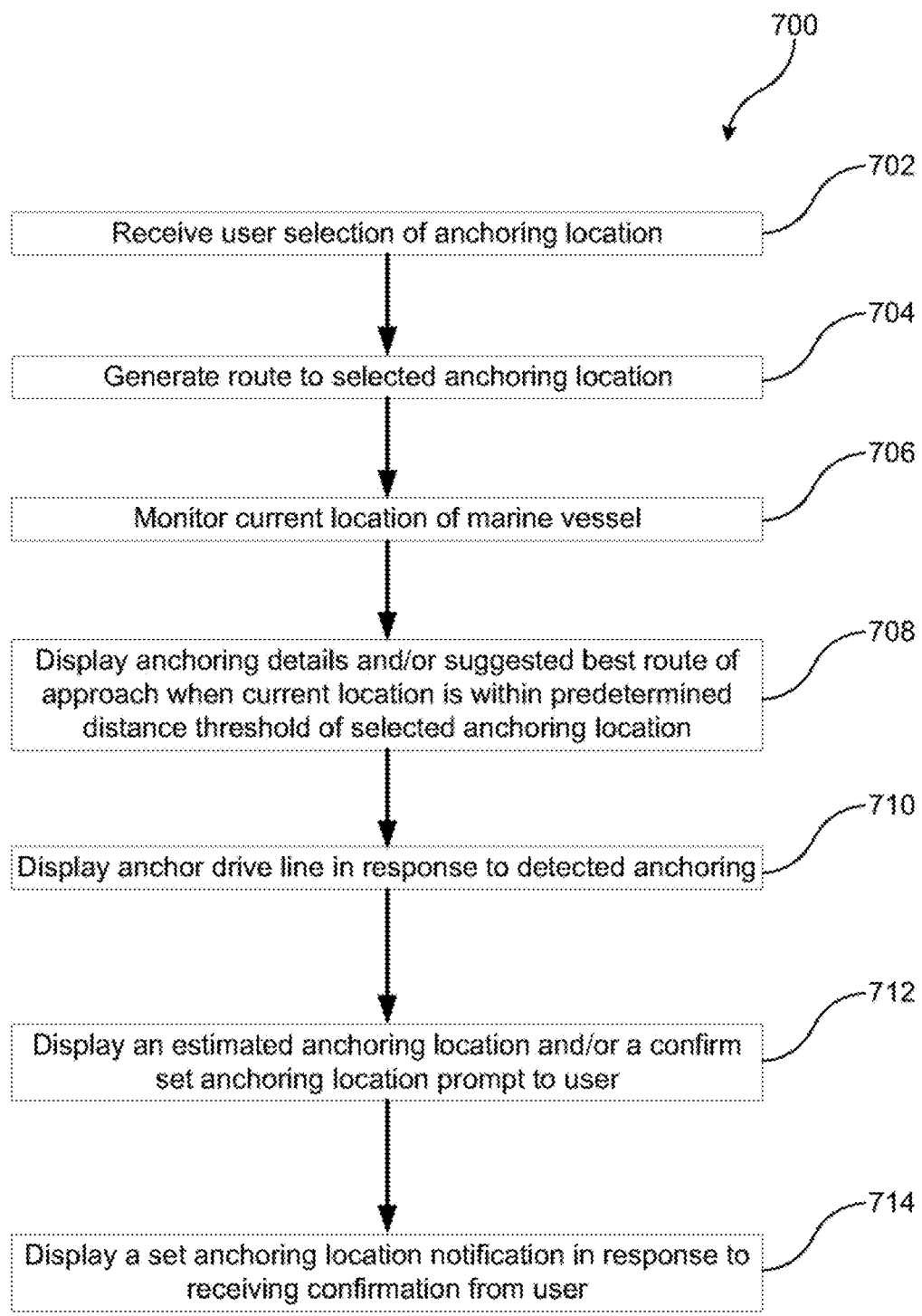
Figure 29:
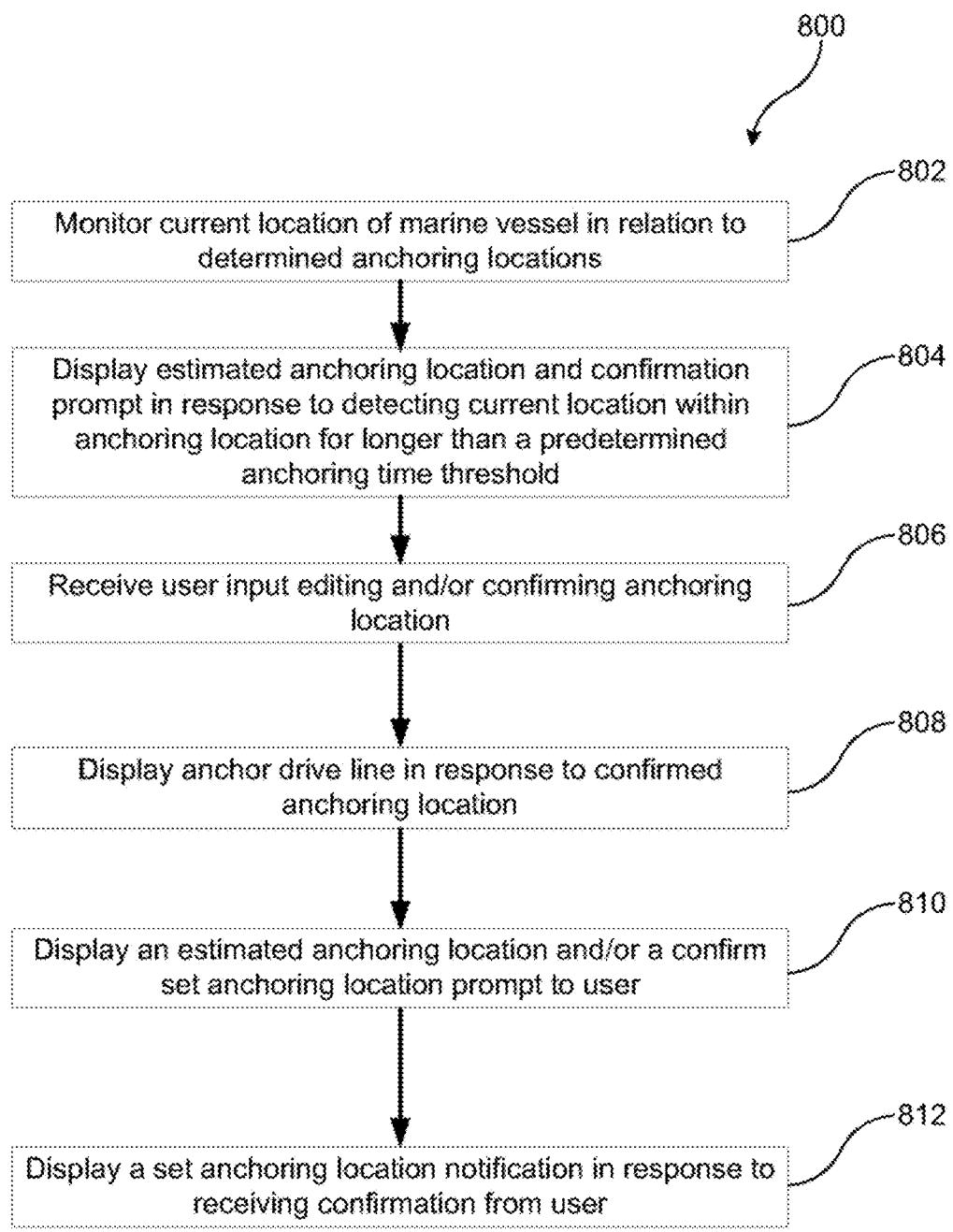
Figure 30:
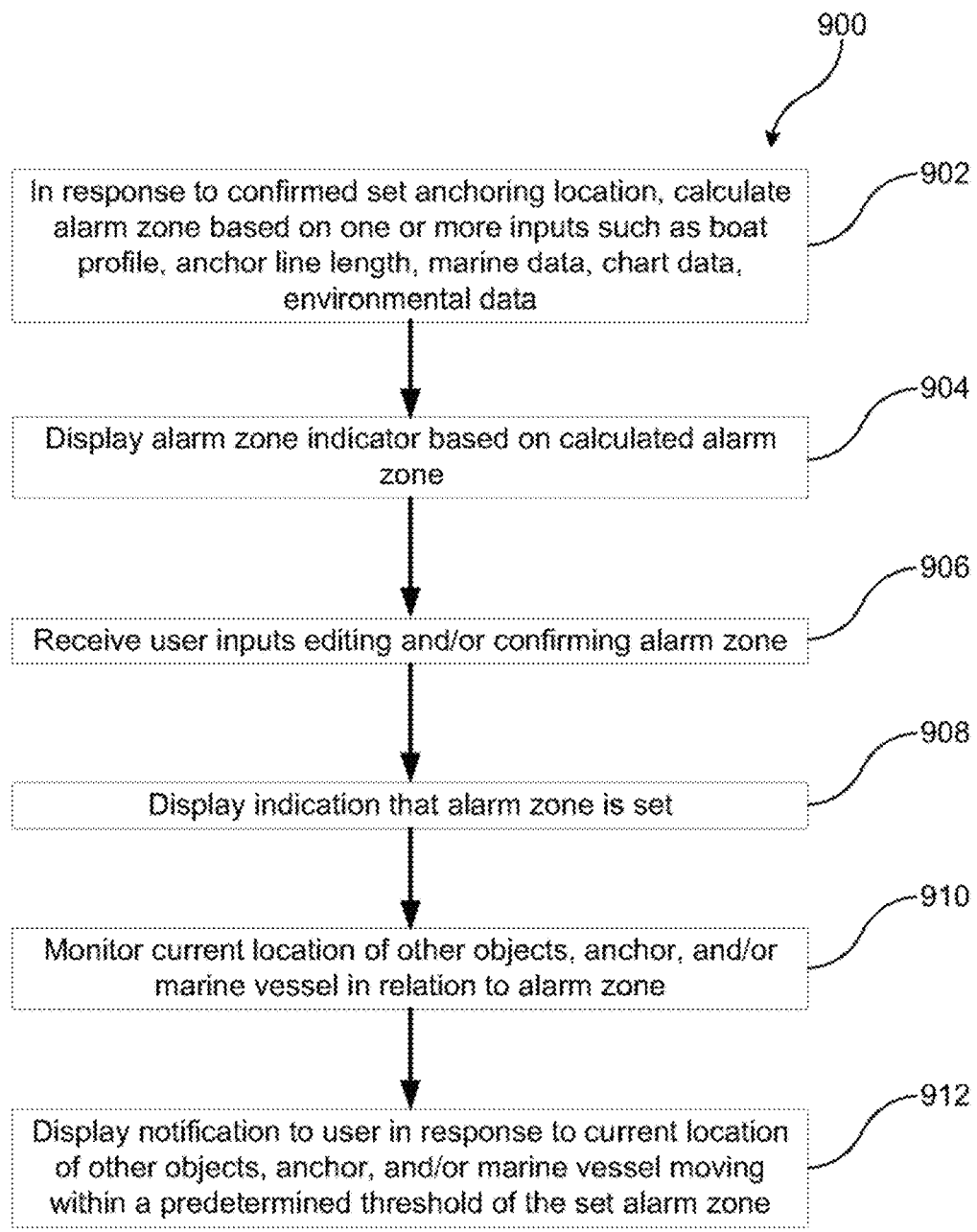

Having thus described embodiments of the present disclosure in general terms, reference will now be made to the accompanying drawings, which are not necessarily drawn to scale, and wherein:

FIG. 1 illustrates an example marine vessel with a navigation system, marine system, anchor system, and multi-function display attached, in accordance with some embodiments discussed herein;

FIG. 2 shows an example user interface with dynamically generated anchoring data on a map including suggested anchoring locations with visual indications of anchorage quality, in accordance with some embodiments discussed herein;

FIG. 3 shows the user interface of FIG. 2 with an environmental data overlay selected, in accordance with some embodiments discussed herein;

FIG. 4 shows another example user interface including a heat map of anchoring locations overlaid on a topographical satellite map, in accordance with some embodiments discussed herein;

FIG. 5 shows the user interface of FIG. 4 with changes to the heat map based on updated environmental data, in accordance with some embodiments discussed herein;

FIG. 6 shows an enlarged section of the user interface of FIG. 4 with the heat map focused on a tidal exclave, in accordance with some embodiments discussed herein;

FIG. 7 shows another example user interface including circular representations of suggested anchoring locations with a color scale for the visual indication of anchorage quality, in accordance with some embodiments discussed herein;

FIG. 8 shows the user interface of FIG. 2 with the anchoring locations list side menu selected, in accordance with some embodiments discussed herein;

FIG. 9 shows the user interface of FIG. 2 with the one of the anchoring locations selected to reveal the anchoring location details menu, in accordance with some embodiments discussed herein;

FIG. 10 shows the user interface of FIG. 2 indicating a user selecting a spot on the map for a new anchoring location, in accordance with some embodiments discussed herein;

FIG. 11 shows the user interface of FIG. 10 with automatic route data indicated and the anchoring location details side menu activated after selection of the new anchoring location, in accordance with some embodiments discussed herein;

FIG. 12 shows the anchoring location details side menu of FIG. 11 with an anchoring time adjustor and corresponding environmental data, in accordance with some embodiments discussed herein;

FIG. 13 shows the user interface of FIG. 2 automatically indicating a new anchoring location based on detected motion of the marine vessel, in accordance with some embodiments discussed herein;

FIG. 14 shows the user interface of FIG. 13 with a manual anchoring location adjustor, in accordance with some embodiments discussed herein;

FIG. 15 shows the user interface of FIG. 13 indicating movement of the marine vessel, in accordance with some embodiments discussed herein;

FIG. 16 shows the user interface of FIG. 13 requesting confirmation of the detected anchoring location, in accordance with some embodiments discussed herein;

FIG. 17 shows the user interface of FIG. 16 indicating that the anchor of the marine vessel has been deployed at the anchoring location, in accordance with some embodiments discussed herein;

FIG. 18 shows the user interface of FIG. 11 indicating that the marine vessel is approaching the selected anchoring location, in accordance with some embodiments discussed herein;

FIG. 19 shows the user interface of FIG. 18 with an anchor setting side menu activated, in accordance with some embodiments discussed herein;

FIG. 20 shows the user interface of FIG. 19 with the drift data of nearby anchored marine vessels indicated, in accordance with some embodiments discussed herein;

FIG. 21 is a diagram showing example alarm zone settings for the marine vessel, in accordance with some embodiments discussed herein;

FIG. 22 shows the user interface of FIG. 17 indicating that the marine vessel is anchored and prompting the user to set an alarm zone, in accordance with some embodiments discussed herein;

FIG. 23 shows the user interface of FIG. 22 indicating the user resizing the alarm zone, in accordance with some embodiments discussed herein;

FIG. 24 shows the user interface of FIG. 22 indicating that the marine vessel has breached the alarm zone and prompting the user to disable the set alarm zone, in accordance with some embodiments discussed herein;

FIG. 25 shows example user interface aspects for the anchoring and alarm zone of a marine vessel, in accordance with some embodiments discussed herein;

FIG. 26 shows a block diagram illustrating an example system architecture, in accordance with some embodiments discussed herein;

FIG. 27 illustrates a flowchart of an example method for determining one or more anchoring locations and a corresponding anchorage quality for each, in accordance with some embodiments discussed herein;

FIG. 28 illustrates a flowchart of an example method for setting an anchoring location, in accordance with some embodiments discussed herein;

FIG. 29 illustrates a flowchart of an example method for detecting an anchoring location, in accordance with some embodiments discussed herein; and FIG. 30 illustrates a flowchart of an example method for monitoring a marine vessel at a set anchoring location, in accordance with some embodiments discussed herein

DETAILED DESCRIPTION

Exemplary embodiments of the present disclosure will be described more fully hereinafter with reference to the accompanying drawings, in which some, but not all embodiments of the present disclosure are shown. Indeed, the present disclosure may be embodied in many different forms and should not be construed as limited to the exemplary embodiments set forth herein; rather, these embodiments are provided so that this disclosure will satisfy applicable legal requirements. Like reference numerals refer to like elements throughout.

Embodiments of the present disclosure provide systems and methods for anchoring assistance on a marine vessel (e.g., watercraft, boat, ship). Such example embodiments enable a user to receive suggestions for where, when, and how to anchor using onboard marine systems. This provides advantages in convenience and safety. For example, a user may not have to be an experienced boater in order to safely anchor a marine vessel in an appropriate location for a desired activity (e.g., fishing, going ashore, camping overnight).

Anchoring the vessel is one of the things that people new to boating struggle with the most. Wind, land and seabed topography, water depth, tides, currents, vessel type, and anchor type may all come into consideration when choosing a place to anchor. People are nervous while sleeping onboard or away from their marine vessel that the marine vessel may drift off position. The disclosed systems and methods provide for automation within anchoring functionalities to improve users' experiences and assure safety.

FIG. 1 illustrates an example marine vessel 10 on a body of water 11 in connection with various system embodiments described herein. An example system 100 may include a display 110 (e.g., multi-function display (MFD)) at the helm of the marine vessel 10), a marine system 120 (e.g., a sonar system), a navigation system 130 for determining the current location of the marine vessel 10, an anchoring system 140, and/or one or more marine devices (e.g., radar system 150, propulsion system used for propulsion and/or steering).

The marine vessel 10 may include a gasoline/diesel/electric inboard motor as part of the propulsion system. The marine vessel 10 may use one or more outboard motors, inboard motors, thrusters, jets, pods, trolling motors, or any other type of marine motor or engine for propulsion. The motors may be operated manually or by autopilot units as part of or in communication with the navigation system 130. An autopilot unit may control the direction and speed of the motor.

In some embodiments, the system 100 may include a controller (e.g., multi-functional display (MFD), processor, computer, marine electronics hub) onboard or otherwise associated with the marine vessel 10, as shown in the schematic diagram of FIG. 26. The controller may be configured to control operations of one or more marine devices (e.g., sonar system 120, propulsion system, radar system 150, marine display 110, anchoring system 140, navigation system 130). The controller may be in communication with one or more sensor modules (e.g., via wired and/or wireless connections). The sensor module may transmit signals to the controller indicating a detected condition, event, and/or user input.

In some embodiments, the controller may be an assembly or system of multiple processors and/or circuitry distributed across various devices. As such, actions taken by the controller (e.g., determining, transmitting, receiving, generating, comparing) may each occur on different devices or using multiple components.

Many variations of the system 100 are possible. For example, the system 100 may include or be in communication with one or more marine devices. Non-limiting examples of the one or more marine devices include a propulsion system, engine, steering system, gas-powered or electric trolling motor, outboard motor, inboard motor, sonar system, radar system, fish finder, navigation system, GPS, autopilot, plotter, anchor system, lighting, pumps, electrical power system, radio, audio system, digital switching, displays, HVAC, fuel system, etc.

Example Anchoring Location Determination Systems and Display

In some embodiments, the systems and methods disclosed herein may provide a user with information regarding where to anchor (e.g., latitudinal and longitudinal coordinates for points and/or regions). For example, the disclosed systems and methods may enable a user to find, create, and/or navigate to anchoring locations based on chart data (e.g., chart land and bottom topography from nautical electronic charts or other map/chart data, electronic charts or other sources for tides and currents data), marine data (e.g., sonar data for depth and seabed composition), real-time data (e.g., weather forecast, sensors, GPS position, radar, AIS vessel positions), crowd-sourced data (e.g., ratings, reviews, recommendations), and/or user inputs (e.g., desired anchoring time/activity, information particular to marine vessel 10). In some embodiments, the system 100 may utilize a number of factors to suggest one or more anchoring locations to a user. In such embodiments, the one or more anchoring locations may include visual indications of an anchorage quality index for each anchoring location. In this way, the user may choose from a number of appropriate and safe anchoring locations based on dynamic data thereby minimizing any required anchoring knowledge or manually applied expertise.

In some embodiments, the system 100 may be provided as an app, algorithm, or other software for a multi-function display (MFD). As shown in FIG. 1, the system 100 may include a display 110 and a navigation system 130. In such embodiments, user inputs may be made via the display 110 (e.g., MFD at helm of marine vessel 10 in FIG. 1, display on user's mobile media device).

Anchoring tasks or activities may require the aggregation of several data points and sources of information to successfully identify appropriate anchoring locations that are safe or ideal for anchoring the marine vessel 10 securely. In some embodiments, the system 100 may include programming that causes the processor to iterate through multiple procedures and/or calculations in determining one or more anchoring locations for the marine vessel 10 within the surrounding area (e.g., the set of locations within a region limited by minimum and maximum latitudes and longitudes in four corners set by the zoom level). As a non-limiting example, in order to streamline processing speeds, the system 100 may first filter out any non-suitable locations from the surrounding area based on static limits and stored data (e.g., by first ignoring land and removing all regions from the remaining surrounding area with depths greater than a maximum allowable anchoring depth). The system 100 may then continue refining the remaining set of locations based on dynamic, real-time, and/or external data. Other methods and procedures are possible. If the user changes a data input (e.g., anchoring time), the system 100 may determine the updated anchoring locations based on the changed data input and update the display 110 accordingly.

In some embodiments, the system 100 may store various possible sets of anchoring locations based on multiple discrete values for certain commonly edited data inputs (e.g., anchoring time) in memory, such that the corresponding stored set of anchoring locations may be recalled and rendered in response to the changed data input instead of the processor having to restart the determining procedure. In this way, the user may rapidly change (e.g., "scrub through") editable data inputs and instantly view the resulting scenarios on the display 110 without experiencing a lag in rendering. This may advantageously enhance the user's understanding of the anchoring process by providing a dynamic interface from which the user receives seemingly continual feedback. Similar effects may be achieved by using fuzzy data sets and/or responsive functions.

The system 100 may use various data inputs (e.g., static and dynamic) to determine and display anchoring locations and associated data. The data inputs may be input manually by the user and/or automatically detected or received from an external source (e.g., connected sensors, internet server). For example, the data inputs may include user interface selections (e.g., activation of an anchoring view/app, zoom level for a map/chart on the display 110) relevant to the system 100 for determining what to cause the display 110 to show and/or the scope of the calculations to process.

The data inputs may include information about the marine vessel 10 (e.g., vessel length, vessel draft, beam, number of anchors, anchor line/chain/rope/rode length, amount of swing allowed). The information about the marine vessel 10 may be stored in the system 100 as part of a boat profile. The data inputs may include the current location of the marine vessel 10. In some embodiments, the navigation system 130 of the marine vessel 10 may include a GPS or other system for determining the location (e.g., latitude and longitude) of the marine vessel 10 at any point in time. The user may provide and/or the system 100 may detect anchor data (e.g., weight, type) such that the system 100 may suggest anchoring locations based on the seabed suitability of the available anchors, for example. Further data inputs may include wind, tide, seabed composition, seabed topography, bow height, scope (ratio), and/or drifting. The data inputs may be static in relation to a particular marine vessel (e.g., bow height) or dynamic in relation to the time and location (e.g., wind/weather data) or in relation to user selections (e.g., selected navigation, scope ratio, anchoring time). Some data inputs may have default values, formulae, or sources that may be editable by the user (e.g., anchor type, sonar data, weather information source), whereas others may be secured or more difficult to edit for safety or other reasons (e.g., maximum allowable anchoring depth). The data inputs may be appropriately grouped or categorized such that the system 100 may generate a dynamic heat map or other informational visualization (e.g., list, chart) of anchoring locations (e.g., Group A: wind, tide, seabed composition; Group B: seabed topography, scope (ratio); Group C: anchor type, number of anchors, line length, bow height). These data inputs may be user-provided values, previously stored as a boat profile, and/or automatically detected (e.g., via sensors, network data stream).

To utilize the system 100 for displaying anchoring data, the user may access an anchoring view from a list of apps and/or activity shortcuts 201 on the MFD. FIG. 2 is an example user interface 200 that may be shown on the display 110 of the system 100. FIG. 2 shows an example user interface 200 with dynamically generated anchoring data on a map including suggested anchoring locations (e.g., saved anchoring location 225, crowd-sourced anchoring location 227) with visual indications of anchorage quality (e.g., patterns A, B, C from legend indicating different types of regions 250, 252, 254).

As seen in FIG. 2, the dynamically generated anchoring data may include an indication of the current location 210 of the marine vessel 10 placed in the context of a map of the surrounding area (e.g., based on a zoom level data input). The map may be generated based on chart and/or other data. In such embodiments, the user may zoom in and out on the map (e.g., edit the zoom level data input) to better visualize the current location 210 of the marine vessel 10 in context to its surroundings. In some embodiments, the zoom level of the system 100 may be automatically set or reset to a default (e.g., to 16 (50 m)) when the anchoring view is selected or activated. In some embodiments, the zoom level may be used to dictate the scope of the area surrounding the current location 210 of the marine vessel 10 on the map in the anchoring view. Additionally or alternatively, the zoom level may be used by the system 100 as a data input (e.g., maximum and minimum latitudinal and longitudinal limits) for determining one or more anchoring locations, for example. The system 100 may automatically update the zoom level based on changes to the current location 210 of the marine vessel 10 (e.g., approaching shallows, approaching the end of a programmed route) and/or detected threats (e.g., approaching vessels).

The visual indications of anchorage quality of the anchoring locations generated by the system 100 may take the form of a heat map as shown in FIG. 2. A heat map may be any data visualization of one or more regions (e.g., with a shape and/or relative positioning) including some visual indication of type or characteristic (e.g., "heat") of each region. For example, the heat map within the user interface 200 may include (A) an indication of the best anchoring regions 250 (e.g., taking wind-shielding, tidal, and/or weather effects into account), (B) an indication of anchorable regions 252 (e.g., suitable for short stays, such as anchoring times under 5 hours), and (C) an indication of swing buffer 254 (e.g., peripheral range of rotation of the marine vessel from a set anchoring location). Although shown as patterns in FIG. 2, the indications may be shown in various colors (e.g., as seen in FIGS. 4-6), textures, densities, intensities, shading, etc., or combinations thereof.

The system 100 may generate the anchorage quality for each determined anchoring location based on a variety of factors. For example, the anchorage quality may be generated based on the water depth, seabed composition, tidal forecast, and/or weather data in relation to the characteristics of the marine vessel 10 (e.g., boat profile, anchor type) for the user's current selections (e.g., desired anchoring time). In some embodiments, the anchorage quality may be further affected by saved user ratings of the anchoring location and/or environmental threats (e.g., surface and underwater hazards) detected and saved to the location. Further, in some embodiments, the anchorage quality generated by the system 100 may be based on previously tracked events that have occurred at the anchoring location. For example, the system 100 may be connected (e.g., in a read/write capacity) to a networked database where anchoring location data beyond ratings from the user and other vessels may be aggregated and further processed/analyzed to help generate an anchorage quality index. In particular, the system 100 may track/monitor the actual drift of the marine vessel 10 while anchored at the set anchoring location in comparison with the predicted drift calculated for that anchoring location prior to anchoring and then upload the results to the database. In this way, the system 100 may be configured to continually improve and/or enhance the reliability and accuracy of the suggestions and recommendations based on the generated anchorage quality. In some embodiments, the system 100 may include a setting for the user to choose whether the system 100 generates the anchorage quality based on an overall absolute scale taking into account the anchoring locations within the database or a relative scale based on only the available anchoring locations determined within the surrounding area. The system 100 may include an option to customize a minimum anchorage quality threshold for filtering determined anchoring locations based on the database.

As shown in FIG. 2, the user interface 200 may include an anchored state badge or indicator 211 on the anchoring view icon within the list of apps and/or activity shortcuts 201 informing the user whether a set anchoring location has been confirmed for the marine vessel 10 (e.g., based on signals to/from the connected anchoring system 140 or the user's response to detected anchor deploying movements of the marine vessel 10). Likewise, the user interface 200 may include an alarm zone or geofence indicator that quickly informs the user whether an alarm zone for monitoring potential threats and/or drift of the marine vessel 10, once anchored, has been set.

In some embodiments, the user interface 200 may include an environmental data (e.g., weather, wind) overlay. FIG. 3 shows the user interface 200 of FIG. 2 with an environmental data overlay. Visual indications of the wind (e.g., particles 218) may be shown as a map overlay. In addition to the wind particles 218 shown in FIG. 3, the environmental data may be displayed in various other ways (e.g., as a color scale, cloud overlay, map of currents). The user interface 200 may include an option to change the weather data provider, such as within a settings menu. The user interface 200 may display a badge (e.g., in a settings or side menu) indicating if any data is cached or recently updated.

The user may access additional controls, such as overlays, layers, time sliders, etc. within one or more settings menus. In this way, the user may tweak and customize the settings to receive different, additional, or less information for an upcoming anchoring task from the anchoring view. In some embodiments, the user may select which layers or overlays to show on a map view for the selection of anchoring locations.

In some embodiments, the land portions of the anchoring map view may be rendered as satellite tiles on the display 110. FIG. 4 shows another example user interface 300 including a heat map of determined anchoring locations or zones in a color scale overlaid on a topographical satellite map. The anchoring map view may include topographical information about the land (e.g., 3D model of the landscape) to provide the user with a better understanding of the environment and possible wind-shielding effects. In some embodiments, where the heat map is shown as a color scale based on some or all of the data inputs, the color scale may range across a gradient indicating ideal anchoring regions at one end and non-ideal anchoring regions at the other end.

As shown in the user interface 300 of FIG. 4, the fuchsia anchor zone regions 350 indicate potential anchoring locations where it is safe to deploy the anchor of the marine vessel 10. The light pink swing buffer regions 354 indicate regions where anchors should not be deployed, but where it is safe for the marine vessel 10 to swing out over once secured in a set anchoring location within one of the fuchsia anchor zone regions 350. The user interface 300 may additionally show hazards or potential threats to avoid anchoring near (e.g., submerged hazards 360, surface hazards 362). In some embodiments, the user interface 300 may show the current location 310 of the marine vessel 10 as well as the corresponding suggested anchor type and anchor line length data 375 for anchoring at the current location 310. The user interface 300 may further show anchoring data related to the water depth at the current location 310 (e.g., 10 m depth (11 m effective depth)), the selected anchoring time and corresponding tide and depth range data (e.g., 4 hours+4 m tide range, 9 m-15 m depth of water), and/or details about the marine vessel 10 such as anchor weight (e.g., 20 kg), anchor line type (e.g., 10 mm diameter 1.9 kg/m chain), vessel length (e.g., 12 m), and/or selected scope/ratio (e.g., 4:1 scope).

In some embodiments, the user may change the desired anchoring time and/or refresh/update the data inputs to alter the heat map of the user interface 300. As shown in FIG. 5, the system 100 may provide a dynamic anchoring overlay by generating an updated user interface 300' with a heat map incorporating wind data based on the user's desired anchoring time and/or updated environmental data (e.g., wind, tidal flows, depth). By enabling a dynamic view of the anchoring data, the system 100 may provide the user with a better understanding of how the environmental conditions (e.g., wind, tide) will change over the next few hours or days at the selected anchoring location and/or surrounding area.

As seen when comparing FIGS. 4 and 5, user interface 300' of FIG. 5 has removed all of the fuchsia anchoring zones 350 from the windward side of the peninsula. As shown in FIG. 5, the user interface 300' additionally shows suggested crowd-sourced anchoring locations 327.

The heat maps of the color-scaled user interface 300 may visually indicate to the user how the tide may affect specific anchoring locations. For example, some areas (e.g., tidal exclaves) are deep but partially/totally isolated from the main body of water 11 at lower tides depending on the vessel draft and tides. In some embodiments, the system 100 may show the anchoring map view assuming all routing is at the lowest possible astronomical tide. FIG. 6 shows a portion 300" of the user interface 300 of FIG. 4 with the heat map focused on a light purple tidal exclave region 352. The differentiated visual indications of the light purple color of the tidal exclave region 352 and the white separation band before the fuchsia anchor zone region 350 notify the user that while it is safe to deploy the anchor of the marine vessel 10 in the tidal exclave region 352, the tide will cut-off access to the open water for at least part of the day.

There are many other ways that the system 100 may display visual indications of an anchorage quality for specific anchoring locations (e.g., circular anchoring locations of varying size/color for depth/quality). FIG. 7 shows another example user interface 200 including circular representations of suggested anchoring locations with a color scale for the visual indication of anchorage quality. As seen in FIG. 7, a first suggested anchoring location 229a has a larger radius (e.g., indicating larger swing radius due to depth and scope) and a more reddish color than a second suggested anchoring location 229b, which is greener (e.g., indicating a higher anchorage quality) with a smaller radius. By using dynamic colors and radii, the system 100 may quickly communicate the ranking (e.g., relative or absolute) and swing radius (e.g., and thus, indirectly the water depth) of particular identified anchoring locations. In this way, the user efficiently receives the required information needed to undertake finding and navigating to an anchoring location.

Additionally shown in FIG. 7, the user interface 200 includes indications of nearby anchored vessels 262 in order to notify the user of potential surface hazards. The nearby anchored vessel indications 262 may have variable size in accordance with the swing radius calculated based on the water depth, anchor line length, etc. The nearby anchored vessel data may be communicated to the system 100 as real-time, crowd-sourced data based on standard information shared with a connected network (e.g., AIS). Likewise, the system 100 may communicate the same information (e.g., including anchoring location and calculated swing radius) for the marine vessel 10 with the connected network and/or other vessels. In this way, anchoring data may be shared electronically between marine vessels. Sharing anchoring data in this way may allow the system 100 and/or user to see other anchored vessels in relation to the current location 210 of the marine vessel 10, so the system 100 and/or user can choose to anchor the marine vessel 10 in a safe anchoring location in relation to the other nearby vessels.

In some embodiments, the user interface 200 may include visual indications of environmental data (e.g., wind, current) as it relates to probable position 265 of the anchored marine vessel relative to the set anchoring location. For example, if the environmental data indicates wind out of the northeast at 11 m/s, the system 100 may use this wind and/or other environmental data to generate visual indications of probable vessel position 265 (e.g., southwest) along the possible swing radius of the anchored vessel.

The system 100 may allow the user to activate a list of anchoring locations (e.g., saved anchoring location 225, crowd-sourced anchoring location 227). FIG. 8 shows the user interface 200 of FIG. 2 with the anchoring locations list 280 activated as a side menu. In some embodiments, the anchoring locations list 280 may be a collection of saved personal and crowd-sourced anchoring locations, which may be prioritized by proximity or other relevant factors based on the context and/or user selection. The anchoring locations list 280 may be searchable, sortable, and/or filterable.

Crowd-sourced or social anchoring locations 227 may be publicly available places that contain, in addition to the normal anchoring location details, other people's images, ratings 228, reviews, and/or comments. The crowd-sourced anchoring locations 227 may be stored and uploaded as data on a shared internet site or database, accessible to the public or to members only, for example.

Selecting an anchoring location (e.g., saved anchoring location 225, crowd-sourced anchoring location 227) from either the anchoring map view or the anchoring locations list 280 may activate an anchoring location details side menu 282 on the user interface 200. FIG. 9 shows the user interface of FIG. 2 with one (e.g., crowd-sourced anchoring location 227a) of the anchoring locations selected to reveal the anchoring location details menu 282.

The anchoring location details menu 282 may provide the user with quick information (e.g., title 242, water depth, wind, seabed composition and recommended anchor type therefor, latitude/longitude, weather, images, rating) about a selected anchoring location (e.g., saved anchoring location 225, crowd-sourced anchoring location 227) within a top portion 284 as well as further details about the selected anchoring location by scrolling down. The user may edit or customize some or all of the saved information in the anchoring location details menu 282.

The anchoring location details menu 282 may include environmental data 244 (e.g., weather, tide, water depth) about the selected anchoring location for an adjustable anchoring time 246 (e.g., the next 4 hours).

In some embodiments, the anchoring location details menu 282 may include a quick action menu 286 in a lower portion to allow the user to select various actions to take regarding the selected anchoring location. For example, the quick action menu 286 may allow the user to navigate to the selected anchoring location, activate the selected location as the set anchoring location, add a marker on the map, add/remove the selected location as a waypoint within a planned trip, etc. In some embodiments, the "set anchor" quick action is prioritized within the menu.

FIG. 10 shows the user interface 200 of FIG. 2 indicating the user selecting a spot on the map for creating a new anchoring location. If the user does not wish to immediately navigate to the selected location, the system 100 may provide the user the option to create a new anchoring location through a quick process for use in the future. For example, as shown in FIG. 10, the user may create a new anchoring location by first selecting a spot on the map.

As shown in FIG. 11, selecting the spot on the map automatically activates the anchoring location details menu 282 with the quick information fields populated and ready for editing. In some embodiments, the system 100 may also automatically generate a navigational route 240 to the selected location and indicate the estimated travel time on the map. The anchoring location details menu 282 may include environmental and other data 244 based on the estimated travel time to the selected location. Thus, the user is conveniently provided with the information of what to expect from the selected location upon arrival.

FIG. 12 shows the anchoring location details menu 282 of FIG. 11 with an anchoring time adjustor 246 and corresponding environmental data 244. In this way, the system 100 may allow the user to adjust a desired anchoring time and accordingly update the anchoring locations map view and anchoring location details menu 282 to reflect the anchorage quality and other data regarding the anchoring locations based on the environmental and real-time data impacts for the desired anchoring time.

Thus, the disclosed systems and methods enable a user to find, create, and navigate to safe anchoring locations appropriate for effectively securing the marine vessel 10 throughout the desired anchoring time.

Example Anchor Setting Systems

Example systems for setting the anchor of a marine vessel are described herein. In some embodiments, the systems and methods disclosed herein may use the movement and/or current location of the marine vessel 10 as a data input to help automatically prompt the user with relevant anchoring information related to a predicted upcoming anchoring task (e.g., displaying anchoring data as the marine vessel 10 approaches a selected anchoring location or seems to be deploying the anchor). As discussed further below, in some embodiments, the systems and methods disclosed herein may enable a connected anchoring system to automatically deploy the anchor for the user (e.g., when the selected anchoring location is reached) or assist the user through the anchoring task steps in real-time (e.g., if an anchor sensor alerts the system that it is being deployed). In this way, the anchor of the marine vessel 10 may be deployed and set correctly to ensure effective anchor holding at the set anchoring location. The systems and methods may further prompt the user when the anchoring task is finished and/or the marine vessel 10 is detected as leaving the set anchoring location.

Once the marine vessel 10 has maneuvered the current location 210 to within an appropriate anchoring zone (e.g., region 250 as shown and described in relation to FIG. 2), a set anchoring location (e.g., 233 in FIG. 17) may be marked either manually or automatically. The set anchoring position may include both the dropped anchor location and the anchor line length that was fed out such that the swing radius may be calculated and stored by the system 100 for constant monitoring. The dropped anchor location and anchor line length may be manually input by the user, automatically suggested by the system 100 and then edited/confirmed by the user, and/or automatically detected by the system 100 based on sensed data inputs.

With the anchoring view selected from the list of activity shortcuts 201 on the display 110 and the zoom level data input past a certain threshold, the system 100 may cause the user interface 200 to automatically display a dynamic swing radius indicator 230 around the current location 210 of the marine vessel 10. FIG. 13 shows the user interface 200 of FIG. 2 with the dynamic swing radius indicator 230 displayed around the current location 210 of the marine vessel 10. The size of the dynamic swing radius indicator 230 around the current location 210 of the marine vessel 10 as shown on the display 110 may be dependent on the water depth and the scope ratio of the marine vessel 10. Thus, as the system 100 receives updated data (e.g., current location, depth, sonar data), the display of the dynamic swing radius indicator 230 may change accordingly.

In some embodiments, the dynamic swing radius indicator 230 may include an indication of the probable position 265 of the anchored marine vessel 10 based on wind and current data, for example (as described in more detail in relation to FIG. 7). The probable position 265 may update on the display 110 as the system 100 receives updated data inputs.

Additionally, as shown in FIG. 13, in some embodiments, the system 100 may also show nearby anchored vessels 262 with an indication of their swing radius and probable positions (e.g., due to environmental data), as described in more detail in relation to FIG. 7.

When the appearance of the dynamic swing radius indicator 230 is triggered, the system 100 may also display a selectable scope ratio indicator 234 showing the current scope ratio (e.g., "Scope 5:1") of the marine vessel 10 (e.g., based on the water depth at the current location 210 and the anchor line length). If the user selects the scope ratio indicator 234 and/or if the system 100 is triggered by behavior of the marine vessel 10 within the context of the surrounding area, more details about setting the anchor (e.g., the anchor line length (L), the swing radius (R)) may be shown on the display 110 and a manual scope adjustor 231 may be activated. For example, in some embodiments, the system 100 may include sensors within the anchoring system 140 that detect if the anchor is being deployed. In response to detecting a deployed anchor, the system 100 may show more details about setting the anchor on the display 110, such as with the manual scope adjustor 231 and/or dynamic swing radius indicator 230.

FIG. 14 shows the user interface 200 of FIG. 13 with the manual scope adjustor 231 activated on the dynamic swing radius indicator 230 including the current anchor line length (L) and calculated swing radius (R) based on the water depth at the current location 210. In this way, the user may conveniently view the suggested anchor line length to deploy along with the corresponding calculated swing radius for the water depth at the current location 210. In some embodiments, the user may use the manual scope adjustor 231 to edit the resulting swing radius of the marine vessel 10 by dragging the points displayed at the sides of the dynamic swing radius indicator 230 in or out to avoid nearby surface hazards, for example. The system 100 may limit the amount that the user is able to adjust the swing radius based on a minimum and maximum scope ratio appropriate for safety. The minimum and maximum scope ratios may be dynamic based on the environmental data (e.g., seabed composition, water depth, wind, currents) of the anchoring location and/or the boat profile (e.g., anchor type, weight) for the marine vessel 10. In response to the user editing the swing radius size, the system 100 may display the updated anchor line length to deploy.

In some embodiments without a connected anchoring system 140, the system 100 may track the movement of the marine vessel 10 to detect when the user is preparing to deploy or currently deploying the anchor. For example, the system 100 may trigger the display of the dynamic swing radius indicator 230 based on the current location 210 of the marine vessel 10 being stopped in an appropriate anchoring zone (e.g., not excessively deep or including a shallow threat detection within the desired anchoring time) for an amount of time beyond a certain time threshold representing the average time required to deploy an anchor (e.g., 20 seconds).

As another example, the system 100 may trigger activation of the anchoring menu and/or dynamic swing radius indicator 230 based on the propulsion system of the marine vessel 10 stopping quickly within an appropriate anchoring zone (e.g., region 250 as shown and described with respect to FIG. 2). In some embodiments, if the system 100 is powered off due to the stopping location being in a marina or similar location, the anchoring menu prompt may be stored and immediately activated once the system 100 is powered on again. In some embodiments, the system 100 may save a designated location as a "home marina" and perform a predetermined process in response to detecting the marine vessel 10 stopping within the designated "home marina" location.

In some embodiments, the system 100 may monitor the movement of the marine vessel 10 while the propulsion system is stopped and cause the display 110 to render the detected movement accordingly. FIG. 15 shows the user interface 200 of FIG. 13 including a stopped vessel motion indicator 237 informing the user about the movement of the marine vessel 10 (e.g., after anchor is dropped). The stopped vessel motion indicator 237 may include an anchor drive line extending from the current location 210 of the marine vessel 10 and aligned with the calculated probable position 265 indication of the dynamic swing radius indicator 230 as well as a compass guide with directional degrees revealed. This display of the alignment and movement data of the stopped vessel motion indicator 237 may inform the user regarding appropriately directing the steering of the propulsion system while reversing the marine vessel 10 to drive the anchor into the seabed 13.

Monitoring and displaying the movement (e.g., current location 210 and orientation) of the marine vessel 10 while the anchor is being deployed or driven-in and/or before finishing anchoring (e.g., confirming the set anchoring location) may provide the user with convenient visual checkpoints throughout the anchoring tasks.

Even without the user having to choose a preselected anchoring location, the system 100 may monitor the movement of the marine vessel 10 in order to suggest an estimated anchor location based on the detected movement indicative of anchoring. For example, if the marine vessel 10 stops for a predetermined amount of time (e.g., the average time needed to set the anchor depending on the marine vessel 10) and then goes in reverse, facing the wind direction, the system 100 may automatically generate and display the estimated anchor location 232 for the user, as shown in FIG. 16.

In order to finish anchoring task, the system 100 may prompt the user to confirm the estimated anchor location 232 as the set anchoring location. FIG. 16 additionally shows the user interface 200 of FIG. 13 with a confirm set anchoring location prompt 235 requesting confirmation of the estimated anchor location 232 as the set anchoring location.

After the user confirms the set anchoring location 233 or when the system 100 automatically confirms the estimated anchoring location 232 as the set anchoring location 233 (e.g., after detecting a deployed anchor in the anchoring system 140), the system 100 may display a set anchoring location notification 236 for the user. FIG. 17 shows the user interface 200 of FIG. 16 indicating that the anchor of the marine vessel 10 has been deployed and set at the set anchoring location 233. In some embodiments, the system 100 may automatically save the set anchoring location 233 in the anchoring locations list 280 or within another database for the future.

In some embodiments, a set anchoring location notification (e.g., "Anchor Set"—informing the user about details of the set anchoring location and confirming connection to MFD) is also sent to the user's mobile media device (e.g., via a companion software application ("app") loaded thereon). The companion app may allow the user to edit and view the anchor activity with similar functionality to the MFD.

In some embodiments, the user may manually edit the estimated anchor location 232 and/or set anchoring location 233 by selecting the anchor location icon or the automatic notification prompt (e.g., 235, 236) generated by the system 100 (e.g., at the top of the display 110). The user may type the desired coordinates (e.g., latitude and longitude) into the interface. As the user edits the coordinates, the corresponding icon on the display 110 may move to visually represent the inputted coordinates. If the water depth, etc. at the corrected location is different than that of the estimated anchor location 232 or set anchoring location 233, the dynamic swing radius indicator 230 may be automatically resized to match the new conditions appropriately. In some embodiments, the user may also be able to drag and drop the estimated anchor location 232 or set anchoring location 233 to the corrected anchor location before or after confirming the set anchor location 233.

Likewise, the user may also edit various other settings for the set anchoring location 233. These settings may include whether or not to automatically save the set anchoring location 233 in the user's saved anchoring locations list 280, the scope ratio, the buffer for the alarm zone, the source for the depth information (e.g., stored chart data, marine data, real-time sonar data), how the system 100 notifies the user, the anchor type (e.g., traditional, power pole), and/or the power pole hull location.

In some embodiments, if the user maneuvers the marine vessel 10 away from the estimated or selected anchoring location without finishing the anchor setting process or away from the set anchoring location 233, the system 100 may prompt the user asking if anchoring is still desired.

Referring back to FIG. 11, after the system 100 detects a user input of a selected anchoring location (e.g., selected crowd-sourced anchoring location 227a, selected spot on map, a previously saved anchoring location 225 from the anchoring locations list 280), the system 100 causes the display 110 to show the anchoring location details menu 282. From the anchoring location details menu 282, the user may select the "navigate" option from the quick action menu to cause the system 100 to automatically maneuver and/or route the marine vessel 10 to the selected anchoring location (e.g., using the autopilot, the navigation system 130, and/or the propulsion system).

In some embodiments, while en route to the selected anchoring location, the system 100 may track the current location of the marine vessel 10 and automatically update the display 110 accordingly. For example, the system 100 may compare the current location 210 of the marine vessel 10 to the selected anchoring location to calculate a remaining distance. Moreover, the system 100 may continue to receive data inputs and update the generated anchorage quality for each determined anchoring location. If the anchorage quality falls below a certain threshold, the system 100 may automatically notify the user that conditions have changed and that the selected anchoring location is no longer ideal. The system 100 may further recommend alternatives with an updated list of suggested anchoring locations and/or heat map. Likewise, if the user has programmed a selected anchoring location for future planned navigation, the system 100 may alert the user before the navigation begins.

FIG. 18 shows the user interface 200 of FIG. 11 indicating that the marine vessel 10 is approaching the selected anchoring location 229. While en route to the selected anchoring location 229 and when the remaining distance left in the route is below a certain threshold, for example, the system 100 may automatically cause the display 110 to show the dynamic swing radius indicator 230, nearby anchored vessel information 262, and/or a preview of the selected anchoring location 229 with an indication of the probable position 265 of the anchored marine vessel. In some embodiments, when the system 100 detects that the marine vessel 10 is approaching the selected anchoring location 229, the display 110 may automatically show a suggested route of best approach 248, as seen in FIG. 18. The system 100 may generate the suggested route of best approach 248 based on the calculated probable position 265 of the marine vessel 10 for the selected anchoring location such that the marine vessel 10 may be oriented to easily drop the anchor over the selected anchoring location and then drive the anchor into the seabed 13 by reversing the marine vessel 10 along the anchor drive line.

FIG. 19 shows the user interface 200 of FIG. 18 with an anchor setting menu 290 activated along the side of the display 110. In some embodiments, when the system 100 detects that the marine vessel 10 is approaching the selected anchoring location 229, the display 110 may automatically show the anchor setting menu 290. Additionally or alternatively, the anchor setting menu 290 may be triggered by the user's selection of the scope ratio indicator 234, as shown in FIG. 19 in toggled form 234'.

The anchor setting menu 290 may include information about the water depth (D), anchor line or rode length (L), scope ratio (L:D), and/or swing radius (R) for the current location 210 based on the boat profile, marine data (e.g., sonar data), environmental data, and/or user inputs. In this way, the system 100 may automatically display the most important information for the anchoring task (e.g., wind data, depth, anchor line length) at the exact time the user may use the information (e.g., right before deploying the anchor).

The anchor setting menu 290 may include a dynamic anchoring diagram 291 depicting a real-time representation of the water depth (D), anchor line or rode length (L), scope ratio (L:D), and/or swing radius (R) of the marine vessel 10 at the current location 210. The dynamic anchoring diagram 291 may quickly illustrate to the user what is happening underwater related to the anchoring task. In this way, the system 100 makes it easier for the user to understand the anchoring task using a side view of the marine vessel 10 (e.g., including the length of the marine vessel 10), anchor, and anchor line while depicting the correlated swing radius.

The system 100 may also display AIS targets and any correlated probable position 265 data received, for example. FIG. 20 shows the user interface 200 of FIG. 19 with nearby anchored vessels 262 and their probable positions 265 indicated.

The dynamic anchoring diagram 291 may illustrate the suggested scope ratio for anchoring at the current location 210 or selected anchoring location based on the desired anchoring time. The dynamic anchoring diagram 291 may correspond with the scope ratio indicator 234 and/or manual scope adjustor 231 of the dynamic swing radius indicator 230. Thus, as the user edits the scope ratio, the resulting anchor line length (L) and swing radius (R) may be reflected on the dynamic anchoring diagram 291.

As shown in FIG. 1, the system 100 may include a marine system 120. In some embodiments, the marine system 120 may be a sonar system for detecting the underwater environment in multiple dimensions. The sonar system may be built-in, attached to, and/or remote from the marine vessel 10. Visualizations of three-dimensional data from the sonar system may be provided to the user via the display 110 (e.g., marine display at helm of marine vessel 10 in FIG. 1, display on user's mobile media device).

The water depths shown in the anchoring view may be based on saved charted depths. In some embodiments, the water depths may be based on real-time marine data (e.g., sonar data) from the marine system 120 (e.g., sonar system). For example, the system 100 could automatically activate the sonar system to provide real-time sonar data if proximity to a selected anchoring location or deploying the anchor of the marine vessel 10 is detected. The real-time sonar data may include the actual detected water depths and/or seabed compositions, for example. In some embodiments, the system 100 may automatically activate the sonar system to provide accurate real-time sonar data once the marine vessel 10 is within a certain distance from the selected anchoring location 229.

In some embodiments, the dynamic anchoring diagram 291 may include a live 2D or 3D view of the seabed topography and/or composition based on the real-time sonar data. In this way, the user may be able to choose an anchoring location based on actual real-time data about the seabed, rather than relying on stored chart data alone. By displaying real-time marine data about the current location 210 of the marine vessel 10 using the marine system 120, the system 100 may enhance how the anchoring location is selected through increasing the likelihood of safe and secure anchoring. For example, the marine data may be sonar data that reflects a new underwater hazard that has not yet been added to the stored chart data. The detection of the new underwater hazard may prevent the system 100 and/or the user from attempting to anchor at a now unsafe selected anchoring location, which could prevent damage to and/or loss of the anchor, the anchor line, the anchoring system 140, and/or marine vessel 10, for example. The detection of the new underwater hazard may cause the system 100 to update the previously generated anchorage quality for the selected anchoring location and notify/warn the user accordingly. In some embodiments, the system 100 may upload detection of the new underwater hazard to a networked/shared database of anchoring locations for use by other vessels.

In some embodiments, the system 100 may cause the display 110 (e.g., MFD, mobile media device) to show an augmented reality view of the anchoring task. In this way, the user may virtually view the position of the anchor in relation to the marine vessel 10 in a more understandable manner through 3D tracking with live feedback.

In some embodiments, the system 100 may include automatic maneuvering and/or anchoring functionality. For example, the user interface for the anchoring view may include a selectable quick action (e.g., "Auto-Anchor") that when selected, causes the system 100 to determine the anchoring locations, generate the corresponding anchorage quality for each, select one of the anchoring locations (e.g., based on an optimization of anchorage quality and proximity) to navigate to, autonomously maneuver the marine vessel 10 to the selected anchoring location (e.g., using direct communication to the propulsion and steering system) via the suggested best route of approach 248, automatically deploy the anchor of the marine vessel 10 at the ideal position using the anchoring system 140 to feed out the appropriate anchor line length, and set the anchoring location, all without requiring any user input. In this way, the system 100 can securely anchor the marine vessel 10 in an appropriate anchoring location without any active steps having to be taken by the user. In some embodiments, the system 100 may prompt the user for more information (e.g., regarding the desired anchoring time, etc.) before automatically choosing the anchoring location. Likewise, there may be other quick actions (e.g., automatically navigating to nearest and/or best anchoring location) selectable by the user from the anchoring view on the display 110 that the system 100 may provide to advantageously utilize its dynamic anchoring location determination functionality.

In some embodiments with a connected anchoring system 140, the system 100 may include an auto-set anchor function. In such embodiments, once the system 100 generates the one or more anchoring zones (e.g., regions 250, 252, 254 as shown and described with respect to FIG. 2) and the user maneuvers the marine vessel 10 to be within an appropriate anchoring zone and stops the engine for a certain amount of time, the auto-set anchor function may be triggered. When the auto-set anchor function is triggered, the system 100 may automatically alert the user of an impending automated anchor deployment (e.g., in the bottom right corner of the display 110). In response, the user may then confirm if anchor deployment is desired, such that the system 100 may follow a predefined set anchoring location procedure as laid out above in an automated fashion. For example, in response to a set anchor prompt, the user may defer the set anchoring task by selecting a "Cancel" option or may speed up the anchoring task by selecting the "Set Anchor" option.

In some embodiments, the anchoring system 140 may be controlled by the system 100 via voice control and/or remote commands. In this way, the user may command the system 100 to set the anchor without requiring a physical touch interaction with the MFD and/or user input switch panel, for example.

In some embodiments, the anchoring system 140 may include one or more anchor sensors and/or anchor line sensors. The anchor sensors may provide the system 100 with data (e.g., real-time or stored) regarding the anchor type, anchor weight, location, and/or deployed state of the anchor, for example. The anchor line sensors may provide the system 100 with data (e.g., real-time or stored) regarding the anchor line type, anchor line length available, and/or the anchor line length that has been fed out with a deployed anchor. The system 100 may generate the anchorage quality based in part on the anchor type, anchor weight, anchor line type, and/or anchor line length available. In some embodiments, the system 100 may cause the dynamic anchoring diagram 291, the anchor setting menu 290, the dynamic swing radius indicator 230, the manual scope adjustor 231, and/or the scope ratio indicator 234 to reflect the real-time anchor and/or anchor line data provided by the anchoring system 140.

In some embodiments, the anchor may include an anchor sensor (e.g., a digital location anchor) configured to communicate the location of the anchor to the system 100. In such embodiments, the anchoring task may be more accurate and/or include less steps for the user. For example, the anchor drop and/or location thereof may be automatically detected even without an automated anchoring system controlled by the system 100, in that the user may manually drop the anchor, and the system 100 may detect a greater difference between the location of the anchor sensor and the current location 210 of the marine vessel 10. In response, the system 100 may automatically set the dropped anchor location and cause the display 110 to show the anchor drive line and compass guide to help the user reverse the marine vessel 10 to drive the anchor into the seabed 13.

In some embodiments, the anchoring system 140 may include, as an anchor, a power pole (e.g., a 1 meter pole) to fix the marine vessel 10 to an anchoring location in shallow waters. Data regarding the power pole may be stored in the system 100 as part of the boat profile. The system 100 may accordingly display the anchor icon for the set anchoring location 233 at the location where the power pole is located on the hull of the marine vessel 10. The system 100 may also reflect the smaller swing radius afforded for the marine vessel 10 using the power pole to anchor on the dynamic swing radius indicator 230. In some embodiments, the power pole may be automatically and/or remotely operated by the system 100 as part of the anchoring system 140 with automated functionality. For example, the user may set or unset the power pole remotely (e.g., using the MFD and/or mobile media device).

In some embodiments, the anchoring system 140 may include multiple anchors. In such embodiments, the system 100 may store the location, anchor type, anchor weight, anchor line length, and/or anchor line type of each anchor as part of the boat profile. The system 100 may provide the user with control over each anchor by displaying selectable anchor icons for editing location, deployed state, etc. (e.g., in a manner similar to overboard markers). When using multiple anchors, the system 100 may update the swing radius calculations and indicators to reflect the anchoring setup. For example, using a pair of power poles may limit the rotation of the marine vessel 10 at the set anchoring location 233 such that the probable position 265 may be fixed rather than dependent on environmental data.

Example Anchor Monitoring Systems

In some embodiments, the systems and methods disclosed herein may monitor the location and/or anchoring state of a marine vessel and provide the user with notifications or alerts (e.g., onboard, remotely) regarding location and/or environmental changes. For example, the system 100 may use the display 110 (e.g., MFD) and/or the user's mobile media device to notify the user about anchoring status changes, etc.

After confirming the set anchoring location 233 (e.g., as described above with reference to FIG. 17), the system 100 may automatically prompt the user about setting an alarm zone (e.g., a circle about the set anchoring location 233 with an editable radius) against which the current location 210 of the marine vessel 10 is monitored. If the current location 210 of the marine vessel 10 and/or an external threat approaches and/or crosses the outer edge of the alarm zone, the system 100 may notify or alert the user with alarms onboard and/or remote from the marine vessel 10. In some embodiments, the system 100 may utilize various data inputs (e.g., radar, AIS, optical cameras, thermal cameras, ultrasonic sensors) to detect whether other vessels or threats enter the alarm zone and the current location 210 of the marine vessel 10 relative to the alarm zone.

The system 100 may include dynamic calculations for generating a suggested alarm zone based on several variables, which may be unique to the marine vessel 10 and/or set anchoring location 233. FIG. 21 is a diagram showing example alarm zone settings for the marine vessel 10.

The system 100 may calculate the current swing radius (R) as well as the maximum and minimum swing radius over the desired anchoring time based on tide data. Using the current water depth (D), boat profile, scope ratio (L:D), and/or environmental data, the system 100 may calculate the anchor line length (L) and swing radius (R) at any given time (e.g., at time, t) with the following equations:

$$L = [D + B + T(t) + S(t)] \times \left[\frac{L}{D}\right]$$
$$R = \sqrt{L^2 - D^2}$$

where B is the bow height of the marine vessel 10 (e.g., 1 m), T(t) is difference in water depth due to the tide (e.g., 4 m), S(t) is the difference in water depth due to swell (e.g., 0.5 m), and (L/D) is scope ratio (e.g., 5:1). The bow height may be entered by the user, determined by the processor, and/or stored in memory as part of the boat profile.

The navigation system 130 of the marine vessel 10 may include a global navigation satellite system (GNSS) as a location sensor. The system 100 may store the location of the GNSS on the marine vessel 10 (e.g., length offset from the center of the marine vessel 10) as part of the boat profile. In calculating the maximum drift for the alarm zone, the system 100 may account for the horizontal dilution of precision (HDOP) in meters for the GNSS based on anchor data (e.g., the set anchoring location 233) and the current location 210 of the marine vessel 10 with filtering and dead reckoning. Using the calculated swing radius (R), the GNSS HDOP, the boat profile, and/or a swing buffer, the system 100 may calculate a drift alarm radius of the alarm zone with the following equation:

$$\text{Drift Alarm Radius} = R + 2V + G + F$$

where V is the length of the marine vessel 10 (e.g., 10 m), G is the GNSS HDOP, and F is swing buffer (e.g., 20 m). The length, GNSS HDOP, and/or swing buffer may be entered by the user, determined by the processor, and/or stored in memory as part of the boat profile. For example, with a 10 m vessel having a bow height of 1 m, a scope ratio of 5:1, and a GNSS HDOP of 1 m, the anchor line length (L) at a water depth (D) of 12 m with a 4 m tide and 0.5 m swell would be 90 m, giving a swing radius (R) of about 90 m and a drift alarm radius of 131 m.

FIG. 22 shows the user interface 200 of FIG. 17 indicating that the marine vessel 10 has a confirmed set anchoring location 233 and prompting the user with an alarm zone prompt 261 to set an alarm zone. Selecting the alarm zone prompt 261 may trigger an alarm zone indicator 260.

The alarm zone indicator 260 may be represented on the display 110 as a concentric circle surrounding the set anchoring location 233 and the dynamic swing radius indicator 230, as shown in FIG. 23. The alarm zone indicator 260 may include a swing buffer indicator menu 263 and an alarm zone confirmation prompt 264. In some embodiments, the user may edit the alarm zone by manually dragging the edge of the alarm zone indicator 260 to the desired alarm zone radius. FIG. 23 shows the user interface 200 of FIG. 22 indicating the user resizing the alarm zone indicator 260.

In some embodiments, the user may manually edit the alarm zone by selecting the swing buffer indicator menu 263. The user may type the desired alarm zone radius into the swing buffer indicator menu 263 or use the increase and decrease options to incrementally increase and/or decrease the alarm zone. As the user edits the alarm zone, the alarm zone indicator 260 on the display 110 may increase and/or decrease to visually represent the changes accordingly. In some embodiments, information about the alarm zone settings may be displayed in a side menu (not shown). The system 100 may limit the size of the alarm zone by preventing the user from making the alarm zone too small. The system 100 may indicate on the display 110 that the selected alarm zone size is too small, and thus, may be unsafe and/or ineffective. In response, the system 100 may automatically resize the alarm zone to the minimum safe size. In some embodiments, the user may also edit various other settings for the alarm zone. These settings may include the desired swing buffer size for the alarm zone and/or how the system 100 notifies the user about potential threats.

In some embodiments, the system 100 may monitor the movement of the marine vessel 10 as the alarm zone indicator 260 is being edited or confirmed by the user. This display of movement data may assist the user in setting the values and editing the alarm zone indicator 260 for different drifting scenarios before confirming the alarm zone. Monitoring and displaying the current location 210 of the marine vessel 10 before confirming may allow the user to easily see if alarm zone indicator 260 is set at an appropriate size.

Once confirmed, the alarm zone indicator 260 may indicate that it has been saved and set, as shown in FIG. 24. FIG. 24 shows the user interface 200 of FIG. 22 indicating that the alarm zone for the marine vessel 10 is set and displaying a selectable disable alarm prompt 266 to the user to disable the set alarm zone. The user may edit the set anchoring location 233 by dragging the anchor icon to the desired anchoring location. If the new anchoring location is closer to the marine vessel 10, the alarm zone may stay the same size. If the new anchoring location is farther from the current location 210 of the marine vessel 10, the alarm zone may increase accordingly.

In some embodiments, the system 100 may allow the user to stop alarm zone alerts by disabling the alarm zone using the disable alarm prompt 266, moving the set anchoring location 233, and/or resizing the alarm zone.

After the alarm zone is set, the system 100 may monitor the movement of the current location 210 of the marine vessel 10 relative to the set alarm zone. Additionally, the system 100 may monitor the alarm zone for potential threats to the marine vessel 10. In some embodiments, the system 100 may cause the display 110 to change the color of the alarm zone indicator 260 when the marine vessel 10 is crossing and/or approaching the edge of the alarm zone. The threshold for approaching the alarm zone may be defined by the swing buffer and GNSS HDOP described above.

If the system 100 detects that the current location 210 of the marine vessel 10 has moved outside of the alarm zone, the user may be alerted onboard (e.g., via the MFD) and/or remotely (e.g., via the user's mobile media device through a companion app).

In addition to monitoring the current location 210 of the marine vessel 10 relative to the set alarm zone, the system 100 may monitor the alarm zone for potential threats moving into and/or approaching the alarm zone. In some embodiments, the user may select detected objects around the marine vessel 10 to mark as a threat such that the system then monitors the selected object (e.g., nearby anchored vessels 262, uncharted rocks, buoys).

Moreover, in addition to generating the anchorage quality based on environmental data, the system 100 may use this data to alert the user about any threat from the terrain or environment around the selected anchoring location and/or current location 210. For example, threats may include the potential for changing tides to leave the marine vessel 10 unable to leave a cove, unsuitable seabed composition for the anchor type onboard, the water depth in relation to the keel of the marine vessel 10, and/or surface and underwater hazards.

In some embodiments, the system 100 may monitor the weather and alert the user (e.g., via the MFD and/or mobile media device) regarding a change of forecast and/or current conditions that may alter the anchoring conditions.

In some embodiments, the system 100 may utilize automated functionalities in response to detected threats. For example, the engines of the marine vessel 10 could be automatically started when movement of the marine vessel 10 outside the alarm zone is detected in order to save the user time in case of emergency.

The system 100 may include a companion software application for notifying the user about the anchoring conditions (e.g., anchor set, marine vessel drifting, threat entering alarm zone, weather alarm, tide alarm, MFD entering sleep mode, vessel battery status, alarm zone disabled, connectivity issues, etc.)

In some embodiments, a set anchoring location notification (e.g., "Anchor Set"—informing the user about details of the set anchoring location 233 and confirming connection to MFD) is also sent to the user's mobile media device (e.g., via a companion software application ("app")). The companion app may allow the user to edit and view the anchor activity with similar functionality to the MFD.

While the marine vessel 10 is secured at the set anchoring location, the system 100 may send notifications and/or alerts to the user via the display 110 (e.g., MFD) or on the user's mobile media device with a companion app. For example, the system 100 may send a message to the user as a notification on the user's mobile media device if the weather is significantly changing (e.g., "Low tide in 2 hours"—informing user that the marine vessel 10 could encounter problems with the tide if the marine vessel 10 remains anchored, "Storm expected in 3 hours"—informing user that the marine vessel 10 could encounter problems with the weather if the marine vessel 10 remains anchored).

In some embodiments, if the MFD is not powered on, then a low-power positioning and communication device may be employed to monitor the current location of the marine vessel 10 via a companion software application on a mobile media device.

In some embodiments, the system 100 may allow the user to select a "Watch" mode, which causes the MFD to enter into a low-power hibernation mode. The user may still monitor and edit the alarm zone from the companion app while the MFD is in hibernation mode. When entering the hibernation mode, the MFD may fade out in a reassuring manner indicating initialization of the hibernation mode to the user. At the same time, a notification may appear on the companion app to inform the user that the MFD is sleeping. The MFD may wake up from hibernation mode to sound an alarm. For example, at night, the system 100 may flash to alert the user onboard of an issue.

If any battery levels fall below a certain threshold, the system 100 may accordingly send a notification to the companion app. In response to a low battery notification, the user may be able to edit the anchoring settings from the companion app (e.g., turning off alarm zone and/or other systems) in order to conserve battery power. Pressing the power button may wake the MFD from hibernation mode.

In some embodiments, to prevent inconvenient false alarms (e.g., from when a user drives the marine vessel 10 out of the alarm zone without first disabling it), the system 100 may be configured to detect whether leaving the alarm zone was intentional. For example, if the user departs the alarm zone with engines of the marine vessel 10 engaged or in gear, and/or over a certain speed (e.g., a speed generally faster than drifting), the system 100 may automatically cancel the alarm zone. Moreover, motion rules for the system 100 may be optimized to allow the user to maneuver the marine vessel 10 for other activities without leaving such that the alarm zone is not unintentionally cancelled.

When the system 100 detects the marine vessel 10 leaving the set anchoring location 233, a prompt may appear on the display 110 asking the user to rate the anchoring location and/or give more information to help build the community database of anchoring data.

Other variations of the user interfaces depicted for the anchoring view of the system 100 are possible. For example, the system 100 may be customized such that the display 110 depicts a virtual rendering of the user's particular marine vessel including its dimensions (e.g., length and beam). In such embodiments, at zoom levels too far out the user interface may show a boat icon instead of the user's custom vessel. The graphical representations of the marine vessel 10 may be color coded to inform the user of potential threats at the current location. Additionally or alternatively, the system 100 may be configured to change the color of the boat icon to represent the anchorage quality at the current location, for example. FIG. 25 shows example user interface aspects for the anchoring views of a marine vessel.

Example System Architecture

FIG. 26 shows a block diagram of an example system 400 capable for use with several embodiments of the present disclosure. As shown, the system 400 may include a number of different modules or components, each of which may comprise any device or means embodied in either hardware, software, or a combination of hardware and software configured to perform one or more corresponding functions. For example, the system 400 may include a marine electronics device 405 (e.g., controller) and an array of sensors.

The marine electronics device 405, controller, remote control, MFD, and/or user interface display may include a processor 410 (which may include a fuzzy controller), a memory 420, a communication interface 430, a user interface 435, a display 440, and one or more sensors (e.g., a position sensor 445, sensor module 106, and/or other sensors 447).

In some embodiments, the system 400 may be configured such that the one or more processors electrically control various marine devices (e.g., propulsion system 110, marine system 120) in addition to the features described herein. This forms a compact and integrated system.

In some embodiments, the system 400 may be configured to receive, process, and display various types of marine data. In some embodiments, the system 400 may include one or more processors 410 and a memory 420. Additionally, the system 400 may include one or more components that are configured to gather marine data or perform marine features. In such a regard, the processor 410 may be configured to process the marine data and generate one or more images corresponding to the marine data for display on the screen that is integrated in the MFD. Further, the system 400 may be configured to communicate with various internal or external components (e.g., through the communication interface 430), such as to provide instructions related to the marine data.

The processor 410 (which may include, for example, a fuzzy controller) may be any means configured to execute various programmed operations or instructions stored in a memory, such as a device and/or circuitry operating in accordance with software or otherwise embodied in hardware or a combination thereof (e.g., a processor operating under software control, a processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide display data to the display to indicate the direction of the sonar system 120 relative to the marine vessel 10.

In some example embodiments, the processor 410 may be configured to receive sonar data indicative of the size, location, shape, etc. of objects detected by the system 400. For example, the processor 410 may be configured to receive sonar return data and process the sonar return data to generate sonar image data for display to a user (e.g., on display 440). In some embodiments, the processor 410 may be further configured to implement signal processing and/or enhancement features to improve the display characteristics, data, and/or images, to collect and/or process additional data (e.g., time, temperature, GPS information, waypoint designations), and/or to filter extraneous data to better analyze the collected data. In some embodiments, the processor 410 may further implement notices and/or alarms (e.g., alerts determined or adjusted by a user) to reflect depth measurements, the presence of fish, the proximity of other marine vessels, status or notifications for peripheral devices/systems, etc. The processor 410 and memory 420 may form processing circuitry.

The memory 420 may be configured to store instructions, computer program code, marine data (e.g., sonar data, chart data, location/position data), and/or other data associated with the system 400 in a non-transitory computer readable medium for use by the processor, for example.

The system 400 may also include one or more communications modules configured to communicate via any of many known manners, such as via a network, for example. The processing circuitry and communication interface 430 may form a processing circuitry/communication interface. The communication interface 430 may be configured to enable connections to external systems (e.g., an external network 402 or one or more remote controls, such as a handheld remote control, MFD, foot pedal, or other remote computing device). In this regard, the communication interface (e.g., 430) may include one or more of a plurality of different communication backbones or frameworks, such as Ethernet, USB, CAN, NMEA 2000, GPS, Sonar, cellular, WiFi, and/or other suitable networks, for example. In this manner, the processor 410 may retrieve stored data from a remote, external server via the external network 402 in addition to or as an alternative to the onboard memory 420. The network may also support other data sources, including GPS, autopilot, engine data, compass, radar, etc. Numerous other peripheral, remote devices such as one or more wired or wireless multi-function displays may be connected to the system 400.

The processor 410 may configure the device and/or circuitry to perform the corresponding functions of the processor 410 as described herein. In this regard, the processor 410 may be configured to analyze electrical signals communicated thereto to provide, for example, various features/functions described herein.

In some embodiments, the system 400 may be configured to determine the location of the marine vessel 10, such as through position sensor 445. Accordingly, the processor (such as through execution of computer program code) may be configured to receive the marine data from the position sensor, process the marine data to generate an image including a chart with the location from the position sensor, and cause the screen to display the image. Accordingly, the display 440 and/or user interface 435 may be configured to display the image including the chart.

The position sensor 445 may be configured to determine the current position and/or location of the system 400. For example, the position sensor 445 may comprise a GPS or other location detection system. The position sensor 445 may be found in one or more of the MFD, a trolling motor assembly, the sonar system, the radar system, and/or other marine device, and/or remotely. In some embodiments, the position sensor 445 may be configured to determine a direction of which the marine vessel 10 is facing. In some embodiments, the position sensor 445 may be operably coupled to a rotational mechanism of a marine device, such that the position sensor 445 measures the rotational change in position of the marine device (e.g., trolling motor assembly or sonar system as the trolling motor or sonar view direction 122 is turned). The position sensor 445 may be a magnetic sensor, a light sensor, mechanical sensor, or the like.

In some embodiments, the system 400 may be configured to determine the location of the marine vessel 10, such as through location sensor. The system 400 may comprise, or be associated with, a navigation system that includes the location sensor. For example, the location sensor may comprise a GPS, bottom contour, inertial navigation system, such as a micro-electro-mechanical system (MEMS) sensor, a ring laser gyroscope, or the like, or other location detection system. In such a regard, the processor 410 may be configured to act as a navigation system. For example, the processor 410 may generate at least one waypoint and, in some cases, generate an image of a chart along with the waypoint for display by the screen. Additionally or alternatively, the processor may generate one or more routes associated with the watercraft. The location of the vessel, waypoints, and/or routes may be displayed on a navigation chart on a display remote from the system 400. Further, additional navigation features (e.g., providing directions, weather information, etc.) are also contemplated.

In addition to position, navigation, and sonar data, example embodiments of the present disclosure contemplate receipt, processing, and generation of images that include other marine data. For example, the display 440 and/or user interface 435 may be configured to display images associated with vessel or motor status (e.g., gauges) or other marine data.

In any of the embodiments, the display 440 may be configured to display an indication of the current direction of the marine vessel 10.

The display 440 may be configured to display images and may include or otherwise be in communication with a user interface 435 configured to receive input from a user. The display 440 may be, for example, a conventional liquid crystal display (LCD), LED/OLED display, touchscreen display, mobile media device, and/or any other suitable display known in the art, upon which images may be displayed. In some embodiments, the display 440 may be the MFD and/or the user's mobile media device. The display may be integrated into the marine electronic device 405. In some example embodiments, additional displays may also be included, such as a touch screen display, mobile media device, or any other suitable display known in the art upon which images may be displayed.

In some embodiments, the display 440 may present one or more sets of marine data and/or images generated therefrom. Such marine data may include chart data, radar data, weather data, location data, position data, orientation data, sonar data, and/or any other type of information relevant to the marine vessel 10. In some embodiments, the display 440 may be configured to present marine data simultaneously as one or more layers and/or in split-screen mode. In some embodiments, the user may select various combinations of the marine data for display. In other embodiments, various sets of marine data may be superimposed or overlaid onto one another. For example, a route may be applied to (or overlaid onto) a chart (e.g., a map or navigation chart). Additionally or alternatively, depth information, weather information, radar information, sonar information, and/or any other display inputs may be applied to and/or overlaid onto one another.

In some embodiments, the display 440 and/or user interface may be a screen that is configured to merely present images and not receive user input. In other embodiments, the display and/or user interface may be a user interface such that it is configured to receive user input in some form. For example, the screen may be a touchscreen that enables touch input from a user. Additionally or alternatively, the user interface may include one or more buttons (not shown) that enable user input.

Additionally, the display may be configured to display other relevant motor information including, but not limited to, speed data, motor data battery data, current operating mode, auto pilot, or the like. For example, in some example embodiments, the system 400 may include a plurality of operating modes, such as a manual or normal mode, an eco-mode, an anchor mode, an autopilot mode, a speed lock mode, a heading lock mode, or the like. The processor 410 may receive an indication of the current operating mode and generate display data indicative of the current operating mode. In an example embodiment, the mode may be represented by a number, letter, or character value displayed, such as on the seven-segment display. Additionally or alternatively, each mode may be represented by a mode icon. For example, a manual mode may be represented by a manual mode icon, such as a propeller, an eco-mode may be represented by an eco-mode icon, such as a leaf, a speed lock mode may be represented by a speed lock icon, such as a vessel outline with arrow, an anchor lock mode may be represented by an anchor lock icon, such as an anchor, and a heading lock mode may be represented by a heading lock icon, such as a vessel outline with a directional indicator. In addition to the mode icons, other informational icons may also be provided. In an example embodiment, the digital display may include one or more of a speed icon, a battery icon, and a motor icon. These additional icons may be used to indicate the type of data displayed on the seven-segment display. For example, no icon may be indicated when speed data is displayed, however, a battery icon or motor icon may be displayed to indicate battery data or motor data is being displayed, respectively.

The user interface 435 may include, for example, a keyboard, keypad, function keys, mouse, scrolling device, input/output ports, touch screen, or any other mechanism by which a user may interface with the system.

In some embodiments, the system 400 may comprise an autopilot that is configured to operate the propulsion system 110 to propel the marine vessel 10 in a direction and at a speed. In some embodiments, the autopilot may direct the marine vessel 10 to a waypoint (e.g., a latitude and longitude coordinate). Additionally or alternatively, the autopilot may be configured to direct the marine vessel 10 along a route, such as in conjunction with the navigation system. Further, additional autopilot features (e.g., anchoring) are also contemplated. In some example embodiment, the processor 410 may receive an indication of the motor operating condition being the autopilot mode. The processor 410 may generate display data based on the autopilot operating mode and cause an indication of the autopilot operating mode to be displayed on the digital display in the first portion, such as an autopilot icon.

In some embodiments, the system 400 may comprise a sonar system including a sonar transducer assembly 448. The sonar transducer assembly 448 may be housed in the sonar system and configured to gather sonar data from the underwater environment relative to the marine vessel 10. Accordingly, the processor 410 (such as through execution of computer program code) may be configured to receive an indication of operation of the sonar transducer assembly 448. The processor 410 may generate additional display data indicative of the operation of the sonar transducer and cause the display data to be displayed on the digital display. For example, a sonar icon (not shown) may be energized to indicate that the sonar transducer is operating.

In some embodiments, the sonar system 120 may be used to determine depth and bottom topography, detect fish, locate wreckage, etc. Sonar beams, from a sonar transducer assembly 448, can be transmitted into the underwater environment. The sonar signals reflect off objects in the underwater environment (e.g., fish, structure, sea floor bottom, etc.) and return to the sonar transducer assembly, which converts the sonar returns into sonar data that can be used to produce an image of the underwater environment.

In an example embodiment, the system 400 may include a speed sensor, such as an electromagnetic speed sensor, paddle wheel speed sensor, or the like. The speed sensor may be configured to measure the speed of the marine vessel 10 through the water. The processor 410 may receive speed data from the speed sensor and generate additional display data indicative of the speed of the marine vessel 10 through the water. The speed data may be displayed, such as in text format on the first portion of the digital display. The speed data may be displayed in any relevant unit, such as miles per hour, kilometers per hour, feet per minute, or the like. In some instances, a unit identifier, such as a plurality of LEDs, may be provided in association with the display (may be shown in normal text or with a seven-digit display). The processor 410 may cause an LED associated with the appropriate unit for the speed data to be illuminated.

In some example embodiments, the system 400 may include a motor sensor. The motor sensor may be a voltage sensor, a rotation per minute (RPM) sensor, a current sensor, or other suitable sensor to measure the output of the propulsion system 110. The processor 410 may receive the motor data from the motor sensor and determine a motor output. In an example embodiment, the motor data may be compared to a data table (which may be stored in memory 420) to determine a motor output, such as a percentage of maximum motor output. The processor 410 may generate additional display data indicative of the motor output and cause the display data to be displayed in the first portion of the digital display. For example, the motor data may be the measured voltage, current, or RPM displayed in the display, a percentage of the maximum motor output displayed in the display or graphically in a segment bar, a high or low motor output warning light, or other suitable display. The segment bar may include a plurality of display segments which may be energized or de-energized to indicate a corresponding proportion of the maximum output of the motor.

In some embodiments, the system 400 further includes a power source (e.g., battery) that is configured to provide power to the various components. In some embodiments, the power source is rechargeable. In some example embodiments, the system 400 includes a battery sensor. The battery sensor may include a current sensor or voltage sensor configured to measure the current charge of a battery power supply of the system 400 (e.g., the power source). The battery sensor may be configured to measure individual battery cells or measure a battery bank. The processor 410 may receive battery data from the battery sensor and determine the remaining charge on the battery. In an example embodiment, the voltage or current measured by the battery sensor may be compared to a reference value or data table, stored in memory 420, to determine the remaining charge on the battery.

In some embodiments, the system 400 may include other sensors. For example, in some embodiments, the system 400 may include an accelerometer for measuring acceleration data, which may be logged by the processor. The acceleration data may be utilized for maintenance, warranties, accident investigation, and/or product data collection for quality control. In some embodiments, the system 400 may include an accelerometer, a gyroscope, and/or a magnetometer, which may be portions of a micro-electro-mechanical system (MEMS). In some embodiments, the accelerometer may be a variable capacitive (VC) MEMS accelerometer, a piezoresistive (PR) MEMS accelerometer, or the like. The gyroscope may be configured to measure angular velocity. In some embodiments, the gyroscope may be a vibrating structure MEMS gyroscope including gyroscopic sensors oriented in a plurality of axes. The magnetometer may be configured to measure magnetic field strength, which can be used to find magnetic north and/or heading angle. In some embodiments, the magnetometer may be a Lorentz force based MEMS sensor, electron tunneling MEMS sensor, MEMS compass, or the like.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in general context of computer-executable instructions, such as program modules, being executed by a computer. Generally, program modules may include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some instances, program modules may be implemented on separate computing systems and/or devices adapted to communicate with one another. Further, a program module may be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network (e.g., by hardwired links, wireless links, or combinations thereof). In a distributed computing environment, program modules may be located in both local and remote computer storage media including memory storage devices.

The system 400 may include a computer device or system 450 (e.g., mobile media device) into which implementations of various technologies and techniques described herein may be implemented. Computing system 450 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

The computing system 450 may include a central processing unit (CPU), a system memory and a system bus that couples various system components including the system memory to the CPU. In some implementations the computing system 450 may include more than one CPU.

The CPU can include a microprocessor, a microcontroller, a processor, a programmable integrated circuit, or a combination thereof. The CPU can comprise an off-the-shelf processor such as a Reduced Instruction Set Computer (RISC), including an Advanced RISC Machine (ARM) processor, or a Microprocessor without Interlocked Pipeline Stages (MIPS) processor, or a combination thereof. The CPU may also include a proprietary processor. The CPU may include a multi-core processor.

The CPU may provide output data to a Graphics Processing Unit (GPU). The GPU may generate graphical user interfaces that present the output data. The GPU may also provide objects, such as menus, in the graphical user interface. A user may provide inputs by interacting with the objects. The GPU may receive the inputs from interaction with the objects and provide the inputs to the CPU. In one implementation, the CPU may perform the tasks of the GPU. A video adapter may be provided to convert graphical data into signals for a monitor. The monitor includes a screen. The screen can be sensitive to heat or touching (now collectively referred to as a "touch screen"). In one implementation, the computer system 450 may not include a monitor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The system bus may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system 450, such as during start-up, may be stored in the ROM. The computing system may be implemented using a printed circuit board containing various components including processing units, data storage memory, and connectors.

Certain implementations may be configured to be connected to a GPS and/or a sonar system. The GPS and/or sonar system may be connected via the network interface or Universal Serial Bus (USB) interface. In one implementation, the computing system 450, the monitor, the screen and buttons may be integrated into a console.

The computing system 450 may further include a hard disk drive for reading from and writing to a hard disk, a memory card reader for reading from and writing to a removable memory card and an optical disk drive for reading from and writing to a removable optical disk, such as a CD ROM, DVD ROM or other optical media. The hard disk drive, the memory card reader, and the optical disk drive may be connected to the system bus by a hard disk drive interface, a memory card interface, and an optical drive interface, respectively. The drives and their associated computer-readable media may provide nonvolatile storage of computer-readable instructions, data structures, program modules and other data for the computing system 450.

Although the computing system 450 is described herein as having a hard disk, a removable memory card, and a removable optical disk, it should be appreciated by those skilled in the art that the computing system 450 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, including a Solid State Disk (SSD), CD-ROM, digital versatile disks (DVD), or other optical storage, magnetic cassettes, magnetic tape, magnetic disk storage or other magnetic storage devices, or any other medium which can be used to store the desired information and which can be accessed by the computing system 450. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. The computing system 450 may also include a host adapter that connects to a storage device via a small computer system interface (SCSI) bus, a Fiber Channel bus, an eSATA bus, or using any other applicable computer bus interface. The computing system 450 can also be connected to a router to establish a wide area network (WAN) with one or more remote computers. The router may be connected to the system bus via a network interface. The remote computers can also include hard disks that store application programs.

In another implementation, the computing system 450 may also connect to one or more remote computers via local area network (LAN) or the WAN. When using a LAN networking environment, the computing system 450 may be connected to the LAN through the network interface or adapter. The LAN may be implemented via a wired connection or a wireless connection. The LAN may be implemented using Wi-Fi technology, cellular technology, or any other implementation known to those skilled in the art. The network interface may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers. It will be appreciated that the network connections shown are exemplary and other means of establishing a communications link between the computer systems may be used. The network interface may also include digital cellular networks, Bluetooth, or any other wireless network interface.

A number of program modules may be stored on the hard disk, memory card, optical disk, ROM, or RAM, including an operating system, one or more application programs, program data, and a database system. The one or more application programs may contain program instructions configured to perform methods (e.g., method 700, 800, 900)

according to various implementations described herein. The operating system may be any suitable operating system that may control the operation of a networked personal or server computer, such as Windows® XP, Mac OS® X, Unix-variants (e.g., Linux® and BSD®), Android®, iOS®, and the like.

A user may enter commands and information into the computing system 450 through input devices such as a keyboard and pointing device. Other input devices may include a microphone, joystick, game pad, satellite dish, scanner, user input button, wearable device, or the like. These and other input devices may be connected to the CPU through a USB interface coupled to system bus, but may be connected by other interfaces, such as a parallel port, Bluetooth or a game port. A monitor or other type of display device may also be connected to system bus via an interface, such as a video adapter. In addition to the monitor, the computing system 450 may further include other peripheral output devices such as speakers and printers.

In various implementations, each marine electronic device 405 described herein may be referred to as a marine device or as an MFD. The marine electronic device 405 may include one or more components disposed at various locations on a marine vessel. Such components may include one or more data modules, sensors, instrumentation, and/or any other devices known to those skilled in the art that may transmit various types of data to the marine electronic device 405 for processing and/or display. The various types of data transmitted to the marine electronic device 405 may include marine electronics data and/or other data types known to those skilled in the art. The marine data received from the marine electronic device 405 or system 400 may include chart data, sonar data, structure data, radar data, navigation data, position data, heading data, automatic identification system (AIS) data, Doppler data, speed data, course data, or any other type known to those skilled in the art.

In one implementation, the marine electronic device 405 may include a radar sensor for recording the radar data and/or the Doppler data, a compass heading sensor for recording the heading data, and a position sensor for recording the position data. In another implementation, the marine electronic device 405 may include a sonar transducer for recording the sonar data, an AIS transponder for recording the AIS data, a paddlewheel sensor for recording the speed data, and/or the like.

The marine electronic device 405 may receive external data via a LAN or a WAN. In some implementations, external data may relate to information not available from various marine electronics systems. The external data may be retrieved from various sources, such as, e.g., the Internet or any other source. The external data may include atmospheric temperature, atmospheric pressure, tidal data, weather, temperature, moon phase, sunrise, sunset, water levels, historic fishing data, and/or various other fishing and/or trolling related data and information.

The marine electronic device 405 may be attached to various buses and/or networks, such as a National Marine Electronics Association (NMEA) bus or network, for example. The marine electronic device 405 may send or receive data to or from another device attached to the NMEA 2000 bus. For instance, the marine electronic device 405 may transmit commands and receive data from a motor or a sensor using an NMEA 2000 bus. In some implementations, the marine electronic device 405 may be capable of steering a marine vessel and controlling the speed of the marine vessel (e.g., autopilot). For instance, one or more waypoints may be input to the marine electronic device 405, and the marine electronic device 405 may be configured to steer the marine vessel to the one or more waypoints. Further, the marine electronic device 405 may be configured to transmit and/or receive NMEA 2000 compliant messages, messages in a proprietary format that do not interfere with NMEA 2000 compliant messages or devices, and/or messages in any other format. In various other implementations, the marine electronic device 405 may be attached to various other communication buses and/or networks configured to use various other types of protocols that may be accessed via, e.g., NMEA 2000, NMEA 0183, Ethernet, Proprietary wired protocol, etc. In some implementations, the marine electronic device 405 may communicate with various other devices on the marine vessel 10 via wireless communication channels and/or protocols.

In some implementations, the marine electronic device 405 may be connected to a global positioning system (GPS) receiver. The marine electronic device 405 and/or the GPS receiver may be connected via a network interface. In this instance, the GPS receiver may be used to determine position and coordinate data for a marine vessel on which the marine electronic device 405 is disposed. In some instances, the GPS receiver may transmit position coordinate data to the marine electronic device 405. In various other instances, any type of known positioning system may be used to determine and/or provide position coordinate data to/for the marine electronic device 405.

The marine electronic device 405 may be configured as a computing system similar to computing device 450.

Described herein are implementations of various technologies for a non-transitory computer-readable medium having stored thereon computer-executable instructions which, when executed by a computer, cause the computer to perform various actions. The actions may include displaying buttons or icons corresponding to a plurality of autopilots. The actions may include receiving a selection of one of the autopilots. The actions may include displaying autopilot commands corresponding to the selected autopilot. The actions may include receiving a selection of one of the commands. The actions may also include transmitting a message corresponding to the selected command to the selected autopilot.

Described herein are also implementations of various technologies for an apparatus for displaying marine electronic data. The device includes one or more processors, a screen configured to display marine data, and a memory. The memory has a plurality of executable instructions. When the executable instructions are executed by the one or more processors, the processors may display buttons or icons corresponding to a plurality of autopilots. The processors may receive a selection of one of the autopilots. The processors may display autopilot commands corresponding to the selected autopilot. The processors may receive a selection of one of the commands. The processors may also transmit a message corresponding to the selected command to the selected autopilot.

Described herein are also implementations of various technologies for a non-transitory computer-readable medium having stored thereon computer-executable instructions which, when executed by a computer, cause the computer to perform various actions. The actions may include receiving a selection of a first autopilot from a plurality of autopilots. The actions may include receiving a command for the first autopilot. The actions may include transmitting a first message to a second autopilot. The first message includes instructions to deactivate the second autopilot. The actions may also include transmitting a second message corresponding to the command to the first autopilot.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Example Flowchart(s)

Embodiments of the present disclosure provide methods for assisting the user with anchoring tasks associated with a marine vessel (e.g., finding and/or selecting anchoring locations, navigating to anchoring locations, deploying the anchor, monitoring once anchored). Various examples of the operations performed in accordance with embodiments of the present disclosure will now be provided with reference to FIGS. 27-30.

FIG. 27 illustrates a flowchart according to an example method for determining one or more anchoring locations and a corresponding anchorage quality for each according to an example embodiment 600. The operations illustrated in and described with respect to FIG. 27 may, for example, be performed by, with the assistance of, and/or under the control of one or more of the processor 410, memory 420, communication interface 430, user interface 435, display 440, marine system 120, marine device, position sensor 445, computing device 450, remote server 460, and/or other components described herein.

Operation 602 may comprise receiving inputs (e.g., current location, zoom level, desired anchoring time, marine data, environmental data, chart data, boat profile data). The processor 410, marine system 120, marine device, display 440, sensor module 106, and/or computing device 450 may, for example, provide means for performing operation 602.

Operation 604 may comprise determining the scope of the surrounding area. The processor 410, display 440, and/or computing device 450 may, for example, provide means for performing operation 604. Operation 604 may be optional.

Operation 606 may comprise filtering out locations from the surrounding area that are not anchorable. The processor 410, sensor module 106, marine system 120, marine device, and/or computing device 450 may, for example, provide means for performing operation 606. Operation 606 may be optional.

At operation 608, the method 600 may comprise determining one or more anchoring locations in the surrounding area based on one or more of the received inputs. The controller, processor 410, marine system 120, marine device, sensor module 106, and/or computing device 450 may, for example, provide means for performing operation 608. At operation 610, the method 600 may comprise generating an anchorage quality index for each of the one or more determined anchoring locations based on one or more of the received inputs. The controller, processor 410, and/or computing device 450 may, for example, provide means for performing operation 610. At operation 612, the method 600 may comprise displaying the one or more anchoring locations with a visual indication of the corresponding anchorage quality index for the one or more anchoring locations. The controller, processor 410, display 440, and/or computing device 450 may, for example, provide means for performing operation 612.

FIG. 28 illustrates a flowchart according to an example method for setting an anchoring location according to an example embodiment 700. The operations illustrated in and described with respect to FIG. 28 may, for example, be performed by, with the assistance of, and/or under the control of one or more of the processor 410, memory 420, communication interface 430, user interface 435, display 440, marine system 120, marine device, position sensor 445, computing device 450, remote server 460, and/or other components described herein.

Operation 702 may comprise receiving a user selection of an anchoring location. The processor 410, sensor module 106, display 440, and/or computing device 450 may, for example, provide means for performing operation 702. Operation 704 may comprise generating a route to the selected anchoring location. The processor 410, marine system 120, marine device, display 440, and/or computing device 450 may, for example, provide means for performing operation 704. Operation 706 may comprise monitoring the current location of the marine vessel. The processor 410, position sensor 445, sensor module 106, mobile media device, and/or computing device 450 may, for example, provide means for performing operation 706.

At operation 708, the method 700 may comprise displaying anchoring details and/or a suggested best route of approach when the current location is detected to be within a predetermined distance threshold of the selected anchoring location. The controller, processor 410, display 440, and/or computing device 450 may, for example, provide means for performing operation 708. Operation 708 may be optional.

At operation 710, the method 700 may comprise displaying an anchor drive line in response to detected anchoring. The controller, processor 410, sensor module 106, display 440, and/or computing device 450 may, for example, provide means for performing operation 710. Operation 710 may be optional.

At operation 712, the method 700 may comprise displaying an estimated anchoring location and/or a confirm set anchoring location prompt to user. The controller, processor 410, display 440, and/or computing device 450 may, for example, provide means for performing operation 712.

At operation 714, the method 700 may comprise displaying a set anchoring location notification in response to receiving confirmation from the user. The controller, processor 410, display 440, and/or computing device 450 may, for example, provide means for performing operation 714. Operation 714 may be optional.

FIG. 29 illustrates a flowchart according to an example method for detecting an anchoring location according to an example embodiment 800. The operations illustrated in and described with respect to FIG. 29 may, for example, be performed by, with the assistance of, and/or under the control of one or more of the processor 410, memory 420, communication interface 430, user interface 435, display 440, marine system 120, marine device, position sensor 445, computing device 450, remote server 460, and/or other components described herein.

Operation 802 may comprise monitoring the current location of the marine vessel in relation to the one or more anchoring locations determined by the system. The controller, processor 410, sensor module 106, position sensor 445, mobile media device, and/or computing device 450 may, for example, provide means for performing operation 802.

Operation 804 may comprise displaying an estimated anchoring location and confirmation prompt in response to detecting that the current location of the marine vessel has been within an appropriate anchoring zone for longer than a predetermined anchoring time threshold. The controller, processor 410, display 440, sensor module 106, mobile media device, and/or computing device 450 may, for example, provide means for performing operation 804. Operation 806 may comprise receiving one or more user inputs editing and/or confirming the anchoring location. The controller, processor 410, display 440, and/or computing device 450 may, for example, provide means for performing operation 806.

At operation 808, the method 800 may comprise displaying an anchor drive line in response to confirmation of the estimated anchoring location as the anchoring location. The controller, processor 410, display 440, and/or computing device 450 may, for example, provide means for performing operation 808. Operation 808 may be optional.

At operation 810, the method 800 may comprise displaying an estimated anchoring location and/or a confirm set anchoring location prompt to user. The controller, processor 410, display 440, and/or computing device 450 may, for example, provide means for performing operation 810.

At operation 812, the method 800 may comprise displaying a set anchoring location notification in response to receiving a confirmation from the user. The controller, processor 410, display 440, sensor module 106, and/or computing device 450 may, for example, provide means for performing operation 812. Operation 812 may be optional.

FIG. 30 illustrates a flowchart according to an example method for monitoring a marine vessel at a set anchoring location according to an example embodiment 900. The operations illustrated in and described with respect to FIG. 30 may, for example, be performed by, with the assistance of, and/or under the control of one or more of the controller, processor 410, memory 420, communication interface 430, user interface 435, display 440, marine system 120, marine device, position sensor 445, computing device 450, remote server 460, and/or other components described herein.

Operation 902 may comprise calculating an alarm zone based on one or more inputs (e.g., boat profile, anchor line length, marine data, chart data, environmental data) in response to confirmation of a set anchoring location. The controller, processor 410, marine system 120, marine device, sensor module 106, and/or computing device 450 may, for example, provide means for performing operation 902. Operation 904 may comprise displaying an alarm zone indicator based on the calculated alarm zone. The controller, processor 410, display 440, and/or computing device 450 may, for example, provide means for performing operation 904. Operation 906 may comprise receiving user inputs editing and/or confirming the alarm zone. The controller, processor 410, display 440, and/or computing device 450 may, for example, provide means for performing operation 906.

At operation 908, the method 900 may comprise displaying an indication that the alarm zone is set. The controller, processor 410, display 440, and/or computing device 450 may, for example, provide means for performing operation 908. Operation 908 may be optional.

At operation 910, the method 900 may comprise monitoring the current location of other objects, the anchor, and/or the marine vessel in relation to the alarm zone. The controller, processor 410, sensor module 106, mobile media device, marine device, position sensor 445, and/or computing device 450 may, for example, provide means for performing operation 910. At operation 912, the method 900 may comprise displaying a notification to the user in response to the current location of other objects, the anchor, and/or the marine vessel moving within a predetermined threshold of the set alarm zone. The controller, processor 410, sensor module 106, display 440, and/or computing device 450 may, for example, provide means for performing operation 912.

FIGS. 27-30 illustrate flowcharts of a system, method, and/or computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410 or controller. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

In some embodiments, the method for operating various marine devices may include additional, optional operations, and/or the operations described above may be modified or augmented.

Conclusion

Many modifications and other embodiments of the disclosures set forth herein will come to mind to one skilled in the art to which these present disclosures pertain having the benefit of the teachings presented in the foregoing descriptions and the associated drawings. Therefore, it is to be understood that the embodiments of the present disclosure are not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated within the scope of the present disclosure. Although specific terms are employed herein, they are used in a generic and descriptive sense only and not for purposes of limitation.

The invention claimed is:

1. A marine electronic device configured to provide possible anchoring locations to a user for a marine vessel, the marine electronic device comprising:
a display; and
a processor configured to:
determine boat profile data corresponding to the marine vessel, wherein the boat profile data includes at least one of a vessel length, bow height, a vessel draft, a number of anchors, an anchor type, a length of a line corresponding to the anchor, a scope ratio, or an allowable amount of swing;
receive marine data from a marine system connected to the marine vessel, wherein the received marine data includes at least one of sonar data, radar data, weather data, tide data, seabed composition data, seabed topography data, drift data, or depth data,
determine one or more anchoring locations,
generate an anchorage quality for each of the one or more anchoring locations based on at least the received marine data and the determined boat profile data, wherein the anchorage quality of each of the one or more anchoring locations corresponds to a desirability of using the corresponding one of the one or more anchoring locations for anchoring of the marine vessel, and
cause the display to show the one or more anchoring locations with a visual indication of the corresponding anchorage quality for the one or more anchoring locations,
wherein the visual indication is variable and reflects the corresponding anchorage quality for an anchoring location, wherein the one or more anchoring locations includes at least a first anchoring location and a second anchoring location, and wherein a first visual indication associated with the first anchoring location is different than a second visual indication associated with the second anchoring location in an instance in which a first anchorage quality associated with the first anchoring location is different than a second anchorage quality associated with the second anchoring location.

2. A method for planning where to anchor a marine vessel, the method comprising:
receiving one or more user inputs;
determining one or more anchoring areas for the marine vessel in response to the one or more user inputs;
determining boat profile data corresponding to the marine vessel, wherein the boat profile data includes at least one of a vessel length, bow height, a vessel draft, a number of anchors, an anchor type, a length of a line corresponding to the anchor, a scope ratio, or an allowable amount of swing;
determining marine data from a marine system connected to the marine vessel, wherein the received marine data includes at least one of sonar data, radar data, weather data, tide data, seabed composition data, seabed topography data, drift data, or depth data;
generating an anchorage quality for each of the one or more anchoring areas based on at least the marine data and the boat profile data, wherein the anchorage quality of each of the one or more anchoring areas corresponds to a desirability of using the corresponding one of the one or more anchoring areas for anchoring of the marine vessel; and
causing a display to show a heat map indicating the anchorage quality of the one or more anchoring areas.

3. A marine electronic device configured to provide possible anchoring locations to a user for a marine vessel, the marine electronic device comprising:
a display; and
a processor configured to:
receive one or more user inputs,
determine one or more anchoring areas for the marine vessel in response to the one or more user inputs,
determine boat profile data corresponding to the marine vessel, wherein the boat profile data includes at least one of a vessel length, bow height, a vessel draft, a number of anchors, an anchor type, a length of a line corresponding to the anchor, a scope ratio, or an allowable amount of swing,
receive marine data from a marine system connected to the marine vessel, wherein the received marine data includes at least one of sonar data, radar data, weather data, tide data, seabed composition data, seabed topography data, drift data, or depth data,
generate an anchorage quality for each of the one or more anchoring areas based on at least the marine data and the boat profile data, wherein the anchorage quality of each of the one or more anchoring areas corresponds to a desirability of using the corresponding one of the one or more anchoring areas for anchoring of the marine vessel,
generate a swing buffer distance required for the marine vessel for anchoring in each of the one or more anchoring areas, and
cause the display to show a map of the one or more anchoring areas indicating the swing buffer distance and anchorage quality generated for each of the one or more anchoring areas.

4. The marine electronic device of claim 1, wherein the processor is configured to cause the display to show the one or more anchoring locations as one or more areas on a map.

5. The marine electronic device of claim 1, wherein the visual indication is a color along a color scale.

6. The marine electronic device of claim 5, wherein the processor is configured to cause the display to show the one or more anchoring locations in the form of a heat map overlaid on a map.

7. The marine electronic device of claim 1, wherein the one or more areas are circular.

8. The marine electronic device of claim 7, wherein a radius of each of the one or more circular areas is based on at least a corresponding water depth.

9. The marine electronic device of claim 7, wherein the visual indication is depicted as a radius size of each of the one or more circular areas.

10. The marine electronic device of claim 1, wherein the processor is further configured to generate the anchorage quality index for each of the one or more anchoring locations based on at least an anchoring time input by the user.

11. The marine electronic device of claim 1, wherein the processor is further configured to:
receive real time environmental data, and
update the one or more anchoring locations based on at least the received real time environmental data.

12. The marine electronic device of claim 11, wherein the real time environmental data includes at least one of wind data, tide data, and weather data.

13. A marine electronic device configured to provide possible anchoring locations to a user for a marine vessel, the marine electronic device comprising:

a display; and a processor configured to:

receive one or more user inputs, determine one or more anchoring areas for the marine vessel in response to the one or more user inputs, determine boat profile data corresponding to the marine vessel, wherein the boat profile data includes at least one of a vessel length, bow height, a vessel draft, a number of anchors, an anchor type, a length of a line corresponding to the anchor, a scope ratio, or an allowable amount of swing, receive marine data from a marine system connected to the marine vessel, wherein the received marine data includes at least one of sonar data, radar data, weather data, tide data, seabed composition data, seabed topography data, drift data, or depth data, generate an anchorage quality for each of the one or more anchoring areas based on at least the marine data and the boat profile data, wherein the anchorage quality of each of the one or more anchoring areas corresponds to a desirability of using the corresponding one of the one or more anchoring areas for anchoring of the marine vessel, and cause the display to show a heat map indicating the anchorage quality index of the one or more anchoring areas.

14. The marine electronic device of claim 13, wherein the processor is configured to generate the anchorage quality for each of the one or more anchoring areas based on at least real time data.

15. The marine electronic device of claim 13, wherein the processor is further configured to:

generate a swing buffer distance required for the marine vessel for anchoring in each of the one or more anchoring areas, and cause the display to show a swing buffer overlay on the heat map indicating the generated swing buffer distance for each of the one or more anchoring areas.

16. The marine electronic device of claim 13, wherein the processor is configured to generate the anchorage quality for each of the one or more anchoring areas based on at least crowd sourced data.

17. The method of claim 2, wherein the display is part of a multi function display on the marine vessel.

18. The method of claim 2, wherein the display is part of a mobile media device.

19. The marine electronic device of claim 13, wherein the anchorage quality for each of the one or more anchoring areas is further based on an anchoring time.

\* \* \* \* \*

UNITED STATES PATENT AND TRADEMARK OFFICE
CERTIFICATE OF CORRECTION

Page 1 of 1

PATENT NO. : 11,674,806 B2
APPLICATION NO. : 17/184905
DATED : June 13, 2023
INVENTOR(S) : Sergiu Tulgara et al.

It is certified that error appears in the above-identified patent and that said Letters Patent is hereby corrected as shown below:

On the Title Page

Under (72) Inventors, should read:
-- Sergiu Tulgara, Göteborg (SE); --
Instead of:
"Sergiu Tulgara, Gothenburg (SE);".

In the Claims

In Claim 10, Column 40, Line 55, should read:
-- quality for each of the one or more anchoring locations --
Instead of:
"quality index for each of the one or more anchoring locations".

In Claim 13, Column 41, Line 24, should read:
-- anchorage quality of the one or more anchoring areas --
Instead of:
"anchorage quality index of the one or more anchoring areas".

Signed and Sealed this
Twenty-fifth Day of July, 2023

Katherine Kelly Vidal
*Director of the United States Patent and Trademark Office*